US009137262B2

(12) United States Patent
Qureshi et al.

(10) Patent No.: US 9,137,262 B2
(45) Date of Patent: Sep. 15, 2015

(54) PROVIDING SECURE MOBILE DEVICE ACCESS TO ENTERPRISE RESOURCES USING APPLICATION TUNNELS

(71) Applicant: Citrix Systems, Inc., Ft. Lauderdale, FL (US)

(72) Inventors: Waheed Qureshi, Pleasanton, CA (US); Olivier Andre, Bry sur Marne (FR); Shafaq Abdullah, Mountain View, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/648,993

(22) Filed: Oct. 10, 2012

(65) Prior Publication Data

US 2014/0007192 A1    Jan. 2, 2014

Related U.S. Application Data

(60) Provisional application No. 61/546,021, filed on Oct. 11, 2011, provisional application No. 61/546,922, filed on Oct. 13, 2011, provisional application No. 61/649,134, filed on May 18, 2012, provisional application No. 61/702,671, filed on Sep. 18, 2012.

(51) Int. Cl.
*H04W 12/06* (2009.01)
*G06F 21/62* (2013.01)
(Continued)

(52) U.S. Cl.
CPC *H04L 63/20* (2013.01); *G06F 8/53* (2013.01); *G06F 21/10* (2013.01); *G06F 21/14* (2013.01);
(Continued)

(58) Field of Classification Search
None
See application file for complete search history.

(56) References Cited

U.S. PATENT DOCUMENTS 5,805,803 A    9/1998  Birrell et al.
6,151,606 A    11/2000 Mendez
(Continued)

FOREIGN PATENT DOCUMENTS

EP    1465039 A1    10/2004
EP    2403211 A1    1/2012
(Continued)

OTHER PUBLICATIONS

Non-final Office Action issued in U.S. Appl. No. 13/649,063 mailed Nov. 7, 2013.
(Continued)

*Primary Examiner* — Gilberto Barron, Jr.
*Assistant Examiner* — Simon Kanaan
(74) *Attorney, Agent, or Firm* — Banner & Witcoff, Ltd.

(57) ABSTRACT

A system is disclosed that includes components and features for enabling enterprise users to securely access enterprise resources (documents, data, application servers, etc.) using their mobile devices. An enterprise can use some or all components of the system to, for example, securely but flexibly implement a BYOD (bring your own device) policy in which users can run both personal applications and secure enterprise applications on their mobile devices. The system may, for example, implement policies for controlling mobile device accesses to enterprise resources based on device attributes (e.g., what mobile applications are installed), user attributes (e.g., the user's position or department), behavioral attributes, and other criteria. Client-side code installed on the mobile devices may further enhance security by, for example, creating a secure container for locally storing enterprise data, creating a secure execution environment for running enterprise applications, and/or creating secure application tunnels for communicating with the enterprise system.

24 Claims, 40 Drawing Sheets

(51) Int. Cl.
*H04L 29/06* (2006.01)
*G06F 21/10* (2013.01)
*G06F 9/45* (2006.01)
*G06F 21/14* (2013.01)
*H04W 4/02* (2009.01)
*H04W 12/08* (2009.01)

(52) U.S. Cl.
CPC ............... *H04L 63/10* (2013.01); *H04W 4/02* (2013.01); *H04W 12/06* (2013.01); *H04W 12/08* (2013.01); *G06F 21/62* (2013.01)

(56) References Cited

U.S. PATENT DOCUMENTS

| | | | |
|---|---|---|---|
| 6,154,172 A | 11/2000 | Piccionelli et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,415,498 B2 | 8/2008 | Russo et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,697,737 B2 | 4/2010 | Aull et al. |
| 7,761,523 B2 | 7/2010 | May et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,078,713 B1 | 12/2011 | Kim |
| 8,085,891 B2 | 12/2011 | Owen |
| 8,095,517 B2 | 1/2012 | Sandoval et al. |
| 8,095,786 B1 * | 1/2012 | Kshirsagar et al. ........... 713/152 |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B1 | 8/2012 | Cohen |
| 8,245,285 B1 * | 8/2012 | Ravishankar et al. ............ 726/9 |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,402,011 B1 | 3/2013 | Bodenhamer |
| 8,418,238 B2 | 4/2013 | Platt et al. |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,613,070 B1 | 12/2013 | Borzycki et al. |
| 8,650,620 B2 | 2/2014 | Chawla et al. |
| 8,660,530 B2 | 2/2014 | Sharp et al. |
| 8,719,898 B1 | 5/2014 | Barton et al. |
| 8,843,734 B2 | 9/2014 | Lim |
| 8,850,010 B1 | 9/2014 | Qureshi |
| 8,850,049 B1 | 9/2014 | Qureshi |
| 8,856,909 B1 | 10/2014 | Chickering |
| 8,863,298 B2 | 10/2014 | Akella et al. |
| 8,863,299 B2 | 10/2014 | Sharma et al. |
| 8,881,228 B2 | 11/2014 | Qureshi |
| 8,918,834 B1 | 12/2014 | Samuelsson |
| 8,931,038 B2 | 1/2015 | Pulier et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0131245 A1 | 7/2003 | Linderman |
| 2003/0157947 A1 | 8/2003 | Fiatal et al. |
| 2003/0229623 A1 | 12/2003 | Chang et al. |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2005/0055578 A1 | 3/2005 | Wright et al. |
| 2005/0076082 A1 | 4/2005 | Le Pennec et al. |
| 2005/0076085 A1 | 4/2005 | Budd et al. |
| 2005/0097608 A1 | 5/2005 | Penke et al. |
| 2005/0149340 A1 | 7/2005 | Murakami et al. |
| 2005/0172241 A1 | 8/2005 | Daniels et al. |
| 2005/0193222 A1 | 9/2005 | Greene |
| 2005/0255838 A1 | 11/2005 | Adams et al. |
| 2005/0262429 A1 | 11/2005 | Elder et al. |
| 2005/0273592 A1 | 12/2005 | Pryor et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0224742 A1 | 10/2006 | Shahbazi |
| 2006/0225142 A1 | 10/2006 | Moon |
| 2006/0242685 A1 | 10/2006 | Heard et al. |
| 2006/0256739 A1 | 11/2006 | Seier et al. |
| 2006/0259755 A1 | 11/2006 | Kenoyer |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0109983 A1 | 5/2007 | Shankar et al. |
| 2007/0118558 A1 | 5/2007 | Kahandaliyanage |

(56) References Cited

U.S. PATENT DOCUMENTS

| | | |
|---|---|---|
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0283324 A1 | 12/2007 | Geisinger |
| 2008/0027982 A1 | 1/2008 | Subramanian et al. |
| 2008/0046580 A1 | 2/2008 | Lafuente et al. |
| 2008/0047006 A1 | 2/2008 | Jeong et al. |
| 2008/0047015 A1 | 2/2008 | Cornwall |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0304665 A1 | 12/2008 | Ma et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199178 A1 | 8/2009 | Keller et al. |
| 2009/0199277 A1 | 8/2009 | Norman et al. |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0282473 A1 | 11/2009 | Karlson et al. |
| 2009/0323916 A1 | 12/2009 | O'Sullivan et al. |
| 2009/0325615 A1 | 12/2009 | McKay et al. |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0192212 A1 | 7/2010 | Raleigh |
| 2010/0228825 A1 | 9/2010 | Hegde et al. |
| 2010/0229197 A1 | 9/2010 | Yi et al. |
| 2010/0248699 A1 | 9/2010 | Dumais |
| 2010/0257580 A1 | 10/2010 | Zhao et al. |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0072492 A1 | 3/2011 | Mohler et al. |
| 2011/0145833 A1 | 6/2011 | De Los Reyes et al. |
| 2011/0154266 A1 | 6/2011 | Friend et al. |
| 2011/0154477 A1 | 6/2011 | Parla et al. |
| 2011/0154498 A1 | 6/2011 | Fissel et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0314534 A1 | 12/2011 | James |
| 2012/0002813 A1* | 1/2012 | Wei et al. ............... 380/270 |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023506 A1 | 1/2012 | Maeckel et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131685 A1 | 5/2012 | Broch et al. |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |

(56) References Cited

U.S. PATENT DOCUMENTS

| | | |
|---|---|---|
| 2012/0185913 A1 | 7/2012 | Martinez et al. |
| 2012/0191716 A1 | 7/2012 | Omoigui |
| 2012/0198570 A1 | 8/2012 | Joa et al. |
| 2012/0204220 A1 | 8/2012 | Lavi |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238257 A1 | 9/2012 | Anson |
| 2012/0240183 A1 | 9/2012 | Sinha |
| 2012/0254768 A1 | 10/2012 | Aggarwal et al. |
| 2012/0265792 A1 | 10/2012 | Salters |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013932 A1 | 1/2013 | Kong et al. |
| 2013/0014239 A1 | 1/2013 | Pieczul et al. |
| 2013/0024424 A1 | 1/2013 | Prahlad et al. |
| 2013/0024928 A1 | 1/2013 | Burke et al. |
| 2013/0035063 A1 | 2/2013 | Fisk et al. |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0074142 A1 | 3/2013 | Brennan et al. |
| 2013/0084847 A1 | 4/2013 | Tibbitts et al. |
| 2013/0086684 A1 | 4/2013 | Mohler |
| 2013/0091543 A1 | 4/2013 | Wade et al. |
| 2013/0097421 A1 | 4/2013 | Lim |
| 2013/0111540 A1 | 5/2013 | Sabin |
| 2013/0117240 A1 | 5/2013 | Taylor et al. |
| 2013/0117805 A1 | 5/2013 | Kent et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227659 A1 | 8/2013 | Raleigh |
| 2013/0232541 A1 | 9/2013 | Kapadia et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311593 A1 | 11/2013 | Prince et al. |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047535 A1 | 2/2014 | Perla et al. |
| 2014/0059640 A9 | 2/2014 | Raleigh et al. |
| 2014/0059642 A1 | 2/2014 | Deasy et al. |
| 2014/0130174 A1 | 5/2014 | Celi, Jr. et al. |
| 2014/0173700 A1 | 6/2014 | Awan et al. |
| 2014/0181934 A1 | 6/2014 | Mayblum et al. |
| 2014/0189808 A1 | 7/2014 | Mahaffey et al. |
| 2014/0315536 A1 | 10/2014 | Chow et al. |
| 2015/0087270 A1 | 3/2015 | Richardson et al. |

FOREIGN PATENT DOCUMENTS

| | | |
|---|---|---|
| EP | 2428894 A1 | 3/2012 |
| EP | 2523107 A1 | 11/2012 |
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2010115289 A1 | 10/2010 |

OTHER PUBLICATIONS

Restriction Requirement issued in U.S. Appl. No. 13/649,071 mailed Nov. 22, 2013.

International Search Report and Written Opinion mailed Nov. 26, 2013 in International Application No. PCT/US2013/060388.

Xuetao Wei, et al., "Malicious Android Applications in the Enterprise: What Do They Do and How Do We Fix It?" ICDE Workshop on Secure Data Management on Smartphones and Mobiles, Apr. 2012, 4 pages.

Notification of Concurrently Filed Applications in 1 page.

Wright et al., "Your Firm's Mobile Devices: How Secure are They?". Journal of Corporate Accounting and Finance. Jul. 1, 2011. Willey Periodicals. pp. 13-21.

Lowe, "Application-Specific VPNs," Dec. 13, 2005.

Ranjan et al., "Programming Cloud Resource Orchestration Framework: Operations and Research Challenges", arvix.org, 2012, pp. 1-19.

(56) References Cited

OTHER PUBLICATIONS

Na et al., "Personal Cloud Computing Security Framework," 2010 IEEE Asia-Pacific Computing Conference, 2010, pp. 671-675.
Wilson et al., "Unified Security Framework", In proceedings of the 1st International Symposium on Information and Communication Technologies, pp. 500-505. Trinity College Dublin, 2003.
Mysore et al., "The Liquid Media System—a Multi-Device Streaming Media Orchestration Framework", Ubicomp 2003 Workshop, pp. 1-4.
Written Opinion and International Search Report, PCT/US2013/062636, Jan. 10, 2014.
International Search Report and Written Opinion dated Feb. 4, 2014 in Application No. PCT/US2013/064349.
International Search Report and Written Opinion mailed Jan. 21, 2014 in International Application No. PCT/US2013/063856.
Apple Inc., iPad User Guide for iOS 6.1 Software, Jan. 2013, Chapter 26, Accessibility, pp. 107-108.
Andreas, Digging into the Exchange ActiveSync Protocol, Mobility Dojo.net, Oct. 25, 2010, http://mobilitydojo.net/2010/03/17/digging-into-the-exchange-activesync-protocol/.
Oct. 20, 2014—(PCT) International Search Report—App. PCT/US2014/036382.

* cited by examiner

PROVIDING SECURE MOBILE DEVICE ACCESS TO ENTERPRISE RESOURCES USING APPLICATION TUNNELS

INCORPORATION BY REFERENCE

The present application hereby incorporates by reference the entire technical disclosures of U.S. Provisional Patent Application Nos. 61/546,021, 61/546,922, 61/649,134, and 61/702,671. The present application also hereby incorporates by reference the entire technical disclosure of U.S. Pat. No. 7,788,536 to Qureshi et al. ("Qureshi '526").

BACKGROUND

1. Field

The present application relates generally to mobile computing devices (smartphones, tablets, PDAs, etc.) and associated application programs, and to systems for automated or semi-automated management of devices used for accessing managed resources of an enterprise.

2. Description of the Related Art

Many enterprises (e.g., corporations, partnerships, academic institutions, etc.) maintain enterprise computer networks that allow enterprise users to access enterprise resources, such as hardware and software applications for email, customer relationship management (CRM), document management, enterprise resource planning (ERP), and the like. Also, many enterprises allow users to access the enterprise network via mobile devices, such as smartphones, tablet computers, and the like. In some cases, software applications running on the mobile devices exchange data with the enterprise network, some of which can become saved on the memory hardware (e.g., hard drives, SD cards) of the mobile devices.

A growing trend among businesses is to allow employees to use their personally owned mobile devices both to access company resources and the use and access their personal applications and data. This trend, known as BYOD (bring your own device) or BYOT (bring your own technology), significantly complicates the task of protecting enterprise resources, including confidential and/or sensitive information.

BRIEF DESCRIPTION OF THE DRAWINGS

FIG. 21 shows an example of data logged by a mobile device gateway, which can be provided to an analytics service, in accordance with one embodiment.

FIG. 26 illustrates a user interface (e.g., web page) for enabling an administrator to create a tunnel between a mobile device and an application server.

Figure 1A:
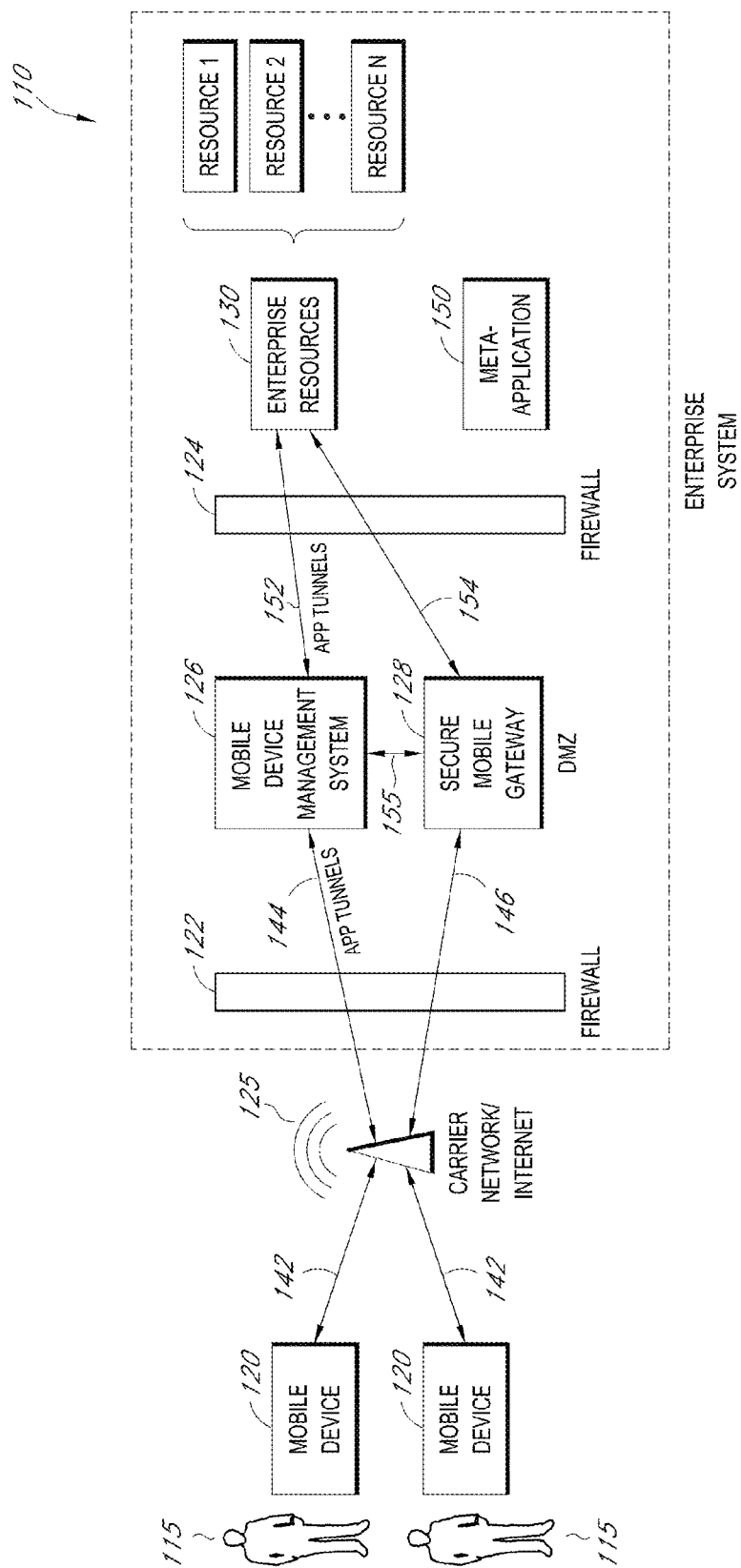
FIG. 1A is a schematic illustration of an embodiment of an enterprise computer system and mobile computing devices associated with the enterprise.

Reference numerals used in this specification are generally based on the first figure (in the above listing) in which the numeral appears. A reference numeral with a value between 100-199 first appears in FIG. 1, a reference numeral with a value between 200-299 first appears in FIG. 2, and so on.

Skilled artisans will appreciate that while certain figures of the present disclosure illustrate numerous items, these figures illustrate certain embodiments, and other embodiments may involve more or less than the items shown.

DETAILED DESCRIPTION OF SPECIFIC EMBODIMENTS

Various inventions and inventive features will now be described with reference to the drawings. As will be recognized, many of the disclosed features and associated components can be used independently of others, and can be implemented differently than described herein. Thus, nothing in this detailed description (or in the preceding background section) is intended to imply that any particular feature, component or characteristic of the disclosed systems is essential. Moreover, it will be understood that headings are provided for convenience and do not necessarily affect the scope or meaning of the claims.

Introduction

The architecture described in this specification can be used by a corporation or other enterprise to flexibly implement a policy, such as a corporate owned device, BYOD (bring your own device) policy, for allowing enterprise users to use their mobile devices to securely access enterprise resources (documents, confidential data, corporate application and database servers, etc.). This is accomplished through various security features that, for example, enable the enterprise to specify and implement policies for controlling mobile device accesses to particular enterprise resources. The policies may, for example, control mobile device accesses to enterprise resources based on a variety of criteria, such as the role of the respective user (e.g., which department the user is in), the configuration of the mobile device (e.g., whether any blacklisted mobile applications are installed), the logged behaviors of the user, the location of the mobile device, and/or the time at which access to the enterprise resource is requested. The architecture further enhances security, in some embodiments, by creating application tunnels that enable enterprise mobile applications to securely communicate over a network with the enterprise system. The architecture may also enable IT staff to selectively (and remotely) wipe a user's mobile device of enterprise application(s) and corporate data when, for example, the user discontinues employment or violates a corporate policy (such as if they jailbreak their device or otherwise use it in a disallowed configuration).

As described in the section titled "Protecting Attachment Data," the disclosed architecture may also implement an attachment encryption policy in which encryption is applied to email attachments (or attachments to other types of messages, such as SMS messages) that are sent to mobile devices of enterprise users. This feature reduces the likelihood that an unauthorized user who obtains access to an enterprise member's mobile device will be able to access sensitive enterprise documents that have been sent between enterprise users as attachments.

The disclosed architecture, in some embodiments, advantageously enables end users to concurrently run both enterprise mobile applications (those configured or authorized to access enterprise resources) and personal (non-enterprise) mobile applications on the same mobile device, without compromising security. This may be accomplished in part through mobile device software that creates a secure environment or shell in which the enterprise mobile applications can run and store data. This secure environment or shell may, for example, prevent the personal applications installed on a mobile device from accessing the documents and other data stored on the mobile device by the enterprise applications. In some embodiments, a secure launcher that runs on the mobile devices augments the mobile operating system's UI with a UI for launching the enterprise mobile applications installed on the mobile device. When a user launches an enterprise mobile application, the user may, for example, be presented with an authentication screen for entering a personal passcode that is necessary for running the enterprise mobile applications.

The use of passcodes (or other types of authentication information) for enterprise applications reduces the likelihood that enterprise resources will be improperly accessed when, for example, the mobile device is lost or stolen, or when the mobile device is used by an employee's children to play games. In some embodiments, the secure launcher (or another component installed on the mobile device) further reduces this risk by performing a selective wipe of the mobile device when, for example, the user attempts but fails to enter a valid passcode a threshold number of consecutive times (e.g., 5 or 10). The selective wipe operation deletes some or all of the enterprise applications and associated data from the mobile device, without deleting any personal applications or data. In some embodiments, the enterprise's IT department can initiate a selective wipe of a particular mobile device by remotely issuing a wipe command to the device.

The architecture may also support various other types of remedial actions for protecting enterprise resources. One such remedy is to lock the mobile device, or an enterprise container on the device that stores enterprise data, such that the mobile device or container can only be unlocked with a valid code provided by IT staff. In some embodiments, these and other types of remedies can be invoked automatically based on conditions detected on the mobile device, or can be remotely initiated by IT staff.

This specification also discloses processes for creating or augmenting mobile applications to enable them to use various enterprise security features. One such approach is described below under the heading "Modifying Behaviors of Pre-Existing Mobile Applications." Using this approach, an organization can modify existing mobile applications to add various security features without the need to access the source code of such applications. The mobile application being modified may, for example, be a custom enterprise application, or may be a commercially available mobile application that is being configured for use within the enterprise. Through this process, the preexisting mobile application may, for example, be configured to (a) use application tunnels to communicate with the enterprise system, (b) use an encryption library to encrypt the documents and other data it stores on the mobile device, (c) present users with a login or passcode screen when the mobile application is launched, (d) disable cut, copy and paste operations, (e) disable offline access, (f) use a particular type of user authentication method, such as posture based authentication, or any combination thereof. The ability to modify preexisting mobile applications through this process gives enterprises greater flexibility in selecting mobile applications to offer to their members; for example, rather than requiring employees to use a custom-developed enterprise application for accessing cloud-based storage, the enterprise can modify (or have modified) a popular, commercially-available mobile application with which users are already familiar. Further, different versions of a given application (with different authentication methods, encryption levels, etc.) can be created for different types of employees.

Also disclosed are processes for effectively adding enterprise security features to mobile applications with little or no need to modify the application code of such applications. One such approach involves the use of a secure virtual machine that is separate from the virtual machine of the mobile device's operating system. The secure virtual machine implements or provides access to various enterprise security features (such as application tunnels, data encryption, passcode prompts, etc.), and these security features are effectively inherited by or imposed upon the mobile applications that run within the secure virtual machine. Enterprise mobile applications may be configured or forced to use the secure virtual machine, while non-enterprise mobile applications continue to run within the native virtual machine of the mobile operating system. This capability gives enterprises additional freedom to flexibly select mobile applications to use as enterprise applications; for example, through this approach, an enterprise can effectively configure the mobile devices of users to enable the users to use a popular/familiar mobile application to securely access enterprise resources.

The use of a secure virtual machine can enable an enterprise to provide a higher level of security for running an enterprise application on BYOD devices. For example, by running the application within a secure execution environment created by the secure virtual machine, a corporation can enforce a separate set of policies for the application, including networking and storage policies.

Another approach, which is described under the heading "Secure Web Browser," involves the use of a mobile browser application that implements the various enterprise security features. Like the secure virtual machine approach, mobile applications (or web pages accessed by the browser) that are configured to run within the secure browser effectively inherit the security mechanisms implemented by the secure browser. The use of such a secure browser also enables an enterprise to implement a content filtering policy in which, for example, employees are blocked from accessing certain web sites from their mobile devices. The secure browser can be used, for example, to enable mobile device users to access a corporate intranet without the need for a virtual private network (VPN).

The disclosed architecture can also include a meta-application or system that monitors the overall enterprise system, including the mobile devices of enterprise users. The meta-application can operate generally as described in Qureshi '526, and can be implemented as a cloud based meta-application. The data collected by the meta-application can include data collected and reported by enterprise agents running on the mobile devices. In some embodiments, the meta-application generates rules based on observed behaviors, including behaviors of mobile device users. These rules can include gateway rules that are used by a secure mobile gateway to grant and deny mobile device requests to access enterprise resources.

These and other security features and components are described in detail in the following sections. As will be recognized, many of the disclosed features and components can be used independently of others. Thus, nothing in the following description should be taken to imply that certain security features and components must be used in combination.

System Overview and Terminology

In many cases, when a mobile computing device accesses an enterprise computer/IT system, sensitive data associated with the enterprise and/or enterprise-related software applications can become stored onto the mobile device. Enterprise-related data can comprise any data associated with the enterprise, such as, without limitation, product information, sales data, customer lists, business performance data, proprietary know-how, inventions, trade secrets, and the like. Since this information can be very sensitive, an enterprise may wish to safeguard such information.

Further, enterprises may wish to regulate how users use their mobile devices. For example, enterprises may want some control over where the mobile devices are used, which mobile device features can be used, which software applications can be installed and/or run on the devices, and the like. Enterprises also have a need to control and implement remedial actions for users that violate their mobile device usage policies.

When users in the field experience problems with their mobile devices or could benefit from information, data, software, or coaching on how to perform certain operations using the devices, it can be difficult for the enterprise's IT support to provide highly effective assistance. Accordingly, there is also a need for improved secure management and technical support of mobile devices associated with an enterprise.

Embodiments described in the present application address these and other concerns. The present application discloses computer systems and methods for automated or semi-automated management of mobile computing devices that access an enterprise computer network, such as access to computer-implemented resources of the enterprise. As used herein, an "enterprise" may comprise substantially any type of organization, including, without limitation, a business, partnership, corporation, and the like. A "mobile computing device" can comprise any of a wide variety of devices, such as, without limitation, a mobile phone, smartphone, personal digital assistant, tablet computer, handheld computing device, and the like. The mobile devices managed by the disclosed system may, for example, include or consist of mobile devices that run the Android™, IOS, or Windows Mobile operating system (or some subset thereof). As will be recognized, however, the architecture disclosed herein may be used with other mobile device operating systems, including operating systems that may be developed in the future.

Individuals, entities, or groups of users that use mobile computing devices to access the enterprise computer network are referred to herein as "users." Users can comprise members of the enterprise, such as employees, partners, officers, etc. Alternatively, users can comprise individuals or entities that are not members of the enterprise, but nevertheless have a need or reason to access the enterprise computer network. For example, users can be enterprise customers, suppliers, etc.

An "enterprise resource" may comprise a machine-accessible resource associated with the enterprise. Enterprise resources can comprise any of a wide variety of different types of resources, including resources that assist or enable users in the performance of the users' roles or duties associated with the enterprise. For example, enterprise resources can comprise raw data stored on non-transitory computer-readable storage, documents stored on non-transitory computer-readable storage, computer hardware (e.g., physical servers), software applications stored on non-transitory computer-readable storage, macros for software applications (e.g., word processor macros) stored on non-transitory computer-readable storage, electronic mail systems, workspaces, customer relationship management (CRM) systems, document management systems, enterprise resource planning (ERP) systems, accounting systems, inventory systems, engineering tools, forms, style sheets, and many other resources. Enterprise resources can be configured to be accessed and used by software applications installed and running on mobile computing devices.

FIG. 1A is a schematic illustration of an embodiment of a computer system 110 associated with an enterprise, as well as one or more users 115 and mobile computing devices 120 associated with the enterprise. In this example, each mobile device 120 is assigned to one enterprise user 115, but alternatives are possible (e.g., multiple users 115 assigned to one device, and/or a single user assigned to multiple devices 120). The mobile devices 120 are preferably configured to communicate with the enterprise system 110 (also referred to herein as an "enterprise network") over a communication network 125. The communication network 125 can comprise a wireless carrier network, the Internet, a wide area network, a WIFI network, and the like. Hence, the network 125 can comprise, for example, one or more wireless networks, one or more wired networks, or a combination of wired and wireless networks. Additionally, an enterprise system 110 can be configured to be accessed by non-mobile computing devices, such as desktop computers.

The enterprise system 110 preferably includes an external firewall 122 and an internal firewall 124. Each firewall 122, 124 can comprise a device or set of devices designed to permit or deny network transmissions based upon certain criteria. The firewalls 122 and 124 can comprise software stored on non-transitory computer-readable storage, hardware, firmware, or a combination thereof. The firewalls 122 and 124 can be configured to perform basic routing functions. Embodiments of the invention can cooperate with one or both of the firewalls 122 and 124 or other devices of the enterprise system 110 to filter mobile devices' access requests based on a set of gateway rules, in order to protect the enterprise system 110 from unauthorized access while permitting legitimate communications to pass. As will be described in further detail below, such access rules can be used to regulate access based on, e.g., mobile device properties, user properties, the specific enterprise resources 130 for which access is requested, or any combination thereof.

The physical or logical subnetwork between the two illustrated firewalls 122 and 124 can be referred to as the "demilitarized zone" (DMZ), or alternatively as a "perimeter network." Typically, the DMZ contains and exposes the enterprise's external services to a larger untrusted network, usually the Internet. Ordinarily, the purpose of the DMZ is to add an additional layer of security to the enterprise's local area network (LAN); an external attacker only has access to equipment in the DMZ, rather than any other part of the enterprise network.

The illustrated enterprise system 110 includes a mobile device management system 126, a secure mobile gateway 128, and a "meta-application" 150, each of which is described in further detail below. The enterprise system 110 also includes enterprise resources 130 logically positioned behind the internal firewall 124, illustrated as resources 1 to N. At least some of the enterprise resources 130 can be configured to be accessed and/or used by the mobile devices 120, such as by software applications installed and running on the mobile devices.

Referring still to FIG. 1A, the mobile devices 120 can communicate with the carrier network 125 via connections 142, such as cellular network connections and/or WIFI connections that ultimately connect to carrier networks. A mobile device's enterprise access request can be sent to the secure mobile gateway 128 via a connection 146, and the gateway 128 can send the request to an enterprise resource 1802 via an internal connection 154. Further, the enterprise system 110 can use the connections 142, 146 to send information back to the mobile device 120, such as data responsive to the device's enterprise access request.

In some embodiments, a software application on a mobile device 120 can communicate with an enterprise resource 130 through an application tunnel via connections 142, 144, and 152. Application tunnels are described in further detail below. In the illustrated embodiment, the mobile device management system 126 acts as a "tunneling mediator" within an application tunnel between the mobile device 120 (and typically a specific application running on the mobile device) and the enterprise resource 130.

Figure 1B:
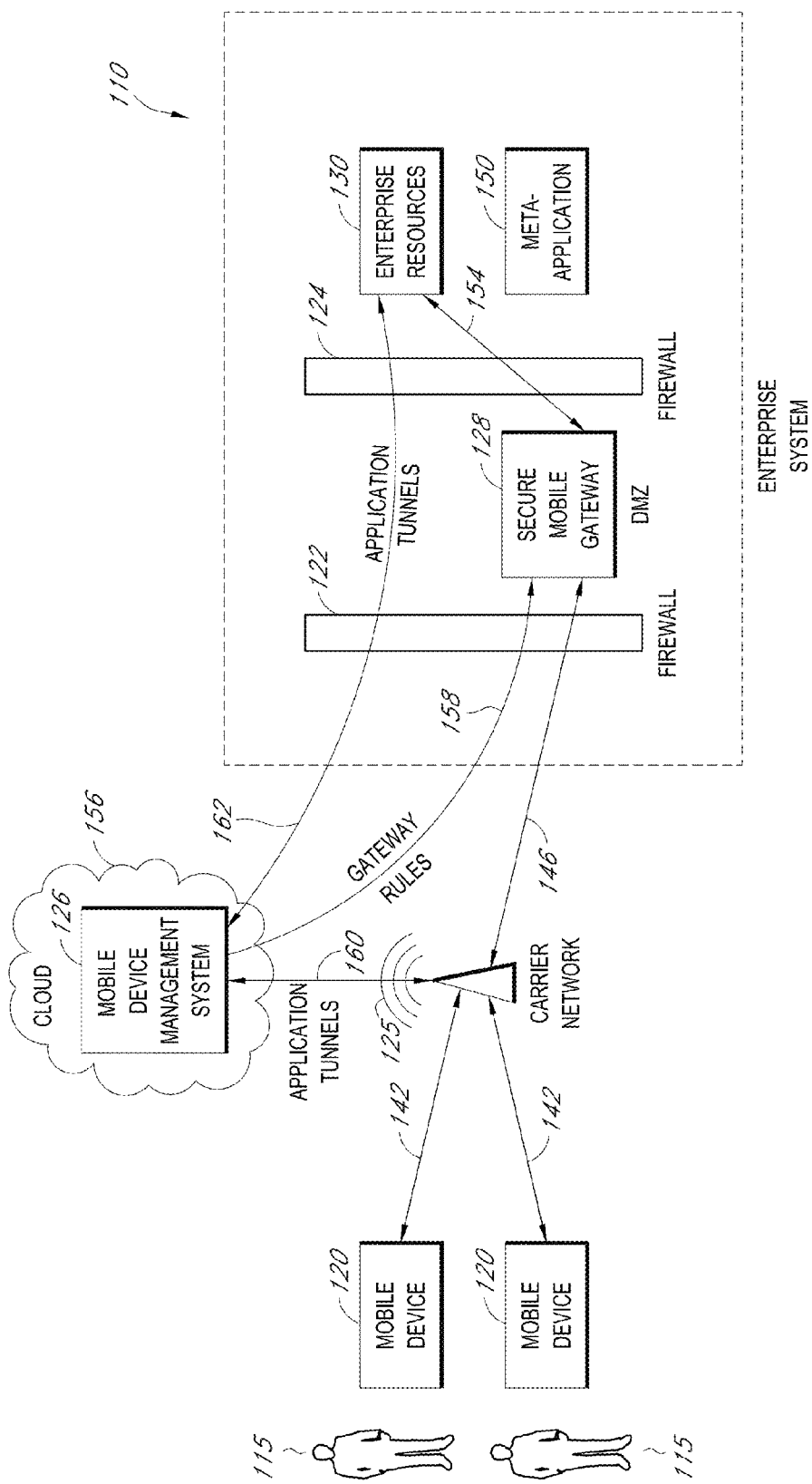
FIG. 1B is an embodiment similar to FIG. 1A, with the mobile device management system located in a cloud computing system ("the cloud").
Figure 1C:
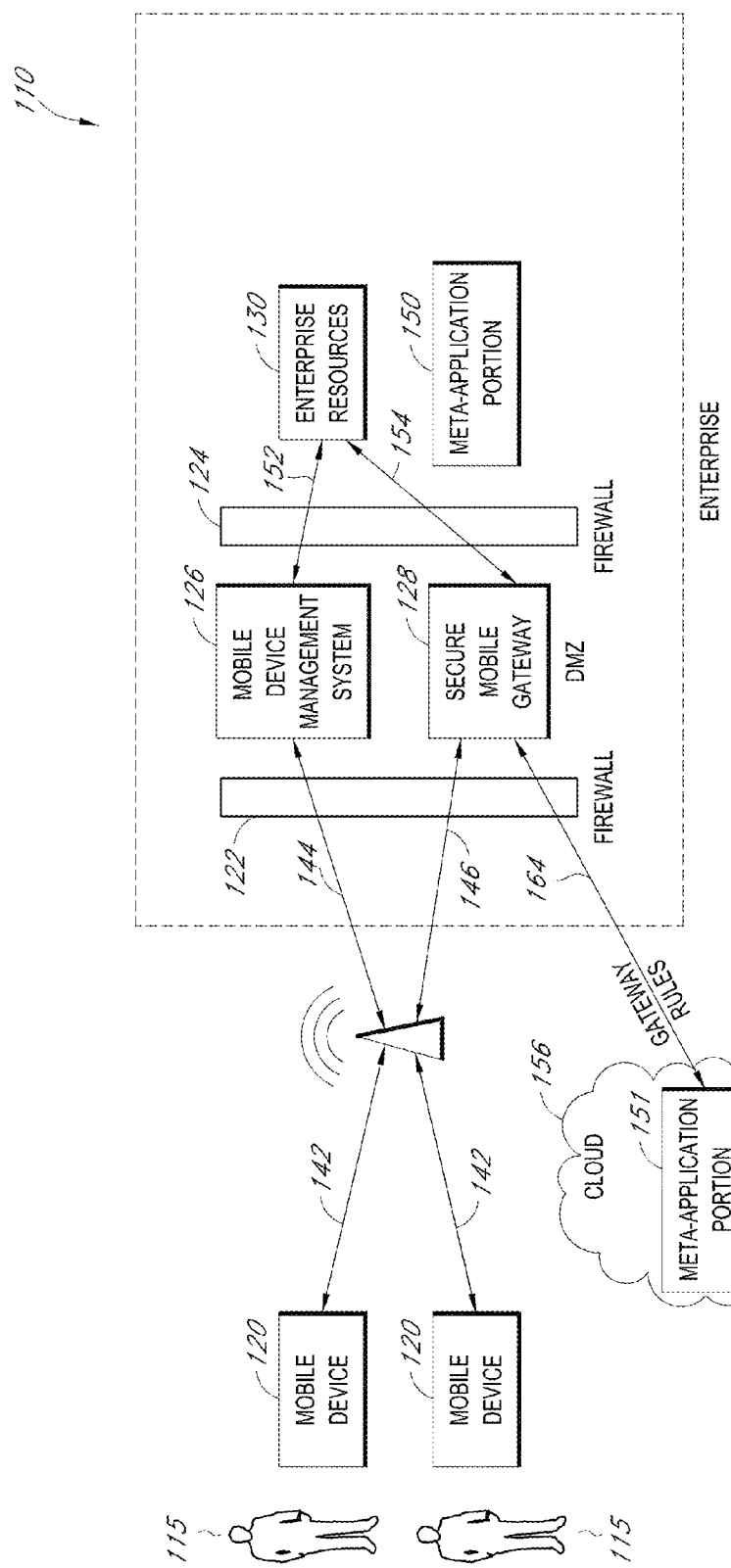
FIG. 1C is an embodiment similar to FIG. 1A, with the meta-application located in the cloud.

FIGS. 1B and 1C illustrate embodiments that are similar to FIG. 1A, except that the mobile device management system 126 and meta-application 150 are respectively located (completely or at least partially) in a cloud computing system or environment 156 ("the cloud"). (In a hybrid of these two approaches, both the mobile device management system 126 and meta-application 150 reside in the cloud.) A cloud computing system typically includes computing resources configured to implement a service over a network, such as the Internet. For example, a cloud computing system can include a plurality of distributed computing resources, such as physical servers or other computing devices. With a cloud computing system, computing resources can be located at any suitable location that is accessible via a network. A cloud computing system can store and process data received over a network, while being accessible from a remote location. Typically, a cloud computing system is operated by a service provider that charges the enterprise, and other users of the cloud based computing system, a usage fee for using the system. In certain embodiments, both the mobile device management system 126 and the meta-application 150 are located at least partially in the cloud 156. In the embodiment of FIG. 1B, the cloud-based device management system 126 can be configured to provide gateway rules to the secure mobile gateway 128 via a connection 158, as described in further detail below. Further, a software application on a mobile device 120 can communicate with an enterprise resource 130 through an application tunnel via connections 142, 160, and 162, with the mobile device management system 126 acting as a tunneling mediator. In the embodiment of FIG. 1C, the meta-application portion 151 located in the cloud 156 can be configured to provide gateway rules to the secure mobile gateway 128 via a connection 164, as described in further detail below. The meta-application 151 (or its rules engine) may alternatively be incorporated into the mobile device management system 126, in which case it may orchestrate the management of the mobile device management system 126.

Figure 1D:
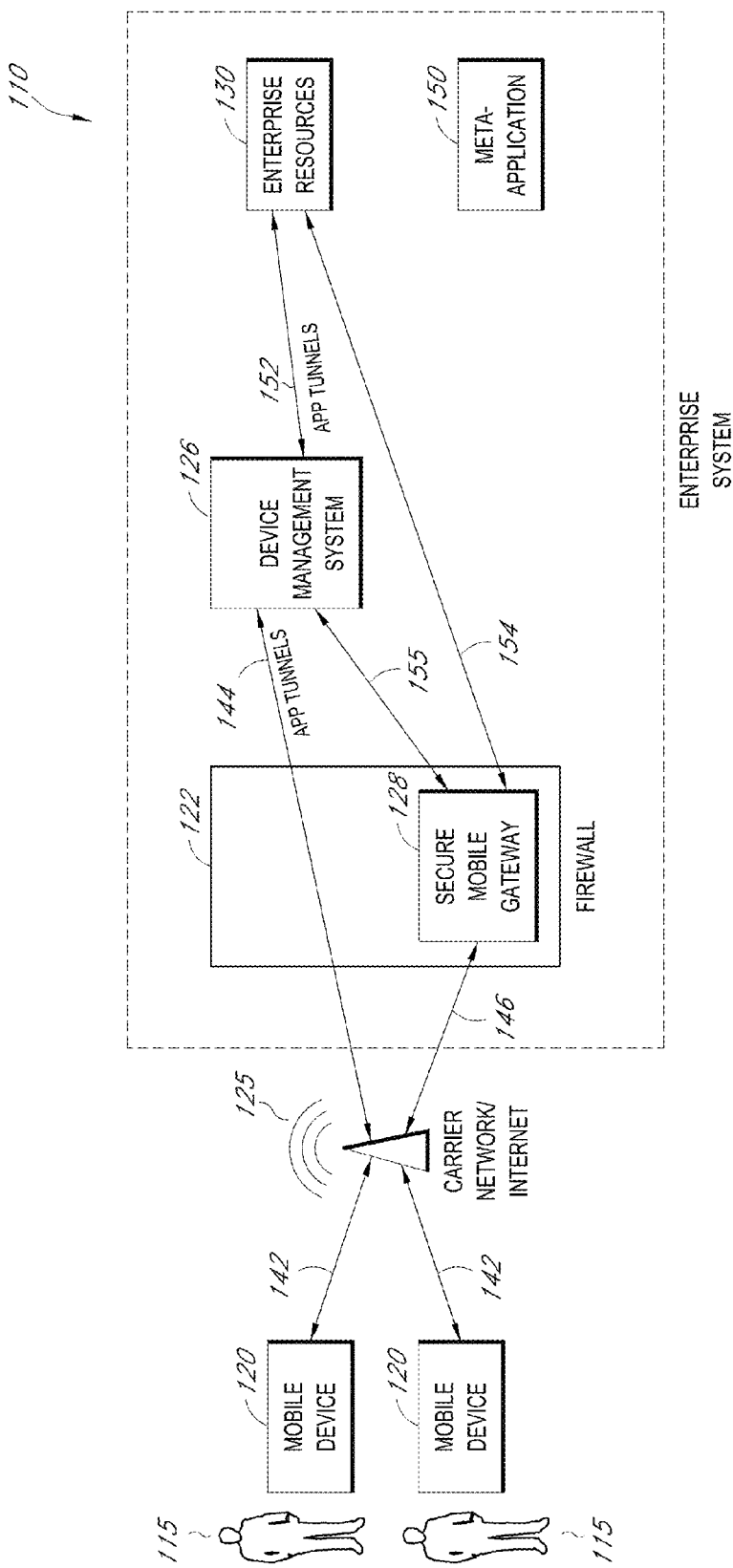
FIG. 1D is an embodiment similar to FIG. 1A, with the secure mobile gateway located in a firewall.

FIG. 1D is an embodiment similar to FIG. 1A, with the secure mobile gateway 128 implemented in the firewall 122. In the embodiment of FIG. 1D, the secure mobile gateway 128 can be implemented in a Threat Management Gateway (TMG) server. As illustrated in FIG. 1D, some embodiments of the enterprise system 110 can be implemented without an internal firewall 124.

Figure 1E:
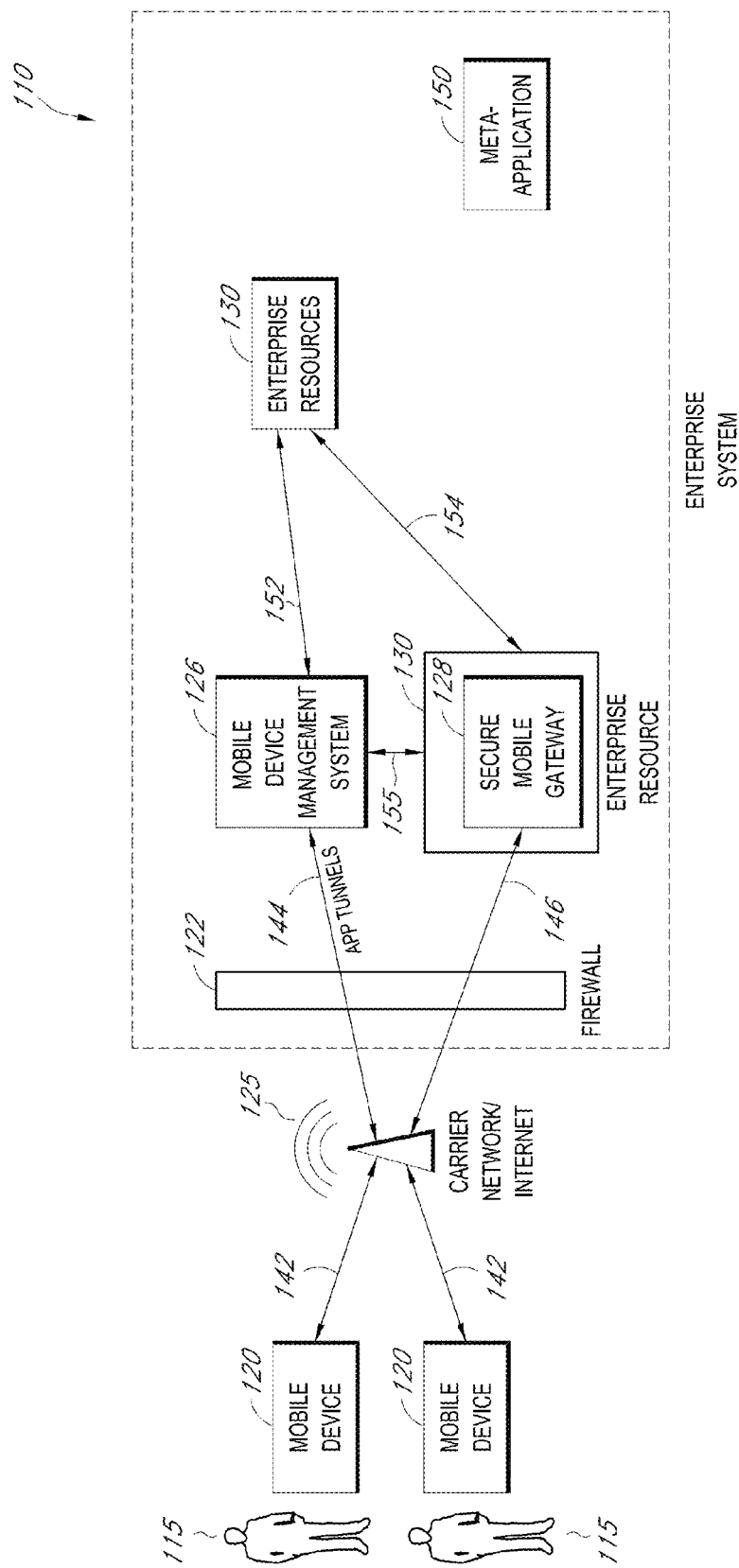
FIG. 1E is an embodiment similar to FIG. 1A, with the secure mobile gateway located in an enterprise resource.

FIG. 1E is an embodiment similar to FIG. 1A, with the secure mobile gateway 128 implemented in an enterprise resource 130. In the embodiment of FIG. 1E, the secure mobile gateway 128 can be implemented in an Internet Information Services (IIS) server. Such an IIS can be configured as an enterprise resource 130 and/or an internal firewall 124.

It will be understood that any of the enterprise systems 110 can be implemented with any of the principles and advantages described herein, as appropriate. Moreover, it will also be understood that the enterprise systems illustrated in FIGS. 1A-1E are provided for illustrative purposes, and other suitable systems can be implemented in accordance with the principles and advantages described herein.

Figure 2:
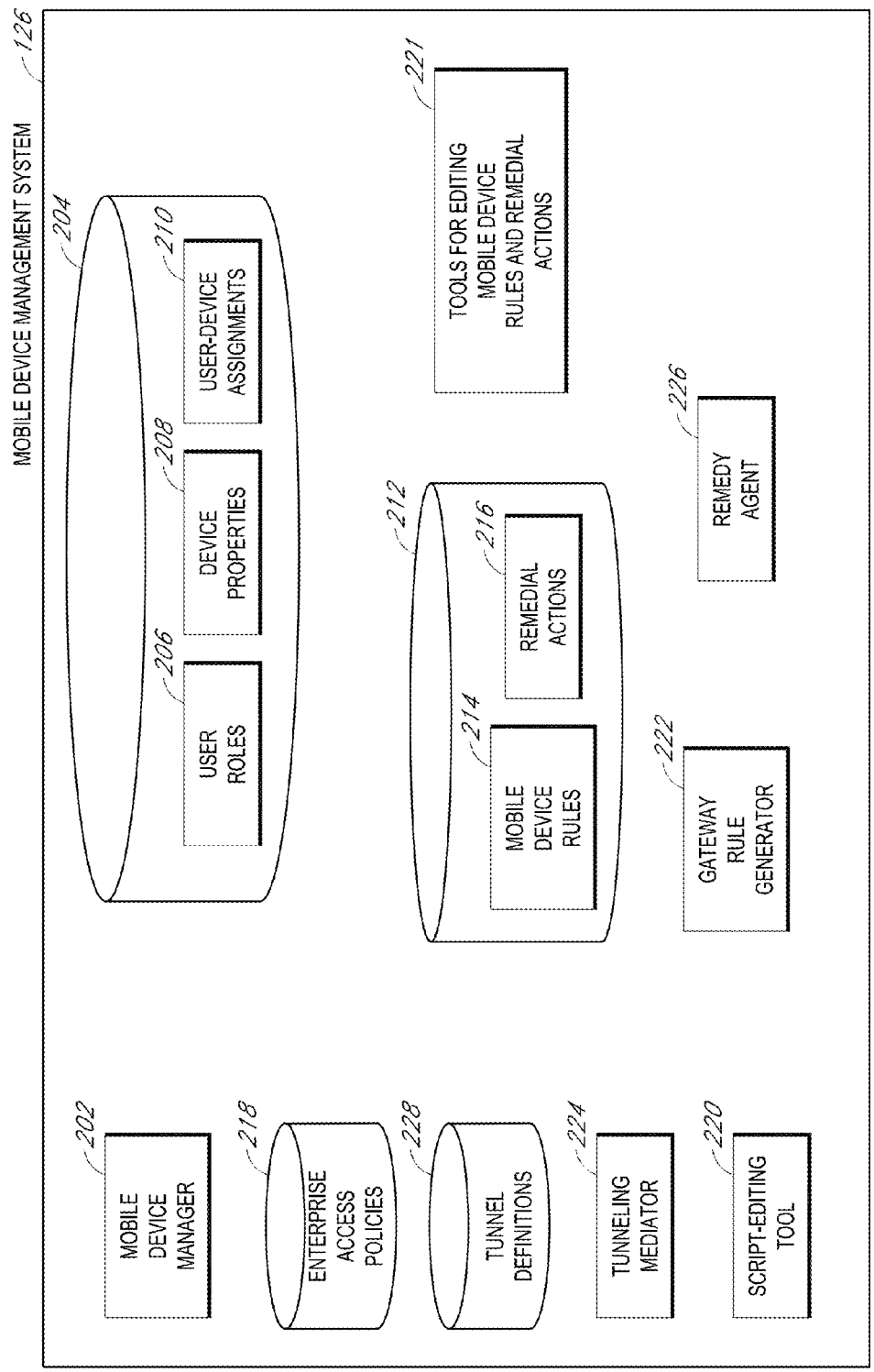
FIG. 2 is a schematic illustration of an embodiment of a mobile device management system of the enterprise computer system of FIG. 1A.

FIG. 2 is a schematic illustration of an embodiment of the mobile device management system 126 of FIG. 1A. The mobile device management system 126 can comprise a system of one or more computers, computer servers, storage devices, and other components. As explained in greater detail below, the mobile device management system 126 can be configured to manage or co-manage the application of "mobile device rules" 214 to the mobile computing devices 120, and/or to act as a "tunneling mediator" between the mobile devices 120 and the enterprise resources 130 during use of application tunnels therebetween. The mobile device management system 126 can also be configured to regulate mobile device access to the enterprise system 110, such as during use of such application tunnels. The illustrated components of the system 126 are described below.

Figure 3A:
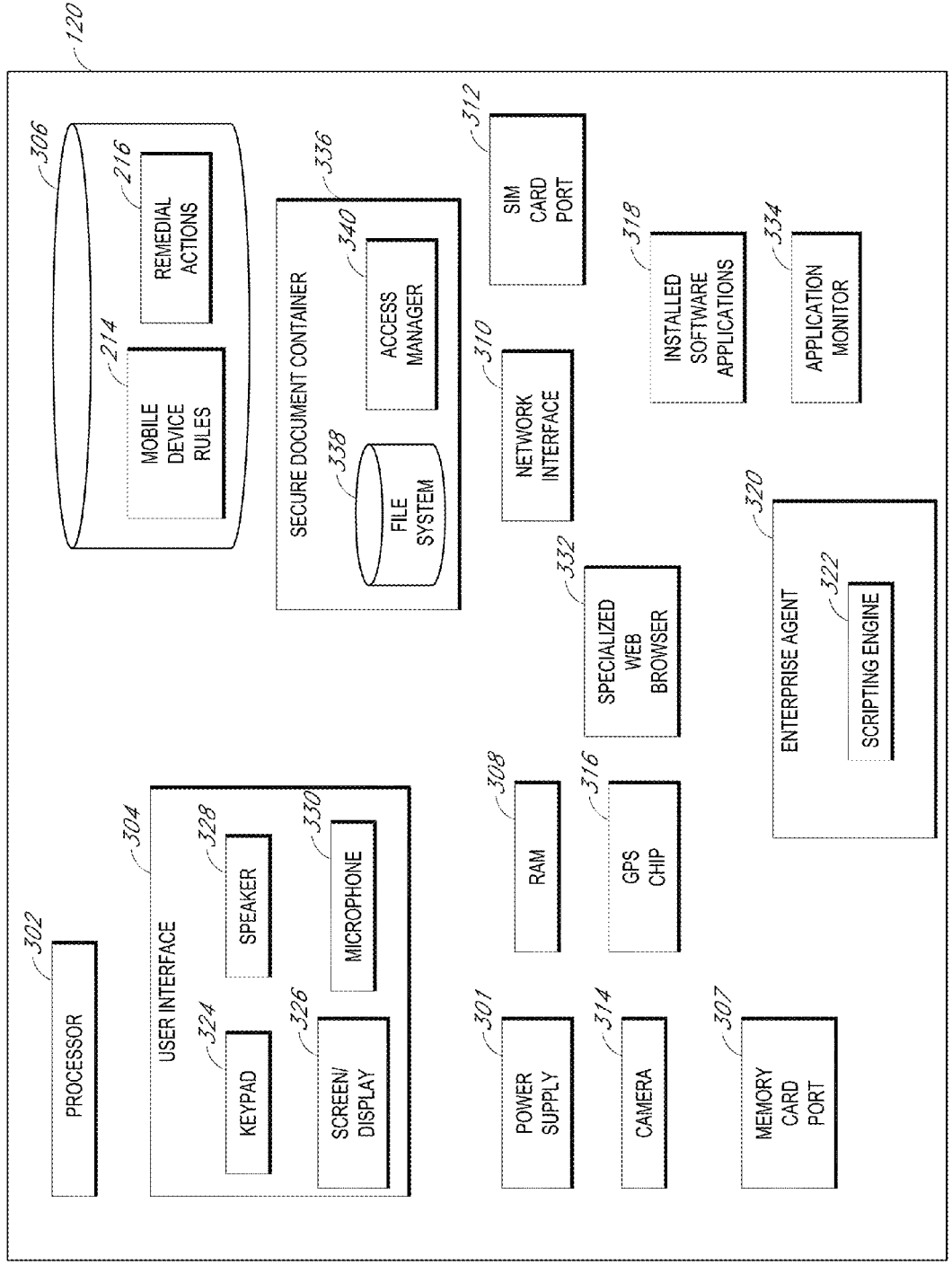
FIG. 3A is a schematic illustration of an embodiment of a mobile device.

FIG. 3A is a schematic illustration of an embodiment of a mobile computing device 120. The mobile device 120 can include a number of ordinary or standard components of a mobile device, such as a power supply 301, a processor 302, a user interface 304, a hard drive memory 306, a memory card (e.g., Secure Digital (SD) card) port 307, a random access memory 308, a network interface 310, a subscriber identification module (SIM) card port 312, a camera 314, and/or a GPS chip 316. The implementation and use of these components is generally well known and is not discussed herein in significant detail. The power supply 301 can include a battery port, battery, and/or a port for receiving electrical power from an external source (e.g., a standard electrical outlet). The processor 302 can be configured to execute software applications and various other executable components. The user interface 304 can include any of various known components, such as a keypad 324 (such as a set of physical buttons or, alternatively, a touchscreen keypad) for receiving text input, a screen or display 326 (which can be a touchscreen) for displaying text, images, and/or video, a speaker 328 or audio out port for producing audible output, and/or a microphone 330 for receiving audible input. The hard drive 306 can comprise any of a variety of different types of nonvolatile and/or non-transitory computer-readable storage. The memory card port 307 is configured to receive a memory card (e.g., an SD card) on which data can be stored. The random access memory 308 can be used to store data used during the running of various processes. The network interface 310 can be used to send and receive data over a network (e.g., the wireless network 125, which can operate in accordance with a number of standards, such as Wi-Fi, 3G, 4G, etc.). The SIM card port 312 is configured to receive a SIM card, as known in the art. The camera 314 can be configured to capture images and/or video. The GPS chip 316 can be configured to process GPS signals. The mobile device 120 can further include one or more installed software applications 318. The installed software applications 318 can be stored, for example, on the hard drive 306 or in non-volatile solid state storage. The installed applications can include both enterprise applications and personal applications. It will be appreciated that the mobile device 120 can include any other computer hardware components in place of or in addition to those illustrated in FIG. 3, such as an accelerometer, transceiver, battery charger, USB controller, baseband processor, audio codec, etc.

In the illustrated embodiment, the mobile device 120 includes an enterprise agent 320, which is preferably a software application or other executable program installed on the mobile device. The enterprise agent 320 is preferably separate from the operating system of the mobile device 120. In some embodiments, however, the enterprise agent 320 can be a component of the operating system of the mobile device or partially/fully embedded into the operating system of the mobile device 120. In various embodiments described in greater detail below, the enterprise agent 320 executes the mobile device rules 214 and cooperates with the enterprise system 110 to regulate the mobile device's access to the enterprise system 110, including to the enterprise resources 130. In some embodiments, an enterprise system 110 can prompt an enterprise agent 320 to connect to the system 110 (e.g., the mobile device management system 126) by sending a text message (e.g., SMS) to the mobile device 120, with a connection command.

The enterprise agent 320 can be installed onto the mobile device 120 as a condition of the mobile device's enrollment with the mobile device management system 126. The enterprise can employ an automated subsystem for installing enterprise agents 320 onto the mobile devices 120 associated (e.g., enrolled) with the enterprise. For example, a mobile device manager 202 can be configured to send the enterprise agents 320 to the mobile devices 120 for automated installation or manual installation by the users 115. Alternatively, IT personnel can manually install the enterprise agents 320 onto the mobile devices 120, or end users can download and install the enterprise agent 320 from commercially available application stores. Different types of enterprise agents 320 can be provided for different mobile device types, platforms, operating systems, etc. The mobile device manager 202 or another software component of the enterprise system 110 can be configured to select an appropriate enterprise agent 320 for each given mobile device 120, based on such properties of the mobile devices 120 (e.g., mobile device properties 208 of FIG. 2).

Enterprise Agent and Other Security Components Installed on Mobile Devices

The enterprise agent 320 may implement a variety of security-related features, including features that control (or enable the control of) mobile device accesses to enterprise resources 130. For example, the enterprise agent 320 installed on a given mobile device 120 may perform (i.e., instruct or cause the mobile device 120 to perform) some or all of the following tasks: (1) maintain a data connection with the enterprise system 110, which connection can be used both for application tunnels and for communications that do not involve application tunnels; (2) provide access to a public or private enterprise app store from which the user can download enterprise applications that have been approved by and configured for the particular enterprise; (3) create application tunnels for enabling enterprise applications installed on the mobile device to securely access certain enterprise resources, (4) collect, and transmit to the mobile device management system 126, "inventory" data regarding the properties and configuration of the mobile device, such as its manufacturer, model, operating system, screen size, memory size, memory availability, GPS coordinates, and which personal and enterprise mobile applications are installed on the device; (5) implement a log-in or other authentication service that requests and verifies the user's authentication information (e.g., passcode) when, for example, the user launches an enterprise mobile application; (6) decrypt encrypted message attachments received from the secure mobile gateway 128, such as encrypted attachments to email messages received from other members of the user's enterprise; (7) maintain a secure key store that is accessible by enterprise applications for obtaining keys for encrypting and decrypting data; (8) check for blacklisted mobile applications installed on the mobile device, and report any such applications to the mobile device management system; (9) perform precautionary actions, such as deleting decryption keys used for decrypting message attachments, when certain conditions are met, such as when a blacklisted mobile application is detected on the mobile device or the device is reported as stolen, (10) kill (terminate execution of) any blacklisted applications or other mobile applications determined to create a security risk, (11) provide one or more additional services for keeping enterprise applications and data on the device separate from personal application and data; and (12) wiping the device of all enterprise application and data (in response to a command received from the mobile device management system) when, for example, the user discontinues employment with the enterprise. As described below, some of these functions may alternatively be implemented in a separate mobile application or component that is distinct from the enterprise agent 320.

The enterprise agent 320 collects information about the mobile device's configuration using standard operating system APIs and mechanisms, and/or using its own APIs and mechanisms. For example, in implementations for the Android operating system, the enterprise agent may query the package manager to obtain a list of the applications installed on the device. The enterprise agent can similarly query the operating system for a list of mobile applications that are currently running, and can monitor broadcast messages to identify new applications that are being installed. The device configuration information collected by the enterprise agent through this process may be reported to the mobile device management system 126, which may use the information to generate rules that are applied by the secure mobile gateway 128 to control the mobile device's accesses to enterprise resources 130. The enterprise agent 320 may itself also use the collected device configuration information to take various precautionary actions, such as killing blacklisted mobile applications as mentioned above.

In one embodiment, the enterprise agent 320 is (or is part of) a mobile application that can be downloaded from an application store and installed on a mobile device 120. Once the enterprise agent has been installed and launched, the end user supplies configuration information, such as a corporate email address and email password, for enabling the agent to communicate with a particular enterprise system 110. Once configured, the agent 320 provides the user access to a secure application store from which the user can download and install enterprise mobile applications that have been approved by, and in some cases specifically configured for, the user's enterprise. The functionality for downloading and installing enterprise mobile applications may alternatively be embodied within a separate "secure launcher" mobile application that runs in conjunction with the enterprise agent.

Figure 3B:
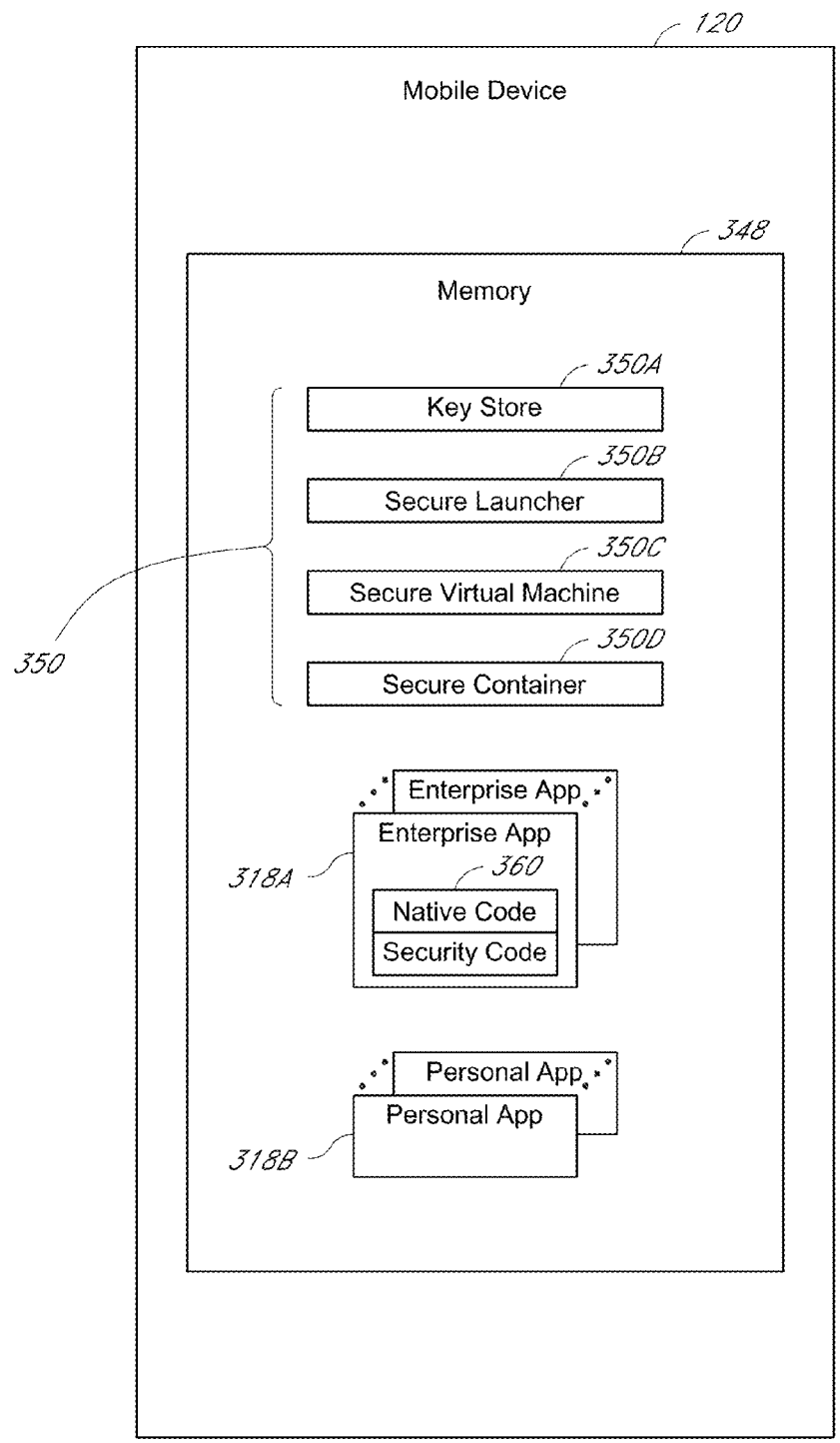
FIG. 3B illustrates security-related components and application that may be installed on a mobile device.

FIG. 3B illustrates some of the executable security-related components 350 that may be installed or implemented on a mobile device 120 with, or as part of, the enterprise agent 320. As will be recognized, some of these components 350 can be installed without others, and the illustrated components can be combined in various ways. One component is a key store 350A that stores one or more encryption keys. In one embodiment, the key store is implemented and managed by the enterprise agent 320, which enables the enterprise applications to access the key store to obtain encryption keys. A given enterprise application may, for example, use the encryption keys to encrypt files and other data stored to memory 348.

Figure 1G:
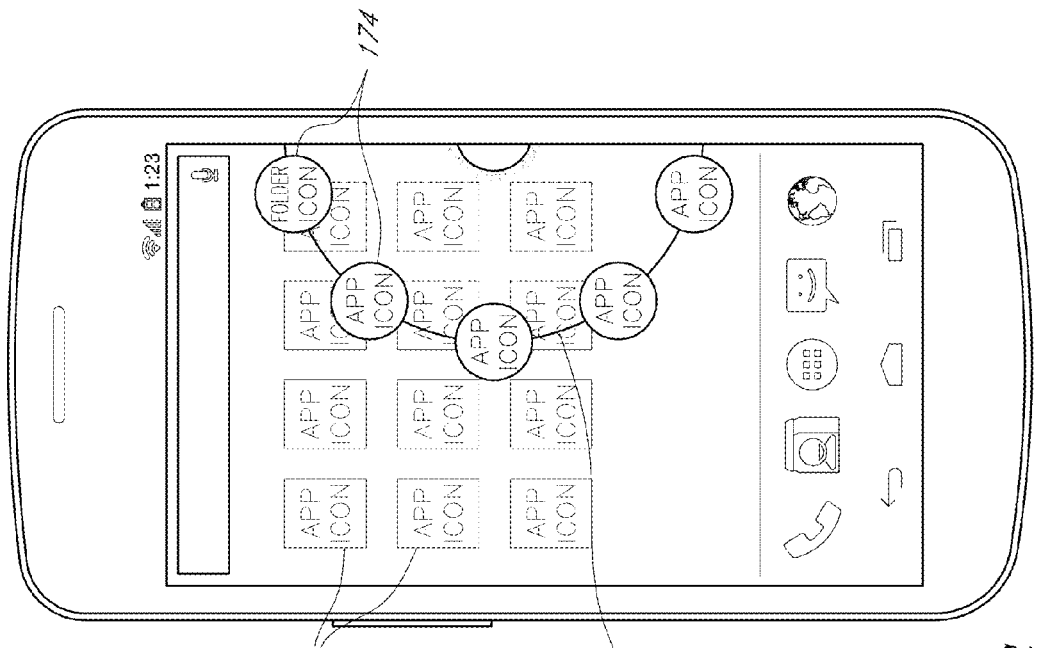
FIG. 1G illustrates the user interface for selecting and launching enterprise applications.
Figure 1F:
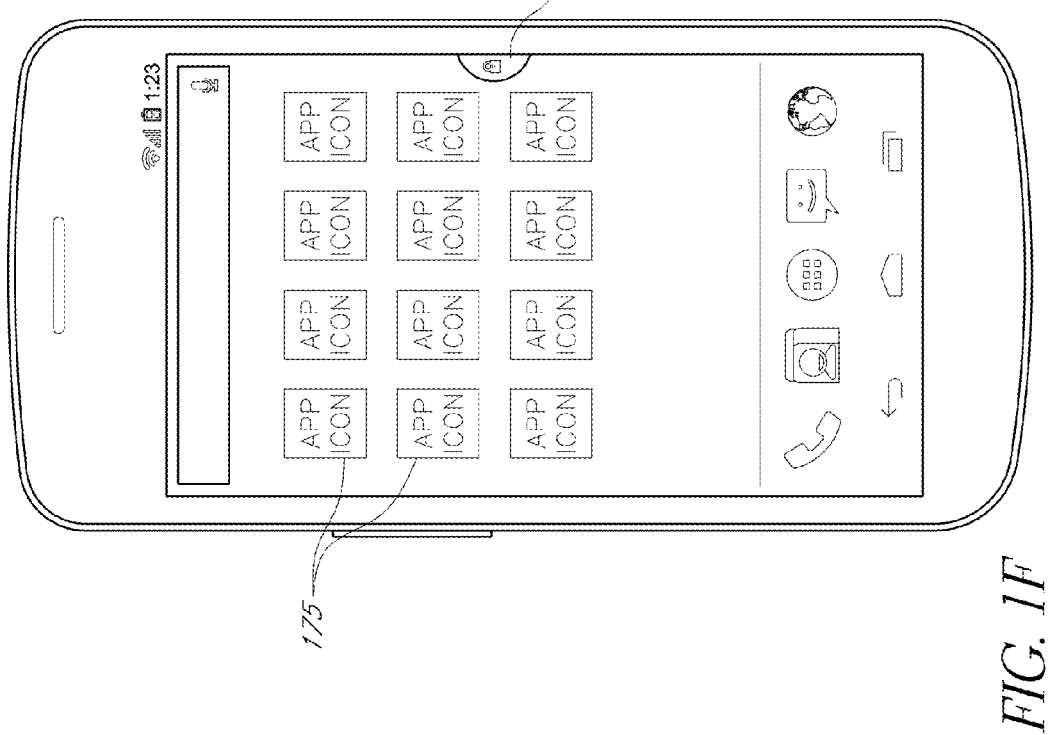
FIG. 1F illustrates a mobile device screen display which includes a selectable screen element for exposing a user interface for selecting and launching enterprise applications.

With further reference to FIG. 3B, a secure launcher 350B may also be installed on the mobile device 120 for launching enterprise applications. The secure launcher may be part of the enterprise agent 320, or may be a separate mobile application. The secure launcher 350B may implement or enforce various security policies, such as requiring user entry of a valid passcode when an enterprise application is launched. One embodiment of a user interface implemented by the secure launcher 350B is shown in FIGS. 1F and 1G and is described below. As described below, enterprise applications may be modified or written to use the secure launcher rather than the general launcher included in the mobile device's operating system. In one embodiment, the secure launcher also includes functionality for wiping the mobile device 120 of all enterprise applications and data in response to a threshold number of consecutive invalid passcode entry attempts, or in response to a remotely issued command from the enterprise's IT department.

As further shown in FIG. 3B, a secure virtual machine 350C may be installed on the mobile device 120 in some embodiments to create or augment a secure execution environment for running some or all of the enterprise applications. This secure virtual machine (VM) supplements, and may run concurrently with, the mobile operating system's default VM. For example, one or more enterprise mobile applications may run within the secure VM while all other mobile applications, including all personal mobile applications, run on the same device in the operating system's default VM. As described below under the heading "Secure Virtual Machine," the secure VM 350C implements a variety of policies and measures (such as security, management, storage, networking, and/or process execution policies) that are not implemented (or are implemented unsuitably for enterprise applications) in the mobile operating system's default VM. For example, the secure VM may be capable of establishing application tunnels for accessing the enterprise system, and may route requests from enterprise applications over corresponding application tunnels. The secure VM may also prevent an enterprise application from running unless and until the user enters a valid passcode or otherwise successfully authenticates. The secure VM may be installed on a mobile device together with a set of code libraries that are used by the secure VM in place of corresponding code libraries of the operating system.

One benefit of using a secure VM 350C is that it reduces or eliminates the need for the mobile applications to be specifically written or modified for use with an enterprise system 110. For example, an enterprise may wish to make a particular commercially-available mobile application available to its employees for use in accessing company resources, but may not have permission to modify the application to implement the various security features described herein (such as authentication, secure storage, and secure networking). In such a scenario, the enterprise may configure the mobile application or the mobile device to cause this particular application, when executed, to run only within the secure VM.

The secure VM is preferably implemented as a separate mobile application, but may alternatively be part of another application or component (such as the enterprise agent 320 or the secure launcher 350B). The secure VM may be invoked in various ways; for example, the enterprise agent may request that the secure VM run a particular application, or an application may, upon being launched, request or specify the secure VM as it's execution environment. In some embodiments, the secure launcher 350B and the secure VM 350C are used in combination to create a secure space for running enterprise applications, although each can be used independently of the other. Additional details of the secure VM are described below in the section titled Secure Virtual Machine.

As further shown in FIG. 3B, a secure container component 350D may also be installed on the mobile device 120, preferably as a separate mobile application or as part of the enterprise agent 320. This component 350D is responsible for creating a secure container on the mobile device for the enterprise applications to store documents and other information. One embodiment of this feature is described below under the heading Secure Document Containers. In some embodiments, when a selective wipe operation is performed, some or all of the documents and data stored in the secure container are deleted from the mobile device or are otherwise made inaccessible.

FIG. 3B also shows two types of mobile applications 318 that may be installed on the mobile device 120: enterprise applications 318A and personal applications 318B. As illustrated, an enterprise application 318 may include executable security code 360 (code libraries, etc.) for implementing some or all of the disclosed client-side security functions (application tunnels, passcode verification, encryption of data, etc.) This security code 360 may be added via a special SDK, or may be added post-development via the application wrapping process described below in the section titled Modifying Behaviors of Pre-Existing Mobile Applications. As mentioned above, in some cases a given enterprise application may not include any security code 360, but may instead run within either a secure VM 350C or a secure browser that imposes a layer of security on the enterprise application.

In addition to the components shown in FIG. 3B, one or more code libraries may be installed on the mobile device for implementing various security functions, such as data encryption and formation of application tunnels. As one example, a custom SSL library may be installed and used in place of the operating system's SSL library to create secure application tunnels, as described below in the section titled Application Tunnels.

User Interface for Launching Enterprise Applications

In one embodiment, which is depicted in FIGS. 1F and 1G, the secure launcher 350B displays a persistent display element 170 (FIG. 1F) at the edge of the mobile device's screen. This display element preferably remains visible across all of the device's home screens and when user is in an application. If the user taps on this display element 170 or swipes it to the left, a rotatable carousel or "wheel" (FIG. 1G) is displayed that includes respective icons 174 corresponding to specific enterprise applications or groups (folders) of enterprise applications installed on the device. (The other icons 175 shown in FIGS. 1G and 1F typically correspond to personal mobile applications, and/or folders of such applications, installed on the device.) By rotating the wheel 174 via an upward or downward swipe gesture, the user can expose additional icons 174 corresponding to additional enterprise applications or folders. Tapping on an application icon 174 causes the associated enterprise application to be launched, and tapping on a folder icon 174 causes the enterprise applications stored in the folder to be displayed. The user can also swipe the wheel 172 to the right to cause it to return to the retracted position shown in FIG. 1F. In the illustrated embodiment, the enterprise applications can only be launched from the wheel (with the secure launcher), and cannot be launched using the general launcher of the device's operating system.

In some embodiments, when the user launches an enterprise application via the wheel 172, the user is prompted to enter a passcode, and the application is not launched unless the correct passcode is entered. The task of requesting and verifying the passcode may, for example, be performed by the enterprise agent 320 (FIG. 3A), by a separate secure launcher 350B (FIG. 3B), by a secure virtual machine 350C (FIG. 3C), or by code 360 that is added to the enterprise application via an SDK or an application wrapping process. These and other techniques for providing a secure execution environment for running enterprise mobile applications are described further below.

In one embodiment, which is shown in FIG. 1F, the wheel 172 is displayed as a transparent or translucent overlay that enables the user to view and select the home screen icons 175 falling "behind" the wheel, such that the user can launch the personal applications corresponding to these icons 175. In another embodiment, the wheel is opaque, and thus obstructs the view of any icons 175 falling behind it. In yet another embodiment, the home screen icons 175 disappear when the wheel is "pulled out," or is pulled out beyond a particular point.

The secure launcher's user interface may also include features for enabling the user to, for example, arrange the icons 174 on the wheel 172, control the position of the wheel (e.g., which screen edge it extends from), and control the extent to which the wheel is displayed. The selectable element 170 (FIG. 1F) for pulling out and retracting the wheel preferably remains persistent across all of the device's home screens, such that the enterprise applications can be easily accessed from any of these screens.

Overview of Mobile Device Management System

Referring to FIGS. 1A and 2, embodiments of the mobile device management system 126 are configured to create, edit, and provide gateway rules to the secure mobile gateway 128, as discussed in detail below. The mobile device management system 126 can also act as a tunneling mediator for application tunnels between the mobile devices 120 and the enterprise resources 130 or other network resources within or even outside the enterprise system 110. The components of the illustrated mobile device management system 126 are now described.

The illustrated mobile device management system 126 includes a mobile device manager component 202 (FIG. 2), which preferably comprises a software application that runs on one or more physical machines. The mobile device manager 202 can be configured to both provision and maintain enrollments of the mobile devices 120 with the enterprise. Preferably, the mobile device manager 202 is configured to handle or participate in the provisioning and decommissioning of the mobile devices 120 associated with the enterprise.

In the illustrated embodiment of FIG. 2, the mobile device management system 126 includes mobile device information or attributes 204 stored in computer-readable or machine-readable storage. The mobile device information 204 preferably includes properties or attributes 208 of the mobile devices 120 enrolled with the mobile device manager 202, such as device type or platform (e.g., platforms for iPhone™, Android™, Windows Mobile™, etc.), device model, operating system version, device capabilities and features, identifiers of installed applications, etc. In certain embodiments, the mobile device properties 208 are ones that are permanent (e.g., device type, platform). In some embodiments, the mobile device properties 208 can also be properties subject to regular or periodic change (e.g., software or operating system version, which mobile applications are installed, etc.). As mentioned above, the various properties of a given mobile device may be determined, and reported to the mobile device management system 126, by the enterprise agent 320 installed on the mobile device 120. Device property information may also be supplied by system administrators.

The mobile device information 204 can also include user-device assignment records 210 that identify which users 115 or user accounts are assigned to the enrolled mobile devices 120, as well as roles 206 of the users 115 within the enterprise. A user's role 206 typically associates the user 115 with the enterprise-related duties or activities in which the user engages. Roles 206 can have names and, optionally, associated definitions. The roles 206 (and role names) can mimic the enterprise's departments and positional hierarchy. For example, an enterprise can define roles with names such as Upper Management, Officer, Sales, Accounting, Engineering, Word Processing, Human Resources, etc. In this scheme, a salesperson can be given the role "Sales," an engineer can be given the role "Engineering," and so forth. Also, roles 206 can be defined as broadly or as narrowly as may suit the needs of the enterprise. For example, an enterprise can give all of its engineers the "Engineering" role. Alternatively or additionally, the enterprise may wish to define narrower roles such as "Computer Engineer," "Materials Engineer," "Semiconductor Processing Engineer," etc, particularly if the enterprise wishes to differentiate the mobile device authorizations of its different types of engineering personnel. Further, a user 115 can be assigned to multiple roles 206, depending upon the user's duties or activities associated with the enterprise. In certain embodiments, an enterprise may use an RBAC (role-based access control) system to assist in the regulation of enterprise resources 130, and the user roles 206 can relate to or be the same as the roles defined in the RBAC system.

The enterprise agents 320 of the mobile devices 120 can be configured to send device-related data to the mobile device management system 126 periodically, and/or whenever the mobile devices 120 connect to the mobile device management system 126 (e.g., upon the formation of an application tunnel). For instance, the enterprise agents 320 can send data concerning software applications installed on the mobile devices 120, software upgrades, system information, etc., as described above. In one embodiment, the agent 320 sends such device-properties information over the same connection that is used for application tunnels, but without the use of an application tunnel.

With continued reference to FIGS. 1A and 2, the mobile device management system 126 can include one or more enterprise access policies 218 stored in computer storage. The access policies 218 preferably define conditions under which mobile device access to enterprise resources 130 will be granted or denied. In some embodiments, a single access policy 218 can apply to mobile devices 120 of different makes, models, operating systems, or any combination thereof. Policies 218 can depend on user roles 206, mobile device properties 208, the specific enterprise resources 130 requested to be accessed by the mobile devices 120, or any combination thereof. The mobile device management system 126 can use the access policies 218 to process mobile device access requests received directly by the mobile device management system 126, including requests received via secure application tunnels. Additionally, as described below, the secure mobile gateway 128 can leverage the access policies 218 to grant or deny mobile device access requests received directly by the secure mobile gateway 128.

As shown in FIG. 2, the mobile device management system 126 can include a script-editing tool 220 for editing scripts that are executable on the mobile devices 120, as described below. The mobile device management system 126 can also include a tool 221 for editing mobile device rules 214 and remedial actions 216, as described below.

The mobile device management system 126 can include a gateway rule generator 222 for creating, editing, and/or sending gateway rules to the secure mobile gateway 128, as described below. These tools 220, 221 may, for example, be used by IT administrators to implement various security-related features and policies, as described below.

The mobile device management system 126 can include a tunneling mediator module 224 for mediating an application tunnel between a software application running on a mobile device 120 and another resource, such as an enterprise resource 130, as described below. The tunneling mediator module 224 can also be configured to grant or deny access requests based on the access policies 218 and information 204.

The mobile device management system 126 can also include a remedy agent 226 for executing remedial actions provided by the meta-application 150 and/or 151, as described below. The remedy agent 226 may execute various types of remedial actions based on conditions specified by rules, for example, as described generally in Qureshi '526.

With further reference to FIG. 2, the above-described functional components 202, 224, 220, 221, 222, 226 of the mobile device management system 126 may be implemented in executable program code modules that run on appropriate computer hardware, such as on one or more physical servers or other computing devices. These components may, for example, run on a single physical server or other machine, or may be distributed across multiple machines on a network. In some embodiments, some or all of these components may alternatively be implemented in firmware or in application-specific hardware (ASICs, FPGAs, etc.). The various data or data storage components 210, 212, 218, 228 of the mobile device management system 126 may be implemented in any appropriate type or types of computer storage (e.g., hard disk For example, an enterprise may wish to use multiple mobile device management systems 126. An enterprise with multiple offices may use separate systems 126 for the separate offices. This may be useful if the enterprise has offices located in different geographical areas. For example, a large enterprise with offices in England, Japan, and the U.S. may use three different mobile device management systems 126 located within or near to those office locations. In such embodiments, each mobile device management system 126 can be responsible for managing mobile devices 120 in a different geographical area, wherein such mobile device management can comprise sending rule packages to the mobile devices 120 (as described below) and/or regulating access to enterprise resources 130. In such embodiments, the secure mobile gateway 128 is preferably configured to communicate with each of the mobile device management systems 126 for the purposes described herein. In some implementations, a console is provided that can be used to view the various systems 126 associated with a given enterprise.

Use of Secure Mobile Gateway to Regulate Mobile Device Access to Enterprise System With reference to FIG. 1A, an enterprise may wish to regulate how its mobile device users 115 access the enterprise resources 130 via the mobile devices 120. Any given enterprise user 115 typically only has a need to access a subset of the enterprise resources 130, ordinarily based upon the user's duties or role within the enterprise. Therefore, since there is no need to provide the user 115 with mobile device access to many of the resources 130, doing so can expose the enterprise to unnecessary security risks. For example, an enterprise may wish to prevent many of the users 115 from using their mobile devices 120 to access highly sensitive, confidential information of the enterprise, particularly if the users do not need to access such information to perform their duties toward or associated with the enterprise. This can prevent, for example, a disgruntled employee from harming the enterprise by accessing and perhaps disseminating sensitive enterprise-related information. Also, applications and files installed on the mobile devices 120 can have malware or viruses that can get transferred to the enterprise's computer system 110 or that can upload or steal sensitive information. Limiting mobile device access to specific enterprise resources 130 can prevent the malware and viruses from infecting other enterprise resources 130. As discussed below, the mobile device management system 126 and secure mobile gateway 128 preferably address these issues by enabling an enterprise to restrict mobile device access only to authorized enterprise resources 130, in a way that is customizable based on user properties, mobile device properties, and/or the enterprise resources 130 for which mobile device access is requested.

With the proliferation of mobile devices and the desire to use existing applications for the mobile devices, a need exists to take action at a network level to provide controlled access to enterprise resources. Moreover, as enterprises implement BYOD (bring your own device) or BYOT (bring your own technology) policies, a need exists for flexibility while addressing the increasingly complex task of protecting enterprise resources and sensitive enterprise data. Such flexibility can include allowing a number of different mobile devices and/or applications running on such mobile devices to access enterprise resources while providing a desired level of control over such access to enterprise resources. As one example, it can be desirable to allow mobile devices 120 having a variety of different email clients to access enterprise resources and to enable the enterprise to implement certain protections, such as denying some access requests in certain circumstances configurable by the enterprise and/or encrypting at least a portion of data provided to email clients of a mobile device based on enterprise policies, when allowing the various email clients to access enterprise data. Allowing a variety of existing mobile applications to access enterprise resources can eliminate the need to develop proprietary applications and/or modify existing applications in order to access enterprise resources. At the same time, implementing a desired level of control over access to enterprise data can allow an enterprise to strike a balance between protecting enterprise data and enabling users to access the enterprise data on a mobile device 120.

A secure mobile gateway 128 can assist in flexibly protecting sensitive enterprise data accessed by mobile devices 120. The secure mobile gateway 128 can monitor and log traffic between one or more enterprise resources 130 and a mobile device 120. The secure mobile gateway 128 can apply rules to implement enterprise policies applied to a selected mobile device 120. Based on a particular protocol, the secure mobile gateway 128 can take actions to implement enterprise policies as applied to the selected mobile device 120 that is requesting access to an enterprise resource 130. Thus, in the context of a mobile device 120 communicating with an enterprise computing system 110, the secure mobile gateway 128 can take actions associated with a protocol and certain conditions to provide access to enterprise resources 130. It will be understood that the secure mobile gateway 128 can control traffic associated with any suitable protocol, for example, the protocols described herein. Any combination of the policies, rules, and remedial action described herein can be implemented by the secure mobile gateway 128. Moreover, the secure mobile gateway 128 can implement a variety of other policies, rules, remediation actions, or any combination thereof in accordance with the principles and advantages described herein.

The secure mobile gateway 128 can include a gateway filter that functions as a protocol analyzer and a rules remediator. The gateway filter can detect a defined protocol, such as ActiveSync or HTTP(s), associated with enterprise traffic. The gateway filter can implement gateway rules that take certain actions for a particular protocol and one or more conditions. For example, when a request from a mobile device 120 to access an enterprise resource 130 is an ActiveSync request, the gateway filter can implement rules specific to the ActiveSync protocol. In this example, the conditions can be that the mobile device 120 is associated with an executive of the enterprise that is likely to receive sensitive enterprise information. The gateway filter can then take the action of encrypting attachment data before sending the data to the mobile device of the executive. In another example, the gateway filter can deny a request by a mobile device 120 to access an enterprise resource 130 due to the mobile device 120 having a certain application installed thereon.

Figure 4:
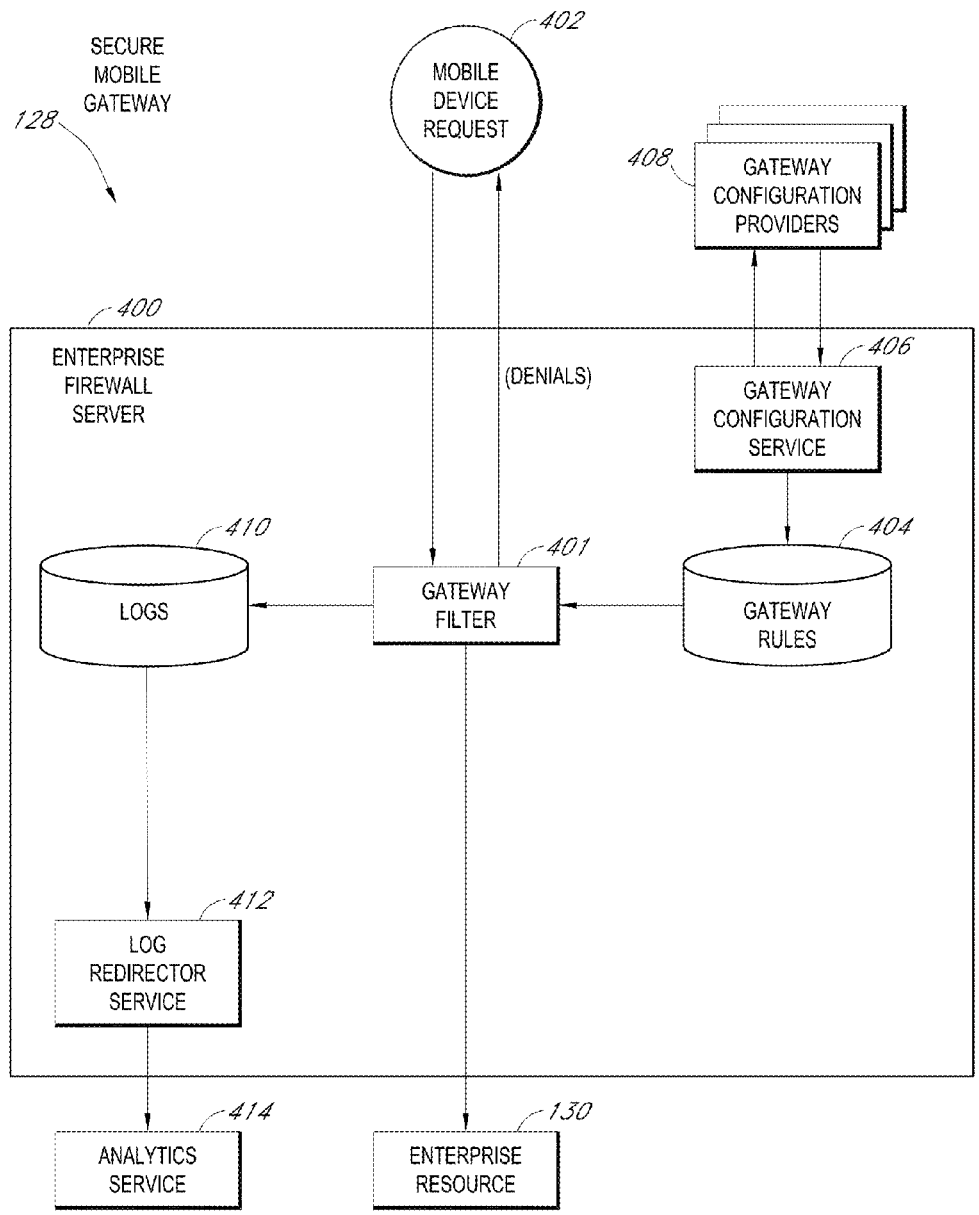
FIG. 4 is a schematic illustration of an embodiment of a gateway for selectively allowing or denying requests from mobile devices to access an enterprise computer system.

FIG. 4 schematically illustrates the architecture and operation of an embodiment of the secure mobile gateway 128 of FIG. 1A. The secure mobile gateway 128 can be implemented at or control any junction in a computing system through which protocol traffic flows. For instance, the secure mobile gateway 128 can be implemented in a firewall, an enterprise server (such as an application server), or between a firewall and an enterprise server. As another example, a virtual secure mobile gateway 128 can communicate with an enterprise server (e.g., via a PowerShell interface) to implement enterprise access policies for requests from mobile devices. The secure mobile gateway 128 can be implemented as a plugin to a firewall server 400 of the enterprise network, such as the firewall 122 of FIG. 1A. For instance, most of the firewall products sold by Microsoft Corporation™ run Internet Information Services (IIS), which is a service that processes web server requests. IIS has plugin architecture that allows embodiments of the gateway 128 to be plugged into the firewall products. One particular API of IIS is the Internet Server Application Programming Interface (ISAPI). Embodiments of the secure mobile gateway 128 can be integrated with various firewall technologies, such as Microsoft Forefront Threat Management Gateway (TMG), Microsoft Forefront Unified Access Gateway (UAG), Microsoft Forefront Identity Manager 2010 (FIM 2010), Microsoft ISA 2006, Barracuda firewalls, Sonic firewalls, Cisco firewalls, and others. When the secure mobile gateway 128 is integrated with certain firewalls, such as TMG, the secure mobile gateway 128 can be implemented by one or more enterprise resources 130 (FIG. 1E) or at least one device configured to control the one or more enterprise resources 130. In certain embodiments, such as for enterprises that do not use a perimeter firewall 122 (FIG. 1A), the secure mobile gateway 128 can be integrated with interior servers of the enterprise, such as Client Access Servers ("CAS servers") that support ActiveSync. In some other embodiments, the secure mobile gateway 128 can be implemented by at least one computing device configured to communicate with a firewall server. In this way, the secure mobile gateway 128 can control some or all of the traffic through a firewall without the firewall server being modified. This can enable an enterprise to implement the secure mobile gateway 128 in combination with an unmodified third party firewall.

Although the secure mobile gateways 128 of FIGS. 1A-1E are shown as controlling traffic related to a single enterprise system 110 for illustrative purposes, it will be understood that one secure mobile gateway 128 can be implemented to handle requests associated with two or more different enterprise systems 110, including systems 110 of distinct companies or other enterprises. When handling requests associated with a plurality of different enterprise computing systems 110, the secure mobile gateway 128 can implement different rules for each of the different enterprise computing systems 110. For example, one secure mobile gateway 128 can be implemented for several different enterprise email systems each having different email policies. In some of these embodiments, the secure mobile gateway 128 can communicate with different mobile device management systems 126 of enterprise computing systems 110 of different companies.

The illustrated secure mobile gateway 128 in FIG. 4 includes a gateway filter 401 that can be configured to receive and process enterprise access requests 402 from mobile devices 120, each request being formatted according to a protocol supported by the secure mobile gateway 128. The gateway filter 401 can be embedded into a firewall server 400. In some other implementations, the gateway filter 401 can be implemented to control traffic through a separate firewall sever. The gateway filter 401 can be configured to allow the access request 402 to reach an enterprise resource 130, or deny the request 402. The gateway 128 can be configured to support one or more different request protocols, such as ActiveSync requests, SharePoint requests, EWS requests, SAP requests, and/or requests associated with various other web server applications. In one embodiment, blocks 401, 404, 406, 410 and 412 in FIG. 4 represent components that can be added (e.g., as part of a firewall plug-in) to a commercially-available firewall or firewall server 400 to implement the secure mobile gateway 128.

Take for example the case of a secure mobile gateway 128 configured to process ActiveSync requests to synchronize enterprise system data with mobile devices 120. ActiveSync is a well-known mobile data synchronization technology and protocol developed by Microsoft™. One implementation of ActiveSync, commonly known as Exchange ActiveSync (or EAS), provides push synchronization of contacts, calendars, tasks, and email between ActiveSync-enabled servers and mobile devices. The gateway filter 401 can be configured to intercept every incoming request 402, determine if it is an ActiveSync request, and consult a database of gateway rules 404 to determine if the gateway filter 401 should allow or deny the request. The request can be, for example, an HTTP request. The database of gateway rules 404 can be a local database stored on the enterprise firewall server 400. In the case of an allowed ActiveSync request 402, the gateway filter 401 can send the request to the enterprise resource 130, which can comprise a Microsoft Exchange server.

The gateway filter 401 can detect whether the request 402 is an ActiveSync request by inspecting the request's header and possibly body to detect indicia of the ActiveSync protocol. Each ActiveSync command typically comprises a web Uniform Resource Locator (URL) issued by the mobile device 120. After the URL, the request typically includes query parameters and an ActiveSync command. To illustrate, consider the following ActiveSync request:

```
http://myDomain.com/Microsoft-Server-
ActiveSync?User=XXX&DeviceId=XXX&DeviceType=XXX&Cmd=Ping
```

The secure mobile gateway 128 can obtain the DeviceId and DeviceType from the URL, the UserAgent parameter from the HTTP header, the authenticated User parameter from the HTTP session, and the Cmd parameter. The secure mobile gateway 128 can be configured to filter the requests 402 based on one or more of these properties. Note that the ActiveSync protocol also allows for the URL parameters to be encoded in an alternate form using a base64 encoded representation. In the above example, the gateway 128 can determine that the request is an ActiveSync request from the string "Microsoft-Server-ActiveSync."

A gateway rule 404 can include one or more values of properties of a mobile device request 402 formatted according to a protocol supported by the secure mobile gateway 128. Such properties can comprise URL parameters, header values, commands, etc. The gateway filter 401 can be configured to filter the requests 402 based at least partly on these properties. In the case of ActiveSync, the request properties can include DeviceID and DeviceType (taken from the request URL), the User and UserAgent parameters (taken from the HTTP headers), and one or more ActiveSync command parameters (ActiveSync defines numerous different commands, such as sync mailbox, send mail, get attachment, etc.). A gateway rule 404 can specify conditions under which a request is to be granted or denied by the gateway filter 401. Such a condition can involve a logical expression and/or combination of one or more values of the request properties of a protocol supported by the secure mobile gateway 128. For example, a gateway rule 404 can cause the gateway filter 401 to block all ActiveSync requests having any one of a particular group of DeviceID values, and which issue the get attachment command (for downloading an email attachment). As this example illustrates, a gateway rule 404 can identify one or more mobile devices 120 and/or users 115. As this example also illustrates, a gateway rule 404 can allow or deny access based on what a mobile device 120 is attempting to do or achieve by issuing an access request 402 to the enterprise system 110. Through the secure mobile gateway 128, an operator of the secure mobile gateway 128 can customize gateway rules 404 for a particular enterprise computing system 110.

In some embodiments, the secure mobile gateway 128 can be configured to inspect the body or "payload" of a request 402 to access an enterprise resource 130, in order to detect additional information that may be useful in evaluating whether to grant or deny the request. The payload may provide information about the specific data being requested, how the mobile device application will use the requested data, and so on. Access policies (e.g., policies 218 of the device management system 126) can be created to regulate or restrict access based on such information. For example, the secure mobile gateway 128 may inspect the payloads of messages that are formatted according to selected protocols such as ActiveSync, SharePoint, SAP, and/or those based on HTTP. The secure mobile gateway may also modify protocol metadata in these messages to implement various security-related features. For instance, as described below under the heading "protecting attachment data," the secure mobile gateway may be configured to inspect the payloads of ActiveSync or other requests 402 to determine whether they are associated with messages that include attachments (such as email attachments); the secure mobile gateway 128 may also encrypt some or all of the identified attachments to prevent them from being stored in an unencrypted format on the associated mobile devices 120.

The gateway rules 404 can be based on data provided by the mobile device management system 126 and/or data provided by an operator of the secure mobile gateway 128. The mobile device management system 126 can convert high level rules into relatively simple (lower level) rules and provide the relatively simple rules to the secure mobile gateway 128 for application to monitored traffic. The secure mobile gateway can also implement rules provided by or based on inputs from an inference engine of a meta-application 150 and/or a meta-application portion 151 in the cloud 156 (such as the inference engine 824 of FIG. 8). The rules may, in some embodiments, be generated using the methods and components (including symptom logic) described in Qureshi '526.

The gateway rules 404 can take many different forms and can be written in a variety of programming languages, such as XML. In one embodiment, a gateway rule 404 includes a list of "groups" plus an indication of a default "action" (e.g., grant or denial of the access request or whether to encrypt attachment data). In this context, a group is a collection of "group members" plus a corresponding action for the group. A group member can be a set of values of one, some, or all of the properties of a mobile device request 402. Each group member can match an incoming mobile device access request 402 by any value of a property of a request protocol supported by the secure mobile gateway 128. The gateway filter 401 can match an inbound request 402 with a group member by matching all of the property values of the group member to the corresponding property values of the request 402. If a group member does not include any values for one or more possible request properties, the gateway filter 401 can determine that it does not matter what are request's values for those particular properties. In other words, a group member can effectively specify "any" or "don't care" for one or more request properties. Hence, different group members can correspond to the same mobile device 120 or user 115. For example, for a secure mobile gateway 128 that supports ActiveSync, the group members can match inbound HTTP requests 402 by any combination of DeviceID, User, UserAgent, and DeviceType, as well ActiveSync Cmd values.

Here is one example of a gateway rule 404:

```
<Policy id="Static + ZDM Rules : Block Mode" default-action="Deny"
missing-param-action="Allow">
    <GroupRef id="StaticAllow" action="Allow" />
    <GroupRef id="StaticDeny" action="Deny" />
    <GroupRef id="ZdmDeny" action="Deny" />
    <GroupRef id="ZdmAllow" action="Allow" />
```

This gateway rule specifies a default action as a denial of an inbound access request received by the secure mobile gateway 128 from a mobile device 120. This gateway rule also specifies a "StaticAllow" group whose action is "Allow," a "StaticDeny" group whose action is "Deny," a "ZdmDeny" group whose action is "Deny," and a "ZdmAllow" group whose action is "Allow." Together a group and an action can be a subrule. The StaticAllow and StaticDeny groups and their associated action are examples of subrules that are local to the secure mobile gateway 128. Such subrules can be modified by an operator of the secure mobile gateway independent of the mobile device management system 126. The ZdmDeny and ZdmAllow groups and their associated actions are examples of subrules received from the mobile device management system 126. The priorities of the rules can be set in any suitable order. In the example above, the StaticAllow and StaticDeny groups and their associated actions are prioritized over the ZdmDeny and ZdmAllow groups and their associated actions. In this way, an operator of the secure mobile gateway 128 can override subrules provided by the mobile device management system 126.

A number of other sub-rules from various sources can be implemented with or in place of the above example subrules provided above. A gateway rule 404 can alternatively or additionally define a number of other actions for the secure mobile gateway 128 to take for various groups, such as encrypting attachments for certain groups, modifying a body of a message (such as an email) for certain groups, blocking a mobile device 120 from certain groups from receiving messages in certain locations, etc.

To enforce the example gateway rule 404 provided above, the secure mobile gateway 128 can access all of the group members of these four groups. Here is an example of a "group list" that can be provided to the secure mobile gateway 128 (e.g., by a provider 408 as described below):

```
<GroupList>
    <Group id="StaticAllow">
        <ExternalMemberList path="allow.xml" />
    </Group>
    <Group id="StaticDeny">
        <ExternalMemberList path="deny.xml" />
    </Group>
    <Group id="ZdmAllow">
        <ManagedMemberList path="zdm.xml" groupId="allow" />
    </Group>
    <Group id="ZdmDeny">
        <ManagedMemberList path="zdm.xml" groupId="deny" />
    </Group>
</GroupList>
```

This group list defines locations of files containing lists of group members, where each group member is identifiable by one or more values of properties of an access request 402 of a protocol supported by the gateway 128. For the ActiveSync protocol, each group member can include values of DeviceID, User, UserAgent, DeviceType, and Cmd parameters.

When the secure mobile gateway 128 receives an inbound mobile device request 402, the gateway filter 401 can read the values of properties of the request 402 and match them against the corresponding property values of group members of the group list. If there is a match, the gateway filter 401 can enforce the action associated with the group. If there is no match, the gateway 128 performs the same analysis for the next group listed in the gateway rule 404. If there are no matches with any of the groups of the gateway rule 404, the gateway 128 enforces the default action. To the extent that there may be conflicts between the groups of the gateway rule 404, the secure mobile gateway 128 can be configured to give priority to groups that appear earlier in the rule.

Referring still to the above example of a gateway rule 404, after the gateway filter 401 reads the values of the request properties, the gateway filter 401 reads the property values of the group members of the StaticAllow group and determines if any of them matches any property values of the request 402. For example, for a gateway 128 supporting ActiveSync, the DeviceID of the request 402 could match the DeviceID of one of the group members. If there is such a match, the gateway filter 401 enforces the action associated with the StaticAllow group, which is to allow the request 402 to pass through the firewall. If there is no match with any property values of any group member of the StaticAllow group, then the gateway filter 401 reads the property values of the group members of the StaticDeny group and determines if any of them matches any property value of the request 402. If there is a match, then the gateway filter 401 enforces the action associated with the StaticDeny group, which is to deny the request 402. If there is no match with any property values of any group member of the StaticDeny group, then the gateway filter 401 reads the property values of the group members of the ZdmDeny group and determines if any of them matches any property value of the request 402. If there is a match, then the gateway filter 401 enforces the action associated with the ZdmDeny group, which is to deny the request 402. If there is no match with any property values of any group member of the ZdmDeny group, then the gateway filter 401 reads the property values of the group members of the ZdmAllow group and determines if any of them matches any property value of the request 402. If there is a match, then the gateway filter 401 enforces the action associated with the ZdmAllow group, which is to allow the request 402. If there is no match with any property values of any group member of the ZdmAllow group, then the gateway filter 401 enforces the default action, which is to deny the request 402.

The secure mobile gateway 128 can include a gateway configuration service 406 that allows a user (e.g., administrators, IT personnel, etc.) to view, edit, and/or create gateway rules 404, and then save them in the local database. The configuration service 406 can be configured to allow an administrator to set "static" gateway rules 404. A static gateway rule can identify a mobile device 120 or groups of devices 120 that are always to be granted access or denied access. For example, the administrator can input a rule 404 that specifies that the mobile device 120 (e.g., identified by ActiveSync DeviceId) used by the CEO of the enterprise is always granted access to the enterprise network 110. As another example, the administrator can input a gateway rule 404 that denies access to devices 120 that are known to have malware or incompatibilities with the enterprise network 110. The configuration service 406 can also be configured to allow the user to adjust various other settings and features of the gateway 128, including any of those described herein.

The gateway configuration service 406 can allow for gateway rules 404 to be statically defined. Further, the secure mobile gateway 128 can be configured to receive gateway rules 404 from one or more external "providers" 408. A provider 408 can be any entity authorized by the gateway 128 to provide gateway rules 404 for regulating access to the enterprise network 110. The gateway 128 can have an open architecture that permits IT personnel of the enterprise to add, remove, and configure the providers 408. Preferably, the gateway 128 supports any number of providers 408. The mobile device management system 126 can be one of the providers 408. Another provider 408 can be the meta-application 150 that manages some or all of the enterprise network 110, such as the "backend" subnetwork behind the firewall 124 (FIG. 1A). Exemplary meta-application embodiments are described in Qureshi '536, and an at least partially cloud-based meta-application (which can be a provider 408) is described below with reference to FIG. 8.

Each provider 408 can be configured to create and send one or more gateway rules 404 to the gateway 128. The providers 408 can be configured to query their own databases of information to create the rules 404. Compared to the gateway 128, a provider 408 can have significantly more data on which to grant or deny mobile device access requests 402, such as information about the users 115 and/or mobile devices 120. For instance, the illustrated mobile device management system 126 (FIG. 2) can include a gateway rule generator 222 configured to create and edit gateway rules 404 based on the enterprise access policies 218 and the mobile device information 204 (including the mobile device properties 208, user-device assignment records 210, and user roles 206), and then send the rules 404 to the gateway configuration service 406 of the gateway 128. The access policies 218 can comprise high level rules specifying whether mobile devices 120 can access the enterprise network or specific resources 130 thereof. The gateway rule generator 222 can be configured to read an access policy 218 and then query the mobile device information 204 to find specific devices 120 or users 115 that match the criteria of the access policy 218. From the detected devices and users, the gateway rule generator 222 can generate device- or user-specific gateway rules 404 that enforce the policy 218. The mobile device management system 126 can be configured to send lists of users 115 or devices 120 (e.g., in the form of "group members," as discussed above) for which enterprise access is to be granted or denied, and send those lists to the gateway 128. The gateway 128 can be configured to use the lists to enforce the gateway rules 404.

For example, if an access policy 218 requires that all Android™ mobile devices 120 having a Facebook™ application installed thereon are to be denied access to the enterprise network 110, the gateway rule generator 222 can query the mobile device information 204 to obtain a list of such devices 120. The gateway rule generator 222 can create one or more gateway rules 404 that instruct the gateway filter 401 to deny access to the listed devices 120, and then send the created rules to the gateway configuration service 406. In the case of a gateway 128 that supports the ActiveSync protocol, the gateway rule generator 222 can, for example, generate a list of ActiveSync DeviceID's of Android™ mobile devices 120 having a Facebook™ application installed thereon, and then create one or more gateway rules 404 instructing denial of access for such devices.

As the above example illustrates, an access policy 218 can comprise any logical combination of conditions that can be transformed into a gateway rule 404. The policy 218 in the above example represents a conjunction (AND operator) of two conditions: (1) that the mobile device is an Android™ device, and (2) that the device has a Facebook™ application installed thereon. It will be understood that a logical combination of conditions can include OR operators, XOR operators, NOR operators, NAND operators, THEN operators, mathematical operators (including "less than" and "greater than"), and any other suitable operators.

In addition to generating gateway rules 404 based at least partly on the mobile device information 204, the gateway rule generator 222 can be configured to generate the rules based at least partly on a locally stored database of information received from the meta-application 150, such as a model of the enterprise network 110 and mobile devices 120, or detected "features," "problems," and "root causes" (see below discussion of meta-application). In an embodiment in which the meta-application 150 manages Microsoft Exchange™, the information received from the meta-application 150 can include ActiveSync partnership data.

As noted above, the meta-application 150 (FIGS. 1A-C) can be a direct provider 408 of gateway rules 404 to the secure mobile gateway 128. The meta-application 150 can generate gateway rules 404 based on various data associated with the enterprise network 110, users 115, mobile devices 120, or any combination thereof. The meta-application 150 can have access to various information on which gateway rules 404 can be based. For example, in support of its management tasks, the meta-application 150 can be configured to conduct "discovery" of the enterprise network 110 and mobile devices 120 to create and maintain a queriable model thereof. Additionally, the meta-application 150 can be configured to predict or detect "features," "problems," and/or "root causes," as these terms are used in Qureshi '536. New gateway rules 404 can be created based on the model, the detected features, problems, and root causes, and other information detected or computed by the meta-application 150. The management and gateway control capabilities of embodiments of the meta-application 150 are described more fully below.

The illustrated gateway configuration service 406 is configured to receive gateway rules 404 from the providers 408, and save them in the local storage of rules 404. The gateway configuration service 406 can be implemented as a web service and can have a list of all of the providers 408 associated with the gateway 128. The gateway configuration service 406 can be configured to periodically (e.g., every 24 hours, hour, or few minutes, etc.) query the providers 408 for any new gateway rules 404 that are available. In this sense, the configuration service 406 acts as a collector of gateway rules 404 for the gateway 128.

Protecting Attachment Data

Mobile devices are pervasively used to check emails, including emails associated with an enterprise email account. Some emails include attachments containing sensitive data. These attachments are often stored on a mobile device when a user checks email using the mobile device. The attachment data stored on the mobile device can be compromised in a number of ways. When the attachment data is compromised, sensitive data associated with the enterprise can be exposed. Accordingly, a need exists to protect attachment data associated with an enterprise that is stored on a mobile device. This need may vary depending upon the individual's position or role in an associated organization; for example, the need to protect the attachments to messages received by a corporation's executives may be greater than the need to protect the attachments received by the corporation's IT staff. In addition, if the company's enterprise supports the use of other messaging protocols (SMS, MMS, instant messaging, AS, EWS, OWA, proprietary messaging protocols, etc.) to send documents, this need may extend to such protocols.

Aspects of certain embodiments relate to protecting enterprise attachments stored on a mobile device, such as enterprise email attachments, from being compromised. The attachments may include, for example, Word documents, Excel documents, PowerPoint presentations, text files, and documents and files created with other application programs. According to the principles and advantages described herein, attachment data can be protected on mobile devices with non-proprietary email applications, such as an email application that comes pre-installed on or is later installed on an iPhone or an Android device. As such, features related to protecting attachment data can be implemented with any suitable email client. Enterprise attachments can be protected prior to being stored on a mobile device such that the protected attachment data remains safe even when data stored on the mobile device is compromised. The attachment data can be securely stored in the general file system of a mobile device. Attachment data can be identified and stripped from an email message. The attachment data can be encrypted and then sent to the mobile device as encrypted attachment data. A secure mobile gateway can be configured to encrypt attachment data and provide the encrypted attachment data to the mobile device. According to some embodiments, an encrypted attachment key can also be sent with the encrypted attachment data. Secure, policy-based access to the protected attachment data can be provided. An enterprise agent can decrypt the encrypted attachment data. For example, the enterprise agent can decrypt the encrypted attachment key and then use the attachment key to decrypt the encrypted attachment data. When the mobile device is compromised, the enterprise agent can be configured such that the encrypted attachment data remains encrypted. For example, the enterprise agent can destroy and/or invalidate the attachment key. Without the device key to decrypt the encrypted attachment key, the encrypted attachment data can remain encrypted. When the encrypted attachment data is stored on removable memory, such as a secure digital (SD) card, the attachment data can remain secure when the removable memory is removed from the mobile device since the attachment data is encrypted.

In one embodiment, enterprise users access their enterprise email accounts from their mobile devices using the enterprise agents installed on their mobile devices. The enterprise agent can operate transparently to an email client and an enterprise email server. The enterprise agent may require an end user to log-in before accessing the user's email account and/or before an opening encrypted attachment. The enterprise agent can register with a platform of the mobile to device. When the user opens an encrypted attachment, the enterprise agent can be invoked. An encrypted attachment can be identified by a particular file suffix. After being invoked, the enterprise agent can decrypt the attachment transparently to the user.

Although the system is described herein primarily in the context of email attachments for illustrative purposes, it will be understood that the principles and advantages described herein may be applied to any other suitable communication protocol that can be used to send an attachment from an enterprise resource to a mobile device. For example, any combination of features of protecting email attachments can be applied to protecting an attachment to an instant message, text message (for example, an SMS), or the like. It will be understood that, in certain embodiments, the policy based encryption of attachment data described herein can be implemented in combination with other encryption applied to the attachment data. Moreover, although attachment data is described herein as being encrypted for illustrative purposes, it will be understood that the principles and advantages described herein may be applied to any other suitable way of protecting attachment data on a mobile device, such as scrambling and the like. Furthermore, the principles and advantages described herein with reference to attachment data can be applied to protecting some or all of a message, such as an email message.

With reference to FIGS. 1A-1C, attachment data can be protected in any of the enterprise computing systems and mobile devices described herein. Attachment data can be protected in any system with a mobile device 120 in communication with a secure mobile gateway 128, which is in communication with an enterprise resource 130, such as an enterprise email server. Typically, a mobile device 120 communicates with the secure mobile gateway 128 via an external firewall 122 (FIG. 1A-C). In certain embodiments, the secure mobile gateway 128 can be implemented by an enterprise resource 130. In one embodiment, as discussed above, the secure mobile gateway 128 can be deployed between an external firewall 122 and an internal firewall 124 of the enterprise system 110. The mobile device 120 and/or the secure mobile gateway 128 can be in communication with a mobile device management system 126. The mobile device management system 126 can be configured to implement functionalities related to encryption keys for encrypting attachment data, for example, as will be described in more detail below. According to certain embodiments, the secure mobile gateway 128 and/or agents of the mobile device 120 can be configured to decrypt attachments.

The secure mobile gateway 128 can be configured to detect attachments in incoming and/or outgoing email messages. In some embodiments, the secure mobile gateway 128 can inspect and/or modify a data payload being transmitted to and/or from a mobile device 120, such as an ActiveSync data payload. The incoming and/or outgoing data payload can be in WBXML, a binary version of XML optimized for low bandwidth environments. The secure mobile gateway 128 can include a parser and generator that operate on the data payload. For example, the parser and generator can process WBXML. In this example, the parser and generator can process data in accordance with the ActiveSync WBXML schema. The secure mobile gateway 128 can programmatically identify which character encoding schemes are being used. WBXML messages may include MIME payloads. The secure mobile gateway 128 can include a MIME parser and generator configured to construct and deconstruct this data. With a parser and generator, the secure mobile gateway 128 can identify an attachment so that the attachment can be separated from an email and secured.

According to one embodiment, to intercept and/or modify incoming and/or outgoing data payloads, the secure mobile gateway 128 can register with an Internet Server Application Programming Interface (ISAPI) or other server to receive notifications. The received notifications can correspond to various processing stages. The secure mobile gateway 128 can maintain a context state to track the various processing stages of a request. The secure mobile gateway 128 can chunk and de-chunk request and response data.

The secure mobile gateway 128 can modify, or otherwise mark, an attachment and/or a reference to an attachment. For instance, the secure mobile gateway 128 can append a particular suffix, such as ".zendata" to the names of encrypted attachments to signify that they should be preprocessed by the enterprise agent 320. As another example, the secure mobile gateway 128 can append a particular suffix, such as ".zendata" to the names of a reference to an attachment to signify that the attachment should later be encrypted prior to being delivered to a mobile device 120. The secure mobile gateway 128 can adjust a header attribute (for example, in MIME data) to identify that attachment data is encrypted as an alternative to or in addition to appending a suffix to a file or a link. The secure mobile gateway 128 can encrypt and/or decrypt attachment data and/or attachment keys. The secure mobile gateway 128 can be configured to initiate communication with the mobile device management system 126 to obtain device properties, device policies, public device keys, the like, or any combination thereof.

Device Agents, such as an operating system and/or the enterprise agent 320 (FIG. 3), of the mobile device 120 can be configured to register the mobile device 120 with the enterprise system 110 and to handle the encrypted data file type (for example, ".zendata"), decrypt the attachment data, and invoke the appropriate rendering and/or processing on the decrypted attachment data. The device agents of the mobile devices 120 can be configured to obtain and/or manage a private device key.

The mobile device management system 126 can generate a device key. The mobile device management system 126 can distribute the device key or a portion thereof to a mobile device 120 and/or to a secure mobile gateway 128. A suitable key can be used by the secure mobile gateway 128 to encrypt attachment data and another suitable key can be used by the mobile device 120 to decrypt the encrypted attachment data. For instance, the mobile device 120 can receive a private device key from the mobile device management system 126, and the secure mobile gateway 128 can receive a public device key from the mobile device management system 126. The secure mobile gateway 128 need not include special key management and/or key archiving, according to some embodiments. When an attachment is encrypted and a corresponding device key is subsequently destroyed, invalidated, and/or replaced, the encrypted attachment may be unrecoverable.

A number of different rules and/or policies related to protecting attachments can be implemented by the enterprise system 110. For example, features related to protecting attachments can be implemented based on one or more properties of a particular mobile device 120 that receives attachment data. In this example, certain mobile devices 120 with particular software applications installed thereon can enable attachment protection as a default. As another example, protecting attachments can be enabled and/or disabled based on one or more properties of a user of a mobile device 120 that is receiving the attachment data. For instance, an employee of the enterprise that is likely to receive attachments with sensitive and/or confidential information, such as an executive and/or a member of the legal team, can have attachments encrypted as a default. By contrast, an employee who is unlikely to receive attachments with sensitive and/or confidential data can have attachment protection disabled as a default. As yet another example, attachments can be protected based on one or more properties of the attachment itself, such as file name, file type, data included in the attachment, or any combination thereof. For instance, the attachment can be searched for one or more key words and phrases, such as "confidential," "proprietary," "attorney-client privileged," etc., and if such a key word or phrase is found the attachment can be encrypted. It will be appreciated that rules and/or policies can allow the enterprise to configure features related to protecting attachments in a flexible way, based on mobile device properties, user properties, attachment properties, the like, or any combination thereof. Any of the rules and/or policies related to protecting attachments can be implemented in combination with any of the other rules described herein, rules packages described herein, policies described herein, the like or any combination thereof.

Moreover, any of these rules and/or policies related to protecting attachments can be implemented by any suitable computer hardware described herein. For example, the secure mobile gateway 128 can be configured to enable and/or disable features related to protecting attachments, such as encrypting attachments, globally. The secure mobile gateway 128 can obtain policies from the mobile device management system 126 related to protecting attachments. The mobile device management system 126 can be configured to manage any selection policy related to protecting attachments, such as which mobile devices 120 receive encrypted attachments and/or what type of attachments are encrypted.

In a typical use case scenario, a mobile device 120 can receive an email with an attachment from an enterprise email server, such as an Exchange server, in accordance with an ActiveSync protocol. The mobile device 120 can retrieve encrypted email attachments such that the attachment data saved on the mobile device 120 is protected with device-specific keys. The saved attachment data can only be decrypted using an enterprise agent 320 running on the mobile device 120, according to certain embodiments. For instance, the enterprise agent 320 can control and manage the device-specific key used to decrypt the attachment data. A mobile device management system 126 can select or specify the mobile devices 120 and/or users for which attachments are to be encrypted. For example, selected mobile devices 120 may be excluded from receiving encrypted attachments based on one or more mobile device management system 126 policies and/or one or more secure mobile gateway 128 policies.

Encrypted attachments that are forwarded and/or sent from a mobile device 120 can be decrypted by the secure mobile gateway 128 before being delivered to new recipient(s). As a result, a new recipient within the enterprise can receive the attachment based on its policy. When the new recipient is a mobile device 120 with an enterprise agent 320, the attachment data can be re-encrypted for that particular recipient mobile device 120. When the new recipient is an unmanaged mail client, the attachment data can be delivered unencrypted.

Example communications and events related to delivering an email with an attachment from an enterprise resource 130 to a mobile device 120 via a secure mobile gateway 128 will be described with reference to FIG. 31. Then example communications and events related to forwarding and/or sending an email from a mobile device 120 through a secure mobile gateway 128 and an enterprise resource 130 will be described with reference to FIGS. 32 and 33.

Figure 31:
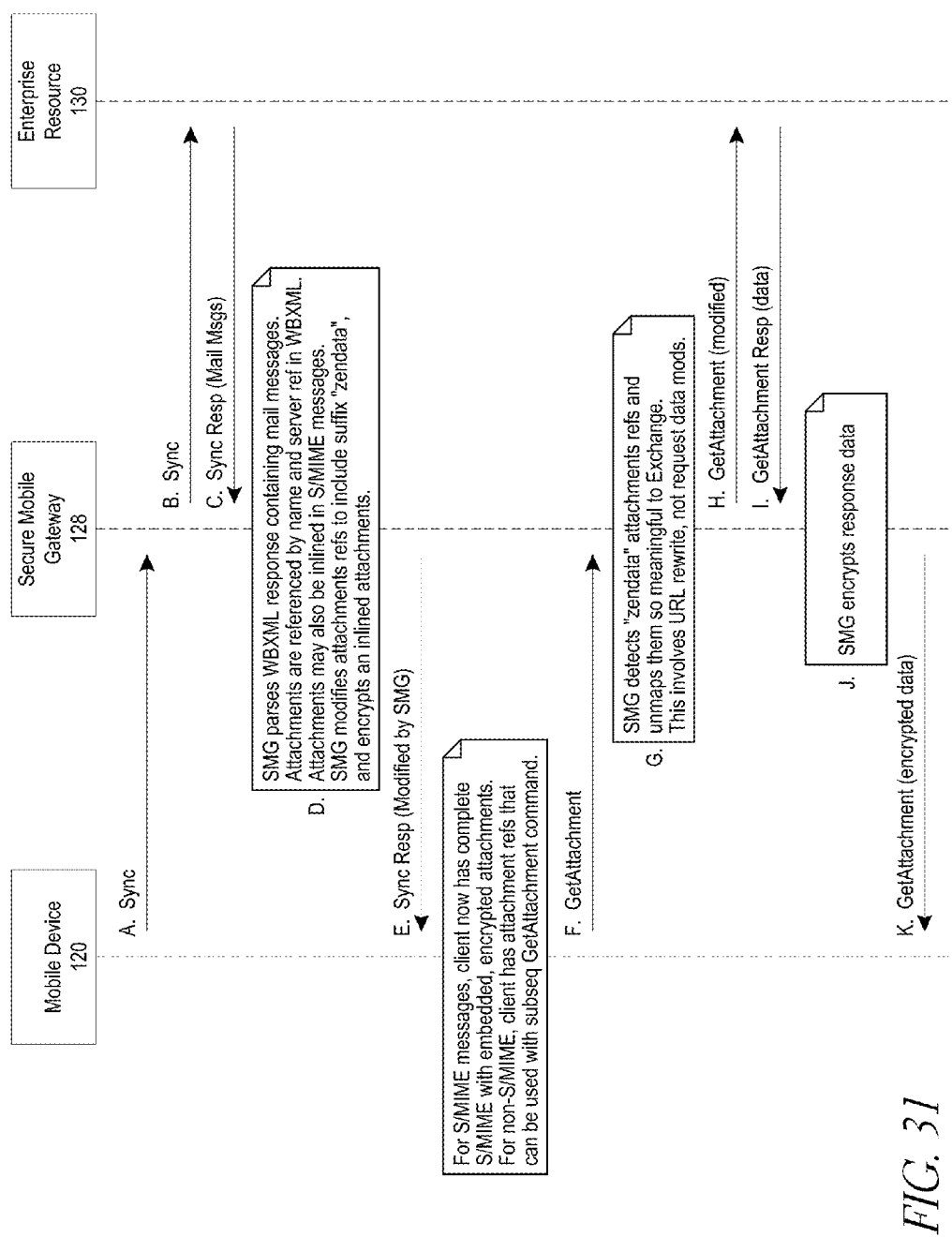
FIG. 31 illustrates representative communications and events that occur when a mobile device retrieves a message with an attachment from an enterprise resource according to an embodiment.

FIG. 31 illustrates an example of a process by which an email message with an encrypted attachment can be delivered to a mobile device 120. In this process, the secure mobile gateway 128 identifies an attachment to an email message being delivered to a mobile device 120. The secure mobile gateway 128 can encrypt the attachment data prior to transmitting the attachment to a mobile device 120. The attachment data can be encrypted and sent to the mobile device 120 either when the email message is sent to the mobile device 120 or in response to a user of the mobile device 120 attempting to open the attachment. The secure mobile gateway 128 can also encrypt an attachment key associated with the encrypted attachment data. In event A of FIG. 31, the mobile device 120 transmits a sync request to the secure mobile gateway 128, for example, by way of the ActiveSync protocol. Then the secure mobile gateway 128 transmits a sync request to an enterprise resource 130 in event B. The enterprise resource 130 may, for example, be an enterprise email server, such as a Microsoft Exchange Server. In event C, the enterprise resource 130 sends a sync response to the secure mobile gateway 128. The sync response can include email messages to be delivered to the mobile device 120.

In event D of FIG. 31, the secure mobile gateway 128 processes an email message being sent to the mobile device 120. Such processing can include determining whether the email message includes an attachment. For instance, when the enterprise email server sends a response that includes email messages in event C, the secure mobile gateway 128 can parse the response and programmatically identify attachments. For example, attachments can be identified from a name and a server reference in a WBXML message. As another example, attachments can be identified by being inlined in a MIME message. The secure mobile gateway 128 can mark and/or modify the attachment in a detectable way. For instance, the secure mobile gateway 128 can rename an attachment. In one embodiment, a suffix can be appended to the name of an attachment document. For example, an attachment with an original name of "Foo.xyz" can be renamed to "Foo.xyz.zendata".

An attachment can also be encrypted in event D of FIG. 31 when the attachment is inlined, such as in a MIME message, or otherwise included with the email in a substantially compete form. Any suitable attachment can be encrypted, such as a document (for example, a Word document, a PDF document, etc.). The secure mobile gateway 128 can also encrypt an attachment key associated with the attachment. The attachment key can be generated by the secure mobile gateway 128 and/or received by the secure mobile gateway 128 from the mobile device management system 126, for example, as discussed in more detail with reference to FIG. 34. The encrypted attachment key can be included in the new attachment file with the encrypted attachment data.

The sync response from the enterprise email server and/or another enterprise resource 130 as modified by the secure mobile gateway 128 is delivered to the mobile device 120 in event E of FIG. 31. This can provide the mobile device 120 with encrypted attachment data in some circumstances. For example, MIME messages with embedded, encrypted attachments can be provided to the mobile device 120. For some other types of messages, emails with renamed attachment references that can be used with subsequent requests to retrieve attachments are provided to the mobile device 120.

For emails with attachment references, such as WBXML emails, a request to retrieve attachments can be sent from the mobile device 120 in event F of FIG. 31. Then, in event G, the secure mobile gateway 128 can detect that the attachment reference has been marked and/or modified. For example, the secure mobile gateway 128 can programmatically identify that that attachment reference includes a particular suffix previously added by the secure mobile gateway 128, such as "zendata" in the example provided above. The secure mobile gateway 128 can then unmap the attachment reference so that the enterprise email server and/or another enterprise resource 130 can process a request to provide the attachment. In some embodiments, this can involve a URL rewrite. In event H, the secure mobile gateway 128 requests the attachment from the enterprise email server and/or another enterprise resource 130. Then the enterprise email server delivers the attachment to the secure mobile gateway 128 in event I. The secure mobile gateway encrypts the attachment in event J. The secure mobile gateway 128 can also encrypt an attachment key associated with the attachment. The encrypted attachment key can be included in a file with the encrypted attachment data and/or provided separately to the mobile device 120. Then in event K, the secure mobile gateway 128 delivers the encrypted attachment data to the mobile device 128.

Figure 32:
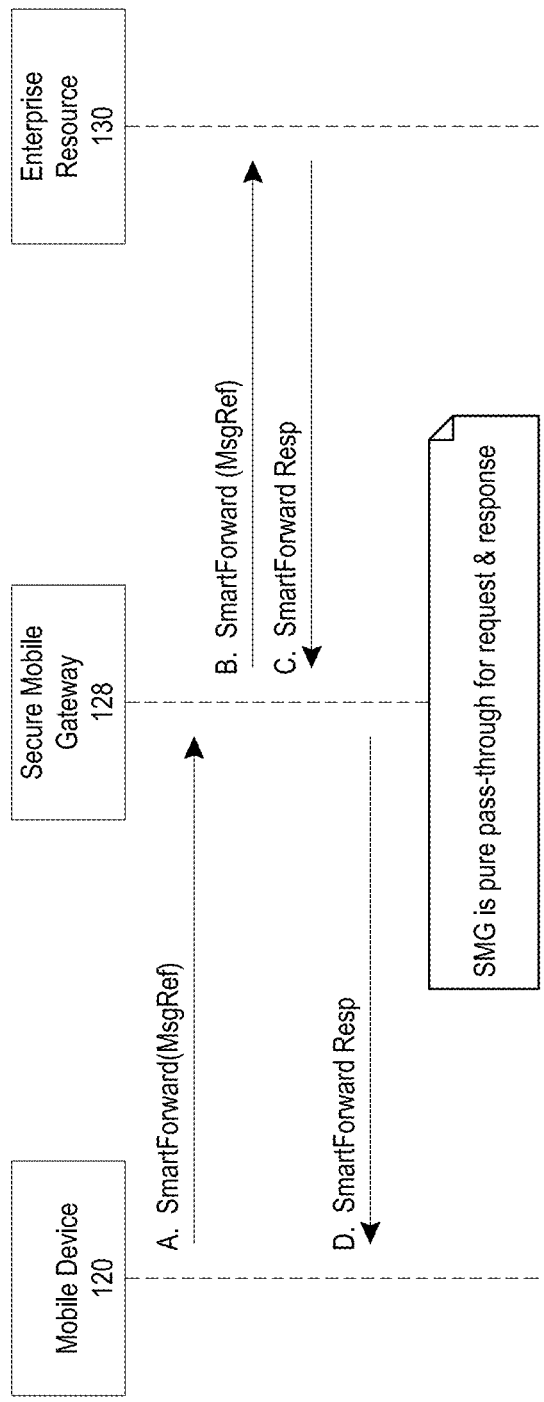
FIG. 32 illustrates communications and events that occur when a mobile device forwards a message with an attachment according to an embodiment.
Figure 33:
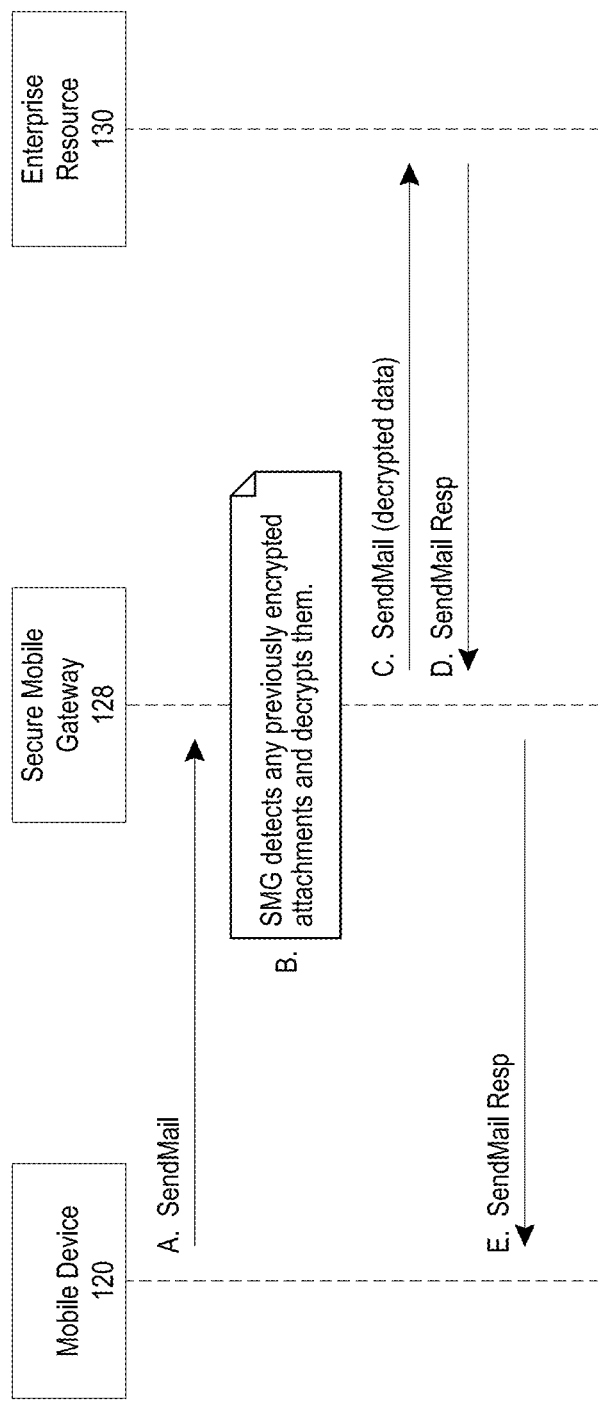
FIG. 33 illustrates communications and events that occur when a mobile device forwards a message with an attachment according to another embodiment.

Email messages and associated attachments stored on a mobile device 120 can be forwarded from the mobile device 120 to a new recipient. FIGS. 32 and 33 illustrate examples of processes of forwarding an email message from a mobile device 120. In the example illustrated in FIG. 32, a secure mobile gateway 128 can function as a pass through in transmitting a request to forward an email message with an attachment from the mobile device 120 to an enterprise resource 130, such as an enterprise email server. The process illustrated in FIG. 32 can be implemented in situations in which the email with the attachment is stored on the enterprise email server or in which the enterprise email server otherwise has access to the attachment data. For instance, the mobile device 120 can send information identifying the attachment, such as a reference, to the enterprise email server via the secure mobile gateway 128. In some embodiments, the process of FIG. 32 can be implemented with a Smart Forwarding feature in which a marker is inserted in a forwarded email message with an attachment. The enterprise resource 130 (for example, an Exchange server or other enterprise email server) can insert the attachment into the forwarded email message that is sent to the recipient by the Smart Forwarding feature. In this way, the mobile device 120 can forward the email message without downloading the entire email message and attachment to the mobile device 120.

In event A of FIG. 32, the mobile device 120 sends, to the secure mobile gateway 128, a request to forward an email message that includes a reference to the attachment. Then the secure mobile gateway 128 simply passes through the email message to the enterprise resource 130 in event B. The enterprise email server can then use the reference to identify the attachment that is stored on the enterprise email server. The email and the attachment can then be sent to the recipient via the process illustrated in FIG. 31 when the recipient is a mobile device 120 associated with the enterprise. In event C, the enterprise resource 130 responds to the secure mobile gateway 128 to confirm that the message has been sent. The secure mobile gateway 128 passes through the response to the mobile device 120 in event D.

In the example illustrated in FIG. 33, the secure mobile gateway 128 decrypts encrypted attachment data from the mobile device 120 when transmitting a request to forward the email message with the attachment from the mobile device 120 to an enterprise resource 130, such as an enterprise email server. The process illustrated in FIG. 33 can be implemented in situations in which the email message with the attachment is being transmitted from the mobile device 120. Such a process can be implemented, for example, on mobile devices 120 in which the process illustrated in FIG. 32 is unsupported (such as mobile devices 120 that do not support Smart Forwarding) and/or disabled.

In event A of FIG. 33, the mobile device 120 sends a request to forward an email message with an attachment to the secure mobile gateway 128. The request can include the encrypted attachment data. The secure mobile gateway 128 detects a previously encrypted attachment and decrypts the encrypted attachment data at in event B. For instance, the secure mobile gateway 128 can programmatically identify attachments that are marked and/or modified to indicate that they are encrypted, such as having the suffix ".zendata" in an example provided above. More details regarding some example decryption methods that can be performed in event B will be described with reference to FIG. 35. In event C, the request to forward the email message including the decrypted attachment data is transmitted to the enterprise resource 130. The enterprise resource 130 responds to the secure mobile gateway 128 to confirm that the message has been sent in event D. The secure mobile gateway 128 passes through the response to the mobile device 120 in event E.

To encrypt email attachments, various keys can be generated, delivered to other devices, encrypted, used to decrypt encrypted attachment data, the like, or any combination thereof. Although encryption of email attachments may be described herein with reference to certain computing devices performing particular functionalities for illustrative purposes, it will be understood that any of the features related to encrypting and/or decrypting an attachment described herein can be performed by any suitable computing device. For example, some functions related to encryption/decryption or a subcombination thereof that are described as being performed by the secure mobile gateway 128 and/or the mobile device management system 126 can be performed by the mobile device 120. As another example, some functions related to encryption/decryption or a subcombination thereof that are described as being performed by either the secure mobile gateway 128 or the mobile device management system 126 can alternatively or additionally be performed by the other of the two computing systems.

In certain embodiments, the secure mobile gateway 128 can generate keys related to an attachment and the mobile device management system 126 can generate keys for selected mobile devices 120. For instance, the secure mobile gateway 128 can generate a symmetric secure mobile gateway key Smgkey and store this key in a suitable data store. The symmetric secure mobile gateway key Smgkey can be generated, for example, when the secure mobile gateway 128 is being installed and/or when software is being installed thereon. According to some embodiments, the mobile device management system 126 can generate an asymmetric key DeviceKey associated with a selected mobile device 120. Alternatively or additionally, the mobile device management system 126 can generate an asymmetric key associated with a group of mobile devices 120, a user of the enterprise, the like, or any combination thereof. Such an asymmetric key can be used in place of the asymmetric key DeviceKey or in combination with the asymmetric key DeviceKey. The mobile device management system 126 can distribute a private key DeviceKeyPr of the asymmetric key DeviceKey to the selected mobile device 120. The mobile device management system 126 can distribute a public key DeviceKeyPb of the asymmetric key DeviceKey to the secure mobile gateway 128.

Figure 34:
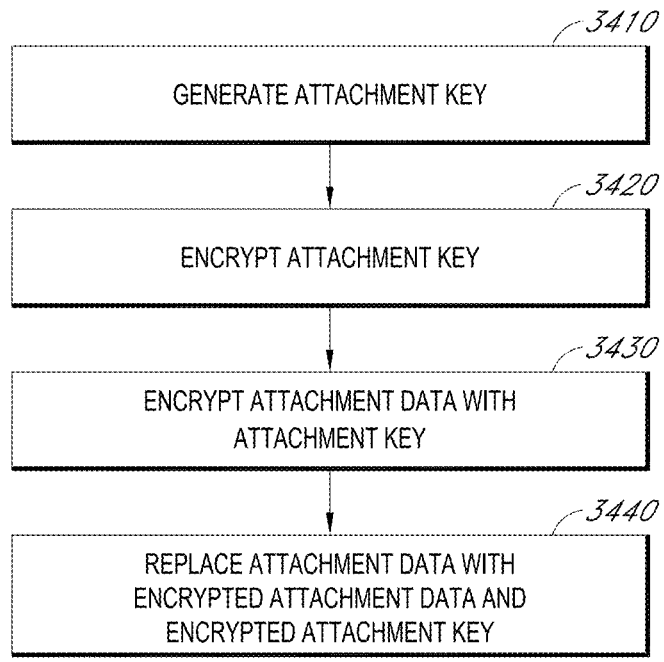
FIG. 34 is a flowchart illustrating an embodiment of a method of encrypting an attachment.

FIG. 34 is a flowchart illustrating an embodiment of a method of encrypting an attachment. Some or all of the method steps illustrated in FIG. 34 can be performed, for example, in event D and/or in event J of FIG. 31. At block 3410, an attachment key AttachmentKey is generated. The attachment key AttachmentKey can be a symmetric key. The attachment key AttachmentKey can be generated by the secure mobile gateway 128.

The attachment key AttachmentKey is encrypted at block 3420. For example, the secure mobile gateway 128 can encrypt the attachment key AttachmentKey with the secure mobile gateway key Smgkey. This produces an encrypted secure mobile gateway attachment key EncyptedSmgAttachmentKey for the secure mobile gateway 128, which can be used by the secure mobile gateway 128 to decrypt the encrypted attachment data, for example, as described with reference to FIG. 35. Additionally, the secure mobile gateway 128 can encrypt the attachment key AttachmentKey with the public key DeviceKeyPb. This produces an encrypted device attachment key EncryptedDeviceAttachmentKey for the mobile device 120, which can be used by the mobile device 120 to decrypt the encrypted attachment data, for example, as described with reference to FIG. 35.

At block 3430, attachment data is encrypted with the attachment key AttachmentKey to generate encrypted attachment data. The secure mobile gateway 128 replaces previous attachment data with encrypted attachment data at block 3440. The encrypted attachment keys EncryptedSmgAttachmentKey and EncryptedDeviceAttachmentKey can also be included with the encrypted attachment data. For example, the secure mobile gateway 128 can replace attachment data with encrypted attachment data, the encrypted secure mobile gateway attachment key EncyptedSmgAttachmentKey and the encrypted device attachment key EncryptedDeviceAttachmentKey.

Figure 35:
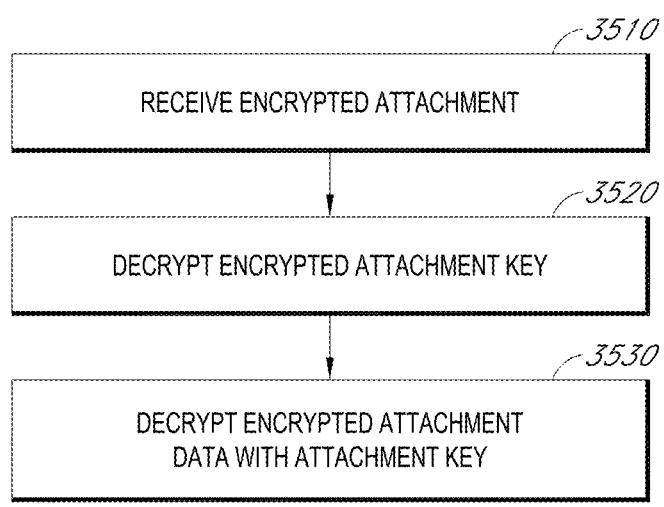
FIG. 35 is a flowchart illustrating an embodiment of a method of decrypting an attachment.

Encrypted attachment data can be decrypted in order to access the attachment data. In certain embodiments, a user can be prompted to log-in or otherwise supply access credentials when accessing encrypted attachment data on a mobile device 120. To maintain the protection of the encrypted attachment data, the encryption keys associated with the attachment data can be provided to particular computing devices. For instance, as discussed with reference to block 3420 of FIG. 34, the secure mobile gateway 128 can encrypt the attachment key AttachmentKey specifically for use with a selected mobile device 120 and/or the secure mobile gateway 128. FIG. 35 is a flowchart illustrating an embodiment of a method of decrypting an attachment. Some or all of the method steps illustrated in FIG. 34 can be performed, for example, by either a mobile device 120 or the secure mobile gateway 128 when encrypted attachment data stored on the mobile device is accessed by an application on the mobile device 120 and/or in event B of FIG. 33.

At block 3510, a computing device receives an encrypted attachment. In certain embodiments, the computing device can also receive an encrypted attachment key with the encrypted attachment data. The encrypted attachment data and the encrypted attachment key can both be included in the same file, according to some of these embodiments. The encrypted attachment key is decrypted at block 3520. Then, at block 3530, the attachment data is decrypted using the attachment key.

The method illustrated in FIG. 35 can be performed, for example, by an enterprise agent 320 on a mobile device 120. This can include the mobile device 120 receiving an encrypted attachment and an encrypted attachment key, for example, in accordance with the process illustrated in FIG. 31. The enterprise agent 320 of the mobile device 120 can decrypt an encrypted device attachment key EncryptedDeviceAttachmentKey with a private device key DeviceKeyPr. The decrypted device attachment key can be the attachment key AttachmentKey. With the attachment key AttachmentKey, the enterprise agent 320 of the mobile device 120 can decrypt the encrypted attachment data. This can provide the mobile device 120 with the original attachment data sent to the mobile device 120 by an enterprise resource 130, such as an enterprise email server. Such data can be, for example, plain-text data.

The method illustrated in FIG. 35 can be performed, for example, on a secure mobile gateway 128. This can include the secure mobile gateway 128 receiving an encrypted attachment, for example, when a mobile device 120 forwards an email message with an encrypted attachment. The secure mobile gateway 128 can decrypt an encrypted secure mobile gateway attachment key EncryptedSmgAttachmentKey with the secure mobile gateway key Smgkey. The decrypted device attachment key can be the attachment key AttachmentKey. With the attachment key AttachmentKey, the secure mobile gateway 128 can decrypt the encrypted attachment data. This can provide the secure mobile gateway 128 with the original attachment data previously sent to the mobile device 120 by an enterprise resource 130, such as an enterprise email server. The secure mobile gateway 128 can then forward the attachment data to the enterprise resource 130.

To support distribution and/or updating of public device keys, such as the public device key DeviceKeyPb, a web service interface or other suitable interface can be provided. The interface can enable a user to define device/key pairs and/or user/key pairs. The interface can enable a user, such as an IT staff member or an enterprise network administrator, to update the key pairs by, for example, adding new pairs, replacing existing pairs, removing pairs, the like, or any combination thereof. The interface can enable a user to map a mobile device 120 to a set of properties (for example, name/value pairs). Such properties can include the attachment public key, blocking attachments, blocking selected attachment types, blocking contact sync, blocking calendar sync, client certificate ID, any of the other properties described herein, the like, or any combination thereof.

Application Tunnels

With reference to FIGS. 1A-3, a tunneling mediator, such as the tunneling mediator 224 of the mobile device management system 126, can be configured to receive access requests generated by software applications 318 installed on the mobile devices 120, for access to the enterprise resources 130 (especially enterprise resources 130 comprising software applications), and to generate application tunnels between the device applications 318 and the enterprise resources 130. An application tunnel is a technique in which one network protocol (for example, the delivery protocol) encapsulates a different network protocol. By using tunneling, it is possible to, for example, provide a secure path through an untrusted network.

One benefit of using application tunnels for communications between mobile device applications 318 and enterprise resources 130 is that it is possible to limit the mobile device's access to those enterprise resources 130 that the user 115 of the mobile device 120 needs for the performance of his or her enterprise role 206. Another potential advantage of using application tunnels is that access control can be provided at the application level for pre-existing applications. In preferred embodiments, the application tunnels are defined at the application layer in the OSI model. This is in contrast to a virtual private network (VPN), a methodology which is widely used to provide remote offices or individual users secure access to their organization's network. A VPN operates at the network layer (or lower) of the Open Systems Interconnection (OSI) model and ordinarily provides users with full access to all of the resources within an enterprise's computer network. A significant problem with using a VPN connection is that no suitable mechanism exists for restricting access by the mobile applications (and potentially mobile applications containing malware) to the VPN connection. In contrast, as described below, each application tunnel may be exclusive to (available for use only by) a single, corresponding mobile application. By limiting access only to enterprise resources 130 needed by a particular user 115, the use of application tunnels can promote enterprise network security.

As explained in further detail below, an additional benefit of using application tunnels for communications between a mobile device 120 and an enterprise system 110 is that it allows the enterprise to improve the user's connectivity experience (e.g., by caching data in the event of a network connection loss), log data flows, and implement other features.

In order to implement the application tunnels, a tunneling mediator can be provided, through which the tunneled communications flow. The tunneling mediator is a component that receives mobile device application communications formatted according to an encapsulation protocol, "unpacks" or extracts data from the communications using the protocol, and sends the unpacked or extracted data to a network resource requested or specified by the mobile device application. The tunneling mediator also does substantially the same for communications sent by a network resource to a mobile device application via the tunneling mediator. The tunneling mediator can comprise a software application installed on a server. The tunneling mediator can be located within the enterprise system 110 (e.g., the tunneling mediator 224 of the mobile device management system 126), or alternatively outside of the enterprise system 110 (e.g., in a cloud computing environment 156 as in FIG. 1B).

A tunneling mediator or enterprise agent 320 can use a tunnel definition to construct an application tunnel, in accordance with methods described below. The mobile device management system 126 illustrated in FIG. 2 includes a repository 228 of tunnel definitions. A tunnel definition can include information to implement an application tunnel between a mobile device application 318 and a remote resource (such as an enterprise resource 130). A tunnel definition can be specific to a particular application 318 or type thereof. Similarly, a tunnel definition can be specific to a particular remote resource or type thereof. A tunnel definition can identify a specific port of a mobile device 120 and/or a URL or specific port of a computer server on which the remote resource is installed. Accordingly, a tunnel definition can include an application or server port and information mapping such a port to a client port to specify the endpoints of an application tunnel. A tunnel definition can also include a URL of a tunneling mediator, which can be useful, particularly in implementations involving multiple tunneling mediators. Multiple application tunnels can be mapped to a specific port of a mobile device 120 and/or a URL or specific port of a computer server on which the remote resource is installed, and the multiple application tunnels can be multiplexed such that a single port of the mobile device 120, and/or a URL or specific port of the computer server on which the remote resource is installed, is used to implement multiple application tunnels. The mobile device management system 126 can be configured to send (e.g., push) at least portions of the tunnel definitions 228 to mobile devices 120. For example, the tunnel definitions can be sent with the "rule packages" described below. The enterprise agents 320 can be configured to store the tunnel definitions locally on the mobile devices 120, and use the tunnel definitions to generate application tunnel formation requests, as described below.

A tunneling mediator or related system can include an interface, such as a web console, for viewing, creating, and editing tunnel definitions. The interface can also allow an administrator or other person to view data associated with mobile devices 120 adapted to connect via application tunnels. At least some of the data can be obtained from the repository of mobile device information 204 (FIG. 2).

Many mobile device software applications 318 are capable of issuing network communications (also referred to as "application-generated communications"), including requests to access and communicate with enterprise resources 130. The enterprise agent 320 can be configured to intercept and/or receive these communications, and redirect at least some of them to URLs associated with one or more tunneling mediators, such as the mediator 224. The tunneling mediator can redirect the application-generated communications to requested enterprise resources 130, receive responsive communications from the enterprise resources 130, and forward the responsive communications back to the mobile devices 120. Advantageously, the tunneling mediator can add a layer of enterprise security by applying access policies 218 to grant or deny access, and restricting access only to the requested enterprise resources 130.

In one embodiment, upon intercepting and/or receiving an application-generated communication for accessing an enterprise resource 130 (or another resource), the enterprise agent 320 searches the application tunnel definitions stored in local storage to retrieve a tunnel definition associated with the software application 318 that produced the application-generated communication, and/or associated with the requested enterprise resource 130 (or other resource). The enterprise agent 320 generates an application tunnel formation request that identifies the retrieved tunnel definition, and encapsulates at least a portion of the application-generated communication within one or more headers of an encapsulation protocol. The encapsulated application-generated communication is also referred to herein as an "agent-generated communication." The enterprise agent 320 sends the application tunnel formation request and the encapsulated application-generated communication (which can together comprise a single communication) to the tunneling mediator 224 (e.g., via connections 142 and 144 of FIGS. 1A and 1C, or via connections 142 and 160 of FIG. 1B) or another such mediator defined in the tunnel definition. Skilled artisans will appreciate that the defined tunneling mediator can be one of a plurality of tunneling mediators associated with the agent 320 and enterprise system 110.

The tunneling mediator 224 receives the application tunnel formation request (which identifies the tunnel definition) and the agent-generated communication. The tunneling mediator 224 can read the tunnel definition identified in the tunnel formation request and then retrieve the identified tunnel definition from the repository 228. The tunneling mediator 224 can determine, from the retrieved tunnel definition or even from the information provided in the tunnel formation request, a URL and/or port of a computer server or other computing device on which the requested enterprise resource 130 is located. The tunneling mediator 224 opens a network connection to the server port (e.g., the connection 152 of FIGS. 1A and 1C, or the connection 162 of FIG. 1B). In some embodiments, the tunneling mediator 224 remains connected to the enterprise resource 130 at all times or during pre-scheduled time ranges, such that a connection can be available immediately upon the receipt of an application tunnel formation request from a mobile device 120. Based on the encapsulation protocol, the tunneling mediator 224 extracts the application-generated communication from the agent-generated communication, and sends the former to the URL/server port associated with the requested enterprise resource 130. At this point, an application tunnel has been formed between the mobile device 120 and the requested enterprise resource 130. In some embodiments, the tunneling mediator 224 sends a message back to the mobile device 120 to indicate the formation of the tunnel, and asks that the enterprise agent 320 affirmatively accept the tunnel before sending application-generated communications to the enterprise resource 130. Once the tunnel is formed, the enterprise agent 320 can send additional application-generated communications (encapsulated using the encapsulation protocol) to the tunneling mediator 224, which can forward them to the enterprise resource 130.

Communications in the opposite direction (e.g., from an enterprise resource 130 to a mobile device application 318)

can be encapsulated by the tunneling mediator 224, sent by the tunneling mediator 224 to the mobile device 120, and then unpacked by the enterprise agent 320, in accordance with the encapsulation protocol. The tunneling mediator 224 can communicate with the enterprise resource 130 as though the mediator 224 is the mobile device application 318, and so that responses generated by the enterprise resource 130 are returned to the tunneling mediator 224 (e.g., via connection 152 of FIGS. 1A and 1C, and connection 162 of FIG. 1B). When the tunneling mediator 224 receives such responses to the application-generated communications, the tunneling mediator 224 can encapsulate at least a portion of each of these "resource-generated responses" within one or more headers, such as HTTP headers, in accordance with the encapsulation protocol, and then send the encapsulated response to the enterprise agent 320 (e.g., via connections 144 and 142 of FIGS. 1A and 1C, and connections 160 and 142 of FIG. 1B). The tunneling mediator 224 can be configured to send its communications to a specific port of the mobile device 120, the port being defined in the tunnel definition associated with the operative application tunnel. The enterprise agent 320 can be configured to "listen" to this local port for tunneled communications from the tunneling mediator 224. Based on the encapsulation protocol, the enterprise agent 320 can extract the resource-generated response from the one or more headers, and then provide the resource-generated response to the application 318.

In this type of application tunnel, the software application 318 installed on the mobile device 120 can be given an impression that it is connecting directly with a resource (such as an enterprise resource 130) associated with the URL of the network request issued by the application 318. In reality, the application 318 is actually communicating with the resource via a tunneling mediator (such as the tunneling mediator 224). Thus, the application 318 need not be aware of the tunnel's existence.

In some embodiments, the enterprise agent 320 can be configured to filter out those application-generated communications that meet predefined and/or configurable criteria. Such criteria can include, for example, any one or more of the following, as well as various other criteria: (1) the URL (e.g., of the enterprise system 110, or of web sites whose access is restricted by the enterprise), (2) server port(s) to which an application 318 attempts to send the request, (3) data regarding the application that issues the request (e.g., name, version, etc.), (4) time of day, (5) day of the week, and/or (6) geographic location of the mobile device 120. Such filtering criteria can be communicated to a mobile device 120 by the enterprise system 110 via wireless communications to the enterprise agent 320.

In one method of initiating the formation of an application tunnel, the enterprise agent 320 is configured to intercept the application-generated communications from the software applications 318. For instance, in mobile devices 120 running certain Microsoft™ operating systems (e.g., Windows Mobile™, Windows CE™), it is possible to use a layered service provider (LSP) to filter network requests issued by mobile device applications 318. An LSP, which is a feature of the Microsoft Windows Winsock 2 Service Provider Interface (SPI), is a DLL that uses Winsock APIs to insert itself into the TCP/IP protocol stack. Once in the stack, the LSP can intercept and modify inbound and outbound Internet traffic. The LSP can allow for processing of all the TCP/IP traffic taking place between the Internet and the device's software applications 318. The LSP can be configured to be loaded automatically by any application 318 that uses network connections. The LSP has a layered model, like a filter. Thus, every time an application 318 makes a network call, it goes through the LSP. The LSP allows the enterprise agent 320 to intercept every application network communication attempting to send information to one or more defined URLs, and redirect the communication to a tunneling mediator, such as the mediator 224 associated with the enterprise system 110. In this manner, the enterprise agent 320 can detect requests from the applications 318 to connect to the enterprise resources 130, and modify and redirect the requests to a URL of the tunneling mediator. The enterprise agent 320 can be configured to filter requests from the applications 318 by one or more identified ports of the enterprise resources 130. The enterprise agent 320 can be configured to select port(s) of the tunneling mediator(s) to send the redirected requests, based at least partly on the enterprise resource ports provided within the requests.

As noted above, after the tunneling mediator establishes an application tunnel connection between the mediator and the requested resource, the mediator can send a notification thereof to the enterprise agent 320, and the enterprise agent 320 can accept the application tunnel connection. All of this can happen transparently with respect to the software application 318. The application 318 can send network requests via the tunneling mediator without modifications or reconfiguration of the application 318, according to certain embodiments.

Unfortunately, in some mobile devices it is difficult or even impossible for a mobile device 120 to intercept network connection requests issued by software applications 318. Some mobile device operating systems (such as iOS™ and Android™) can restrict the ability of different software applications to interact and share data with each other. Such restrictions are sometimes referred to as the "sandboxing" of software applications, and can be useful in preventing rogue applications from stealing data from mobile devices 120 and sending the data to unauthorized Internet locations. This can prevent an enterprise agent 320 from accessing or modifying network requests issued by the applications 318.

Hence, another approach to initiating the formation of an application tunnel is to reconfigure how the software applications 318 send their network requests (or at least some of them). In certain embodiments, a software application 318 is reconfigured to send its network requests to a local host of the mobile device 120, on a defined mobile device port. The enterprise agent 320 can be configured to "listen" to the port and react to an application's network request by establishing a connection with a tunneling mediator (if it is not already established) to open an application tunnel with a resource requested by the application 318. The enterprise agent 320 can consult the relevant application tunnel definition in order to determine the port to which to listen for the application tunnel request. In other embodiments, a software application 318 is reconfigured to send at least some of its network requests directly to the tunneling mediator. Further, the application 318 can also be configured to "unpack" communications (encapsulated via the encapsulation protocol) received from the tunneling mediator. An enterprise can make available an application store of downloadable mobile device applications 318 that are configured to generate application tunnel requests as described herein.

Encapsulation protocols for producing application tunnels are now further described. The enterprise agent 320 or software applications 318 (depending on which particular approach to forming an application tunnel is used) can be configured to modify the software application's network connection request using any of a variety of different methods or encapsulation protocols. An encapsulation protocol for use in an application tunnel can allow for the addition of metadata for various purposes. For example, the encapsulation protocol, via added metadata, can identify the particular application tunnel, which allows the tunneling mediator to distinguish the tunnel from other application tunnels that the tunneling mediator may simultaneously be handling. This can help to prevent mixing data between the different application tunnels, helping to ensure that the tunneled data is delivered to the correct resource (e.g., enterprise resource 130). Stated differently, the encapsulation protocol may add metadata that enables multiple application tunnels to be multiplexed for transmission on a common connection. The added metadata can also specify the length of each message sent through the tunnel. Added metadata can also be unrelated to the application tunnel or to the application 318 that initiated the tunnel, such as a list of software applications 318 installed on the mobile device 120, or results of commands sent to the mobile device 120 by the mobile device management system 126. Such data can be used by the mobile device management system 126 to update the mobile device information 204.

A typical network connection request generated by the software application 318 may use a multi-layered communication protocol involving multiple protocol headers. In a simplified example, the access request generated by the software application 318 may take the following form:

[IP header] [TCP header] [HTTP header] [SOAP header] [SOAP body], wherein "IP" refers to the Internet Protocol, "TCP" refers to the Transmission Control Protocol, "HTTP" refers to the Hypertext Transfer Protocol, and "SOAP" refers to the Simple Object Access Protocol. In this example, the mobile device's enterprise agent 320 can be configured to intercept this communication (e.g., by use of an LSP) at the TCP layer, and then rewrap or encapsulate the TCP payload (which in this example is [HTTP header] [SOAP header] [SOAP body]) in multiple layers according to an encapsulation protocol used by the enterprise agent 320. For example, the enterprise agent 320 could rewrap or encapsulate the TCP payload within the following plurality of layers: SSL (Secure Sockets Layer), TCP, IP, etc. The enterprise agent 320 can then send the encapsulated request to the tunneling mediator. In other embodiments, as described above, the software application 318 can be configured to send the request to a local port of the mobile device 120 (from which the enterprise agent 320 receives, encapsulates, and redirects the request to the tunneling mediator), or even encapsulate the request and send it directly to the tunneling mediator.

Upon receipt of the encapsulated request from the mobile device 120, the tunneling mediator can unpack the request according to the encapsulation protocol. In the above example, the tunneling mediator extracts the TCP payload generated by the mobile device's software application 318. The tunneling mediator can then send the TCP payload to a URL/port (obtained from the relevant tunnel definition 228) of the requested enterprise resource 130 (e.g., a server port of the server on which the requested enterprise resource 130 is installed). In the above example, the extracted TCP payload contains the higher level protocols, HTTP and SOAP. In certain embodiments, the encapsulation protocol uses Secure Sockets Layer (SSL) over HTTPS to form the tunnel.

Figure 5:
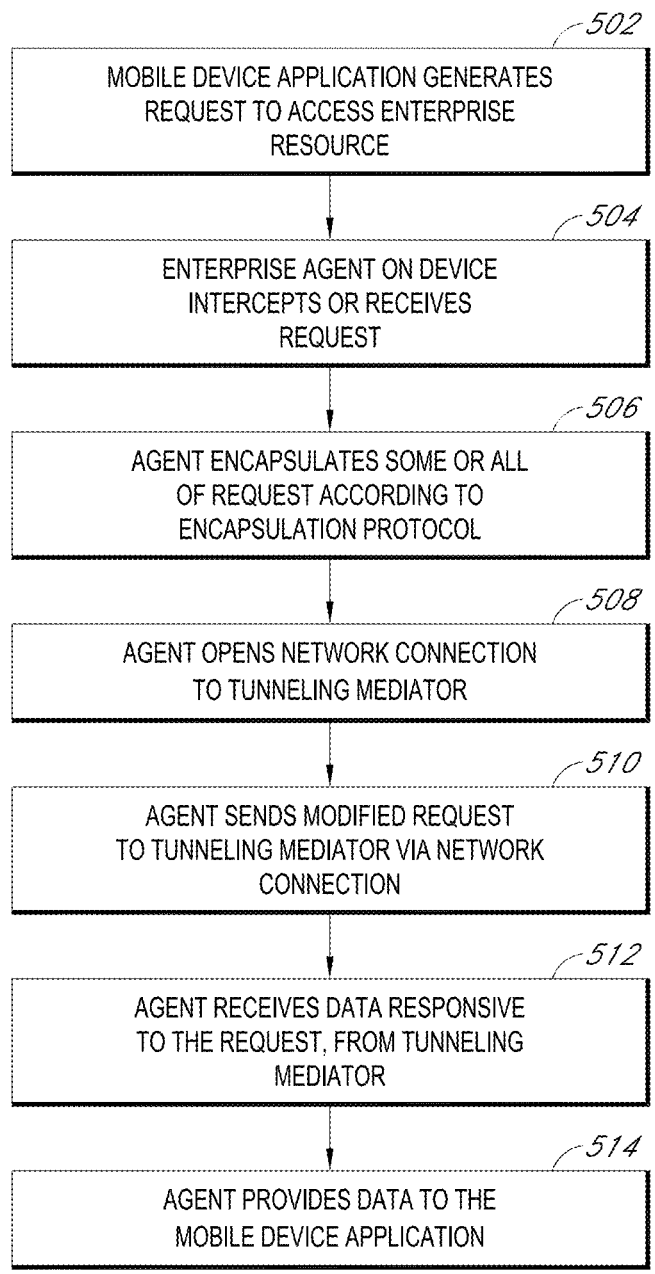
FIG. 5 is a flowchart illustrating an embodiment of a method in which an enterprise agent of a mobile device redirects a mobile device application's communications to an enterprise resource through an application tunnel.

FIG. 5 is a flowchart illustrating an embodiment of a method in which an enterprise agent 320 of a mobile device 120 redirects communications generated by a mobile device application 318 to an enterprise resource 130 through an application tunnel. In step 502, the application 318 generates a network request for access to an enterprise resource 130 of the enterprise computer system 110. As explained above, this request can comprise a payload for the enterprise resource 130, encapsulated within other protocol headers ("application-generated communication"). In step 504, the enterprise agent 320 intercepts or receives the request. In step 506, the enterprise agent 320 modifies the request by encapsulating some or all of the request within one or more headers according to an encapsulation protocol (producing an "agent-generated communication"). For example, the enterprise agent 320 could encapsulate a portion containing the payload for the enterprise resource 130. In step 508, the enterprise agent 320 opens a network connection (e.g., connection 142, 144 of FIGS. 1A and 1C, or connections 142, 160 of FIG. 1B) between the mobile device 120 and a tunneling mediator (e.g., the tunneling mediator 224) associated with the enterprise system 110. In step 510, the enterprise agent 320 sends the agent-generated communication to the tunneling mediator via the network connection. In step 512, the enterprise agent 320 receives data from the tunneling mediator, the received data being responsive to the request ("resource-generated response"). The received data can be encapsulated according to the encapsulation protocol, and the enterprise agent 320 may need to unpack the data, for example, according to the encapsulation protocol. Finally, in step 514, the enterprise agent 320 provides the received data to the application 318.

Figure 6:
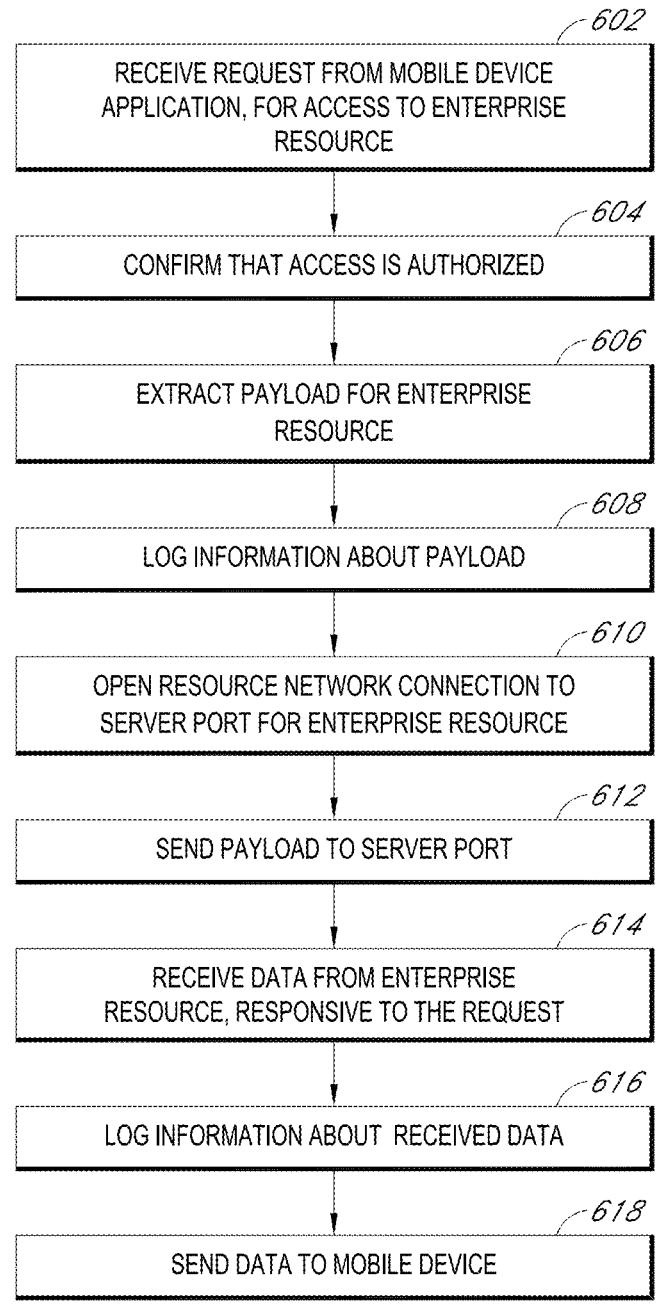
FIG. 6 is a flowchart illustrating an embodiment of a method in which an enterprise computer system participates in the formation of an application tunnel between a mobile device application and an enterprise resource.

FIG. 6 is a flowchart illustrating an embodiment of the application tunneling methodology, from the perspective of the enterprise system 110. As with all of the methods described herein, some of the illustrated steps can be optional. In step 602, a tunneling mediator of or associated with the enterprise system 110 (e.g., the tunneling mediator 224) receives a request from the mobile device application 318, for access to the enterprise resource 130. As explained above, the request can comprise an agent-generated communication—an application-generated communication that the device's enterprise agent 320 has intercepted or received, modified according to the encapsulation protocol, and then redirected to the tunneling mediator (e.g., via network communication links 142 and 144 of FIG. 1A). The request may comprise a payload for the enterprise resource 130. In step 604, the enterprise system 110 can determine whether access to the enterprise resource 130 is authorized. For example, as described below, the mobile device manager 202 or tunneling mediator 224 can determine whether the request is permissible under one or more of the enterprise access policies 218 of the mobile device management system 126. In step 606, the tunneling mediator extracts the payload for the enterprise resource 130 from the encapsulated request after the request is authorized. In step 608, the tunneling mediator or another component of the enterprise system 110 logs information about the request and/or the payload. This logging functionality is described in more detail below. In step 610, the tunneling mediator opens a resource network connection (e.g., connection 152 of FIGS. 1A and 1C, or connection 162 of FIG. 1B) between the tunneling mediator and a server port associated with the requested enterprise resource 130. In step 612, the tunneling mediator sends at least the enterprise resource payload to the server port via the resource network connection. In many applications, the enterprise resource 130 responds to the request by sending data ("resource-generated response") back to the mobile device 120. Accordingly, in step 614, the tunneling mediator receives data (e.g., a plurality of data packets) from the enterprise resource 130, via the resource network connection. The data is typically responsive to the request received in step 602. In step 616, the tunneling mediator (or another component) logs information about the data received from the enterprise resource 130. Finally, in step 618, the tunneling mediator sends the data to the mobile device 120.

The illustrated logging steps 608 and 616 of FIG. 6 can allow an enterprise to keep track of data that flows through the resource network connection (e.g., connections 152, 162 of FIGS. 1A-1C) between the tunneling mediator and the enterprise resource 130. The use of application tunnels for such logging enables user and device behaviors to be tracked at more granular level, and with a greater level of control. For example, because each application tunnel is ordinarily tied to a particular mobile device 120, user, and mobile application, data transmitted over that tunnel can be stored in association with this mobile device, user and application. This gives an enterprise greater visibility into the activities of its mobile device users 115. The tunneling mediator (or other component associated therewith) can be configured to log various types of information, such as the actual data sent through the resource network connection, the amounts of data sent through the resource network connection, types of data sent through the resource network connection, names of files sent through the resource network connection, the number of times a particular user accesses one or more enterprise resources 130, the times at which a user requested access to one or more enterprise resources 130, etc. Analytics can be generated from the logged data. The mobile device management system 126 can set rules based on such analytics. As one example, access to one or more enterprise resources 130 can be restricted for a mobile device 120 with a high volume of downloads.

Application tunnels as described above can also be used for purposes other than accessing enterprise resources 130. For example, as described below in connection with FIGS. 12, 13, and 18), an application tunnel can be used to conduct a "remote control session" between a mobile device 120 and a controller computer.

Another use of an application tunnel involves so-called "web filtering" or "content filtering," in which an enterprise may wish to restrict the network sites (e.g., websites) or other online information resources that a mobile device 120 is authorized to access. Using an application tunnel to perform content filtering can be implemented with features related to modifying a pre-existing mobile application, and/or through the use of a secure web browser as described below. Access can be authorized, for example, at all times, only during business hours, etc. In certain embodiments, the enterprise agent 320 is configured to redirect intranet and/or Internet requests generated by the mobile device 120 (e.g., a URL entered into a web browser, or an HTTP request generated by the web browser, for an information resource available on the world wide web) through an application tunnel to a content-filtering server associated with the enterprise. The content-filtering server acts as a tunneling mediator, and inspects each request to determine whether the requested site is authorized by the enterprise. For example, the content-filtering server can maintain a list of sites that are "blacklisted" by the enterprise, and can deny requests to access blacklisted sites. In certain embodiments, this determination may be based on the specific mobile device 120 and user 115 making the request (e.g., based on user role 206). The content-filtering server can be located within or outside of the enterprise system 110, and could be a third-party server operated at least partially for the benefit of the enterprise. If the request is authorized, the content-filtering server can send the request to a server associated with the authorized site to be accessed by the mobile device 120. The content-filtering server can be configured to modify the request to strip away any headers that were produced by the enterprise agent 320 to form an application tunnel with the content-filtering server (according to the encapsulation protocol). The server associated with the requested site can then receive the request in a form as though it was never sent to the content-filtering server.

Figure 25:
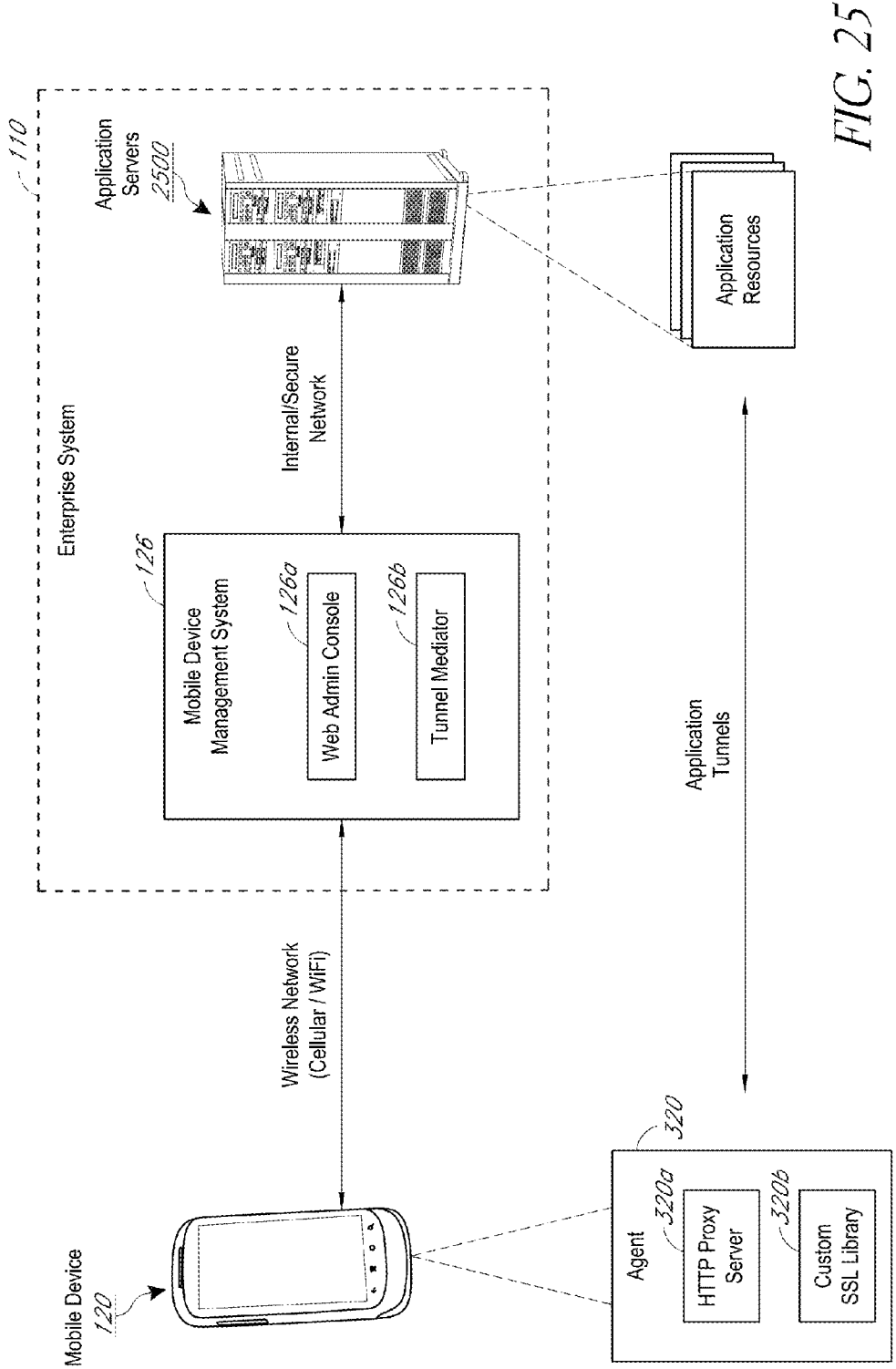
FIG. 25 illustrates an embodiment in which an application tunnel is created using an agent that runs on a mobile device.

FIG. 25 illustrates an embodiment in which application tunnels are created using an enterprise agent 320 that runs on the mobile devices 120 (one shown). In this embodiment, the enterprise agent 320 includes, or acts as, an HTTP proxy server 320a for one or more mobile applications that run on the mobile device 120. The enterprise agent 320 communicates via a wireless network (WIFI, cellular, etc.) with the mobile device management system 126, which may, for example, be implemented on a dedicated server within the enterprise system 110. The mobile device management system 126 illustrated in FIG. 25 includes a web admin console 126a that enables administrators, via a web-based interface, to configure and deploy application tunnels between mobile devices 120 and application servers 2500. The mobile device management system 126 illustrated in FIG. 25 also includes a tunnel mediator 126b which implements the tunneling encapsulation protocol, and which routes packets sent between the mobile devices 120 and application servers 2500.

In this embodiment of FIG. 25, the enterprise agent 320, upon deployment of the application tunnel, creates a socket that listens on a particular port that is known to the mobile application(s) that use the application tunnel. When a mobile application writes to this port (by writing to localhost:XXX, where "XXX" is the listened-to port number), the enterprise agent 320, acting at an HTTP proxy for the mobile application, encapsulates and forwards the message, for example, as described above. More specifically, when a mobile application generates an HTTP request that is directed to an application server 2500 (or other resource) of the enterprise system 110, the enterprise agent 320 intercepts the request, and sends the request over an application tunnel established between the mobile device 120 and the mobile device management system 126. The tunnel mediator component 126b of the mobile device management system 126 then extracts the encapsulated HTTP message, and sends it to the relevant application server 2500.

One potential problem with this approach is that some application servers, such as Microsoft SharePoint, will reject the request if the hostname is incorrect. To address this issue, the enterprise agent 320, in some embodiments, replaces the hostname (localhost:XXX) in the intercepted request with the correct hostname of the target application server 2500. This involves modifying the relevant HTTP header or headers of the original HTTP request received from the mobile application, and then sending the modified HTTP request via the application tunnel. In other embodiments, the task of replacing the hostname is instead performed by the mobile device management system 126 upon receiving and extracting the encapsulated HTTP request.

Figure 27:
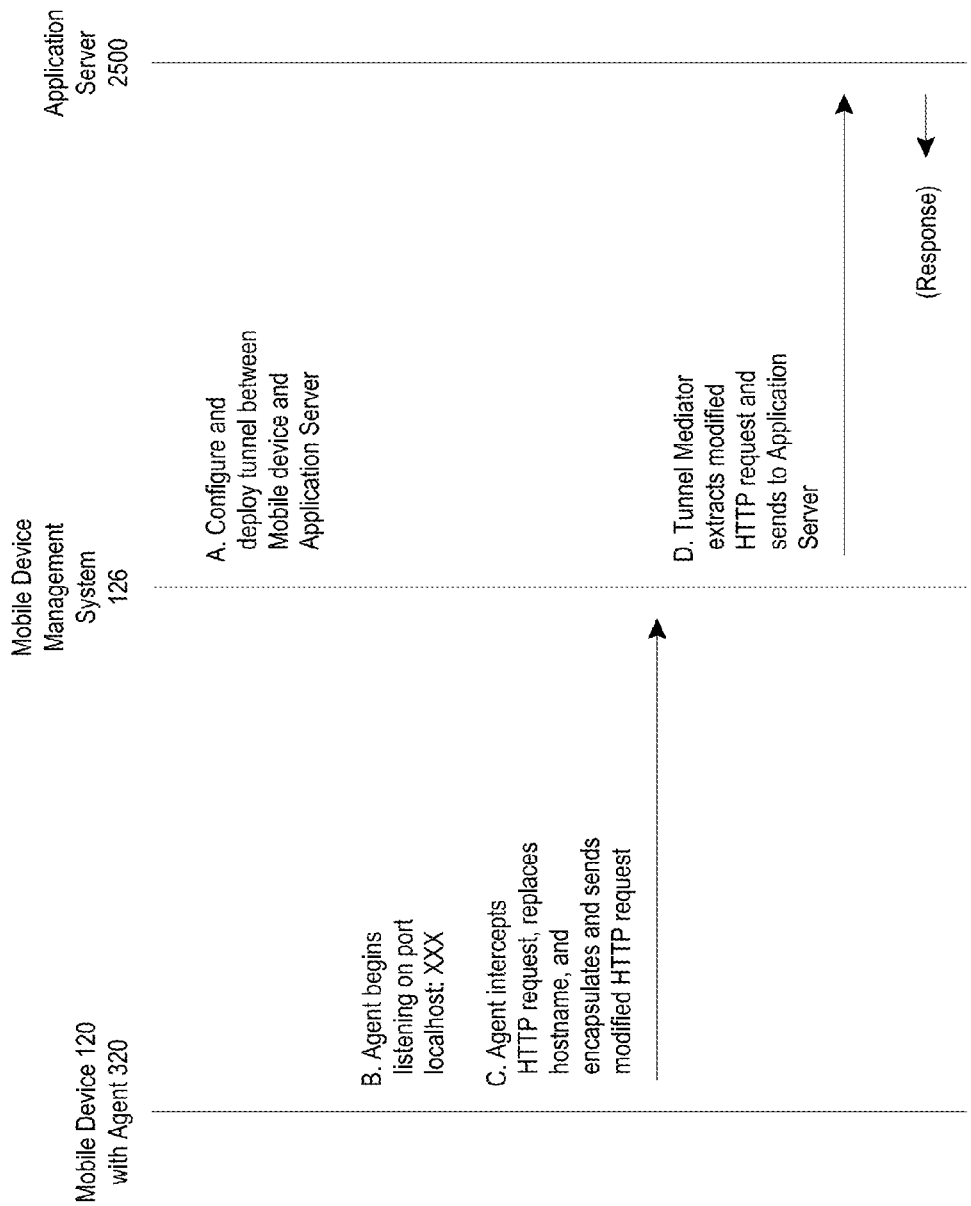
FIG. 27 illustrates, for the embodiment of FIG. 25, representative communications and events that occur when an application tunnel is created between a mobile device and an application server.

The process by which HTTP requests are intercepted and modified in the configuration of FIG. 25 is further illustrated in FIG. 27. In event A, an administrator configures and deploys an application tunnel between a mobile device 120 and an application server 2500. This may be accomplished using the web admin console 126a as will be described below. In event B, the agent 320, in response to the deployment of the tunnel, creates a socket and begins listening on the associated port (addressable as localhost:XXX). In event C, the agent 320, acting as an HTTP proxy, receives or "intercepts" an HTTP request from an application running on the mobile device 120, and modifies the hostname to the actual hostname of the target application server 2500. The agent 320 then encapsulates the modified HTTP requests and sends it to the mobile device management system 126. In event D, the tunnel mediator 126b running on the mobile device management system 126 extracts the modified HTTP request and sends it to the application server 2500 associated with the tunnel. The tunnel mediator 126b also encapsulates the application server's response for transmission to the mobile device 120.

Figure 26:
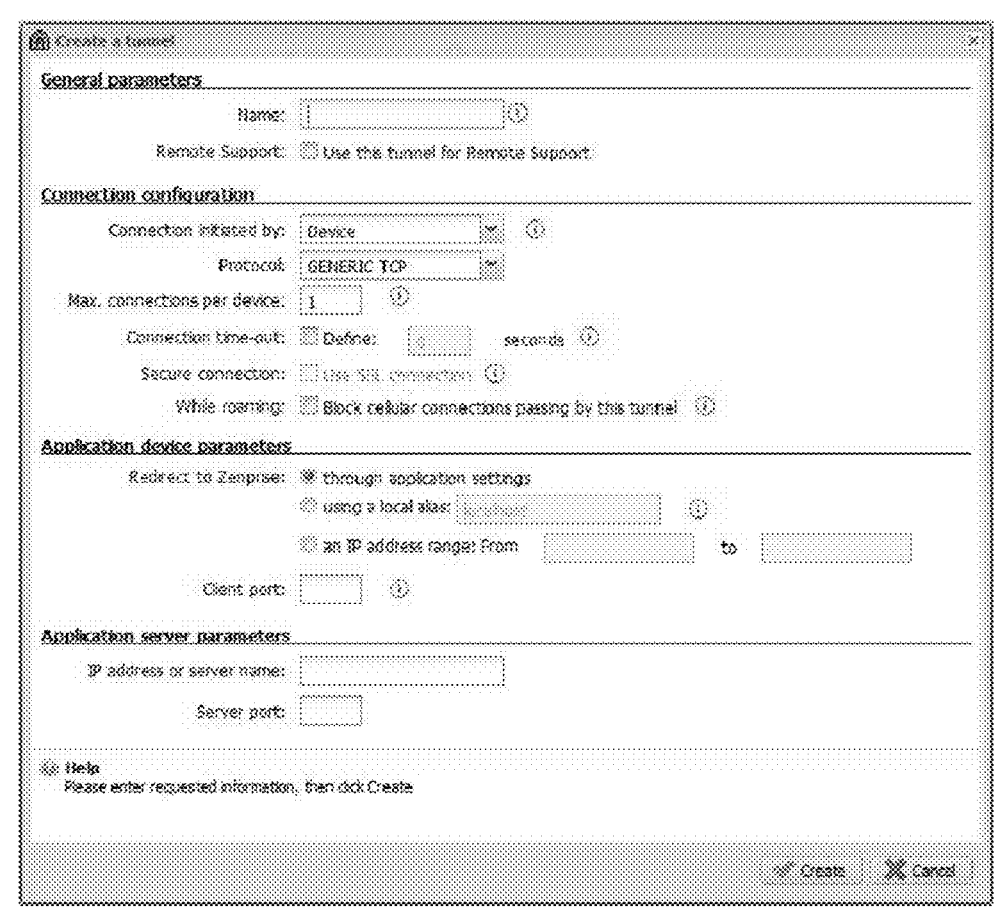

FIG. 26 illustrates one embodiment of a tunnel configuration page/screen provided by the web admin console 126a of FIG. 25. An administrator can use this page to set up an application tunnel between a particular mobile device 120 and an application server 2500. In the example shown in FIG. 26, the tunnel will be deployed on and specific to a single mobile device 120. The "Application device parameters" section includes a "client port" field that is used to specify the port that the agent 320 listens to on the mobile device 120. The "application device parameters" section also includes three options for specifying how traffic is to be intercepted and redirected. The page also includes various other configuration options, including an option to use a secure (SSL) connection.

Referring again to FIG. 25, in some configurations a custom SSL (Secure Sockets Layer) library 320b may be installed on the mobile device 120 to support secure application tunnels. The custom SSL library 320b may be part of the agent 320 (as shown in FIG. 25), or may be distinct. The custom SSL library 320b supplements the standard SSL library provided by the mobile device's operating system, and modifies the SSL handshaking protocol in a manner that enables the SSL handshaking sequence to be performed over an application tunnel. More specifically, the custom SSL library enables the mobile device 120 to accept the application server's transmission of a digital certificate even though the hostname transmitted with this digital certificate does not match the expected hostname. By contrast, the standard SSL libraries typically provided with existing mobile operating systems would reject the application server's digital certificate in this situation. The custom SSL library 320b may perform this task by overriding some of the Trust Manager certificate inspection functionality to create an exception to the mismatch in the hostname as part of the certificate. To support the use of the custom SSL library 320b, application developers may be provided with an API (such as a Java file) that enables them to develop mobile applications that use the custom SSL library 320b to establish SSL connections.

Figure 28:
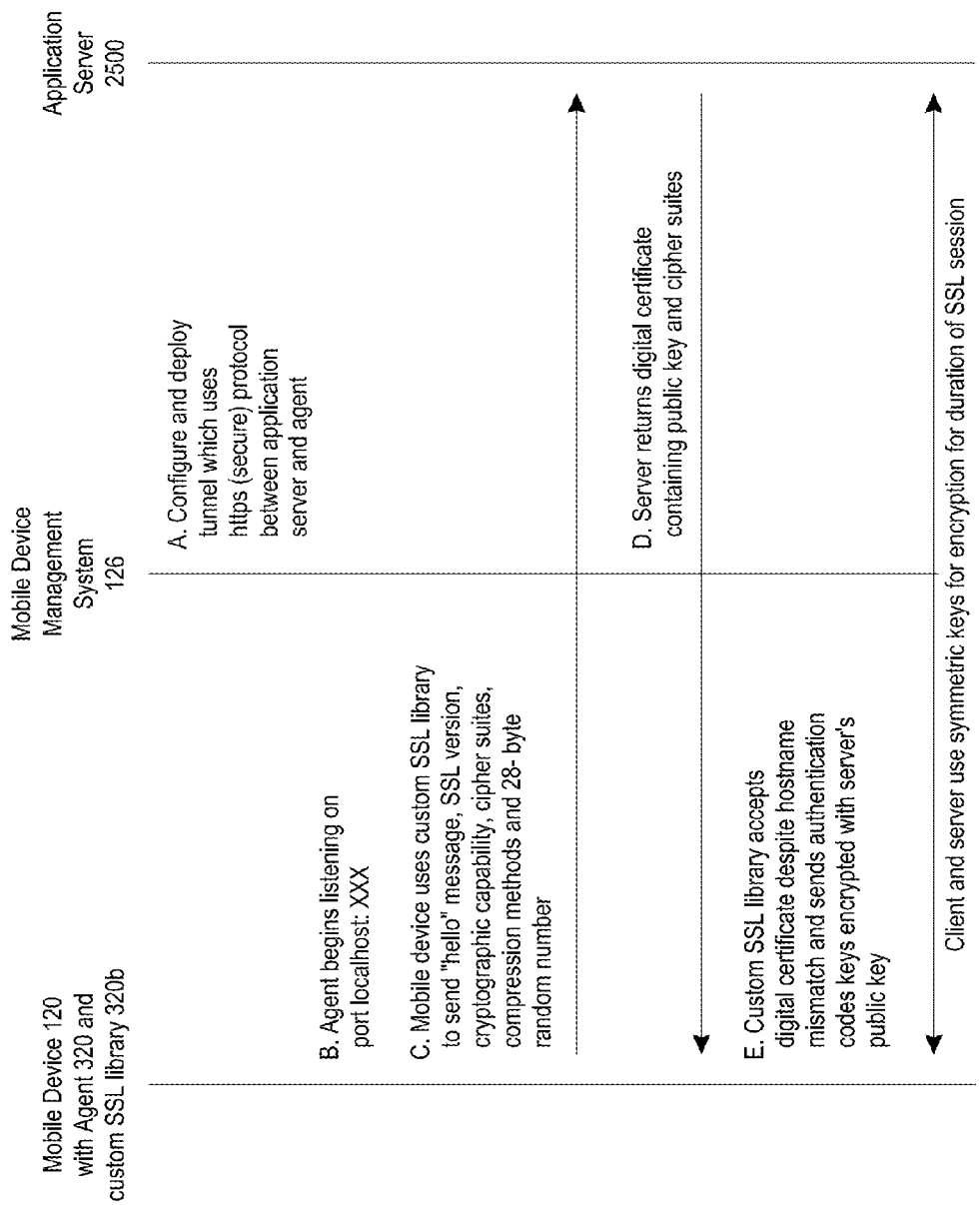
FIG. 28 illustrates additional communications and events that occur when the application tunnel is set up as a secure application tunnel.

FIG. 28 illustrates additional processing that is performed when the application tunnel is set up as a secure (SSL) tunnel in the configuration of FIG. 25. In this process, the custom SSL library 320b (shown in FIG. 25) installed on the mobile device 120 creates an exception to the requirement that the application server's digital certificate must specify a hostname that matches the expected hostname. In event A of FIG. 28, an administrator configures and deploys the HTTPS application tunnel, preferably using the web administration console 126a. In event B, the agent 320 creates a socket and begins listening on port localhost:XXX, as described above in connection with FIG. 27. (Although not shown in FIG. 27, the agent 320 in this embodiment intercepts and modifies requests from applications using the same process as shown in FIG. 27.) In event C, the mobile device 120, using the custom SSL library 320b, initiates SSL handshaking with the application server 2500 via the application tunnel. This involves the mobile device 120 sending a hello message, including the SSL version, encryption and compression information, and a 28-byte random number. This message is intercepted by the agent 320 (as described above with reference to FIG. 27), and is sent via the agent 320 to the mobile device management system 126, which forwards the message to the application server 2500.

In event D of FIG. 28, the application server 2500 responds by returning a digital certificate containing a public key and cipher suites. This digital certificate contains or specifies the localhost hostname of the agent 320 (localhost:XXX). Ordinarily (i.e., if a standard SSL library were used), the SSL library would reject this digital certificate because it expects the digital certificate to specify the application server's hostname. As shown in event E of FIG. 28, the custom SSL library 320b avoids this problem by making an exception to this requirement. The custom SSL library can create this exception by updating the SSL Trustmanager to permit a mismatch between the application server's hostname and the localhost hostname used by the agent 320. (Although the exception could be created for all hostnames, this could facilitate a man-in-the-middle attack.) As further shown in event E, the custom SSL library 320b also sends to the application server 2500 authentication code keys encrypted with the application server's public key. Thereafter, for the duration of the SSL session, the mobile device 120 and application server 2500 can use symmetric keys for encryption.

Use of Mobile Device Management System to Regulate Mobile Device Access to Enterprise System If the mobile device management system 126 is used as a tunneling mediator for application tunnels between mobile devices 120 and enterprise resources 130, the system 126 can be configured to regulate the devices' access to the resources 130. The system 126 can be configured to read information from the application tunnel request headers or bodies, compare it to the mobile device data 204 (FIG. 2) to determine information about the user 115 and/or mobile device 120 associated with the request, and enforce the enterprise access policies 218 to grant or deny the application tunnel requests. Access policies 218 can be enforced based on the locally stored user roles 206, mobile device properties 208, user-device assignments 210, other data, or any combination thereof. It will also be understood that any tunneling mediator other than the mediator 224 can be configured to enforce the access policies 218, as long as the tunneling mediator has access to the mobile device information 204.

Figure 7:
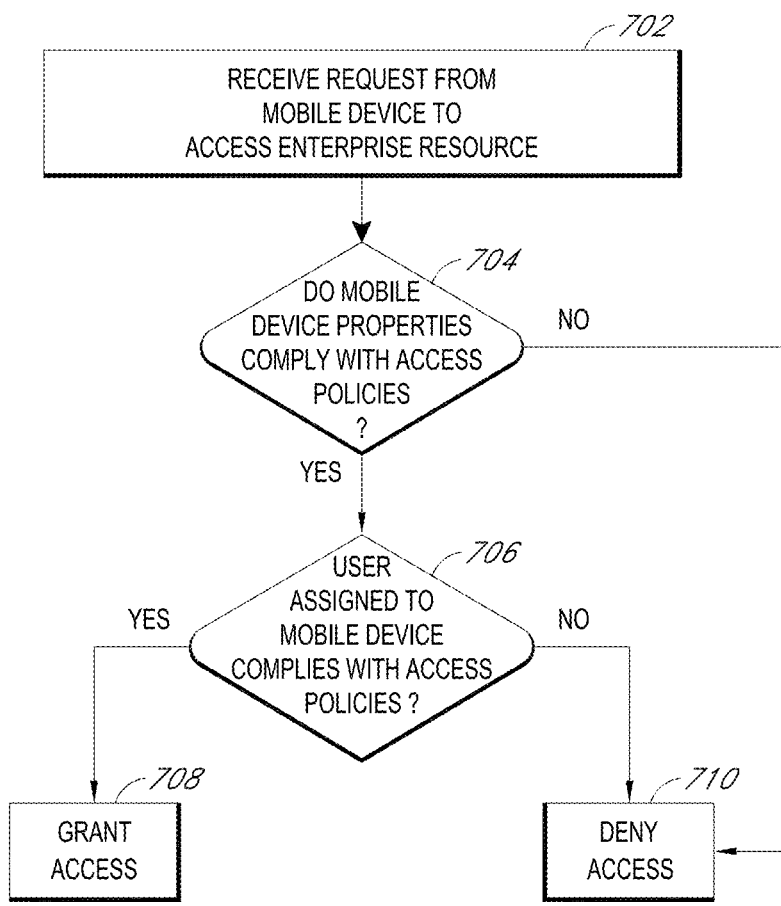
FIG. 7 is a flowchart illustrating an embodiment of a method in which an enterprise computer system regulates access by mobile devices to an enterprise resource.

FIG. 7 is a flowchart illustrating an embodiment of a method in which a tunneling mediator such as the mediator 224 in FIG. 2, uses access policies 218 to regulate mobile device access to enterprise resources 130. The mobile device management system 126 can be configured to receive application tunnel access requests from mobile devices 120 (e.g., via an application tunnel using network connections 142 and 144) to access the enterprise resources 130. Accordingly, in step 702 of FIG. 7, the mobile device management system 126 receives an access request from one of the mobile devices 120. In certain embodiments, when such a request is received from a mobile device 120, the tunneling mediator 224 is configured to deny the request if one or more properties of the mobile device 120 and/or one or more properties of a user 115 assigned to the mobile device 120 do not comply with one or more of the access policies 218. Accordingly, in decision step 704, the tunneling mediator 224 determines whether one or more properties of the mobile device 120 comply with one or more relevant access policies 218 (e.g., general access policies, or access policies associated with the requested enterprise resource(s) 130). The mobile device properties on which the tunneling mediator 224 can evaluate the access request can be the device properties 208 or other properties determined from the request itself. If the mobile device properties ascertained from the access request do not comply with the relevant access policies 218, then, in step 710, the tunneling mediator 224 can deny the access request. On the other hand, if the mobile device properties are in compliance with the one or more associated access policies 218, then the method proceeds to decision step 706, in which the tunneling mediator 224 determines whether one or more properties of the user 115 assigned to the mobile device 120 are in compliance with the one or more relevant access policies 218. The properties of the user 115 can be, e.g., the user's role 206 or other user-related information that may or may not be stored within the mobile device information 204. The tunneling mediator 224 can determine which user 115 is assigned to the mobile device 120 by, e.g., using the user-device assignment records 210. If the one or more user properties comply with the one or more access policies 218, then the tunneling mediator 224 grants the mobile device 120 access to the requested enterprise resource(s) 30, in step 708 (through the connection 152 or 162). If not, then the tunneling mediator 224 denies access in step 710. It will be appreciated that this methodology allows the enterprise to regulate mobile device access to the enterprise resources 130 in a very flexible way, based on various combinations of mobile device properties and user properties.

As noted above, in some embodiments the tunneling mediator 224 is positioned outside of the enterprise system 110 (e.g., in a cloud-computing system as in FIG. 1B). It will be appreciated that the mobile device information 204, enterprise access policies 218, mobile device rules 214, and/or remedial action descriptions 216 can also be stored outside of the enterprise system 110, such as with the tunneling mediator 224. In those embodiments, the tunneling mediator 224 can still be configured to receive the access requests from the mobile devices 120, and then grant or deny the requests based on the access policies 218. In such embodiments, the tunneling mediator 224 can be configured to send the granted access requests to a network node positioned within the enterprise system 110, which in turn routes the requests to the requested enterprise resources 130. For example, the network node can comprise a computer server, the secure mobile gateway 128, or another network device.

Examples of Policies for Controlling Mobile Device Access to Enterprise System Resources There are many possible cases in which an enterprise may wish to regulate or restrict mobile device access to enterprise resources 130 based on mobile device properties and/or properties of users 115 assigned to the mobile devices 120. Several of these "use cases" are now described. For clarity, the use cases are enumerated below. Also, for simplicity, the use cases are described in the context of access policies 218 stored in the mobile device management system 126. As discussed above, the system 126 can be a provider 408 of gateway rules 404 to the secure mobile gateway 128, and/or can regulate mobile device access to enterprise resources 130 via application tunnels. However, it will be appreciated that such gateway rules 404 could be created and given to the gateway 128 by any other provider 408.

Skilled artisans will understand that the following examples represent only a small portion of the full range of possibility for how enterprise access can be regulated using the disclosed components and/or processes. For instance, it will be appreciated that the access policies 218 can depend on any combination of user 115 properties, mobile device 120 properties (e.g., device properties 208), the specific enterprise resources 130 for which access is being requested, and other information, and that the specific examples provided below are merely illustrative and far from exhaustive. Further, it will be understood that some use cases can be combined.

Use Case 1:
One or more of the access policies 218 may require that the mobile device 120 requesting access (the "access-requesting device") is enrolled with the mobile device manager 202. This helps to prevent giving enterprise resource access to people who are not associated with the enterprise.

Use Case 2:
One or more access policies 218 may require that the access-requesting device 120 be a certain device type (e.g., iPhone™, Windows Mobile™, etc.)

Use Case 3:
One or more of the access policies 218 may require that the access-requesting device 120 have certain settings, such as being password-protected. This helps to prevent giving enterprise resource access to people who are not associated with the enterprise (e.g., are not users 115) but somehow obtain a mobile device 120 (e.g., a device 120 that is misplaced or lost by the assigned user 115) and attempt to access the enterprise system 110.

Use Case 4:
One or more of the access policies 218 can require that the access-requesting device 120 use a current operating system version.

Use Case 5:
One or more of the access policies 218 can require that the access-requesting device 120 complies with a security requirement (e.g., an antivirus requirement) of the enterprise. If a mobile device 120 is not security-compliant (e.g., does not have up-to-date antivirus software installed or has not conducted a sufficiently recent auto-scan of its files, data, or applications for viruses), then permitting the device 120 to access an enterprise resource 130 may cause the virus to infect the resource 130, potentially jeopardizing the operability of the enterprise system 110 or at least the specific resource 130 to which access is given. Hence, these types of access policies 218 can prevent such undesirable outcomes.

Use Case 6:
One or more of the access policies 218 can require that the access-requesting device 120 not be "jailbroken." Jailbreaking is a process that allows a mobile device 120 to gain full access ("root access") to unlock all features of its operating system, thereby removing limitations that may be imposed by the device manufacturer. Once jailbroken, a mobile device 120 may be able to download previously unavailable applications and extensions. Jailbreaking a mobile device 120 can give access to its root file system, allowing modification and installing third-party software components. Hence, a jailbroken device is often one in which security protections are removed. Thus, preventing jailbroken devices from accessing enterprise resources 130 further protects the enterprise system 110 from security threats and vulnerabilities.

Use Case 7:
One or more of the access policies 218 can require that the access-requesting device 120 not have any unauthorized applications installed. In this example, an "unauthorized application" can be a software application that is not authorized to be installed on the access-requesting device 120, and/or on a particular group of devices 120 of which the access-requesting device is a member.

Use Case 8:
One or more of the access policies 218 can require that the user 115 assigned to the access-requesting device 120 have one or more predefined roles 206 associated with the enterprise. For example, an access policy 218 can deny mobile device access to one or more of the enterprise resources 130 for mobile devices 120 assigned to users 115 having roles 206 that are not related to sales, engineering, or upper management.

Use Case 9:

One or more of the access policies 218 can depend on which particular enterprise resources 130 are being requested to be accessed by an access-requesting device 120. For example, the conditions for which an enterprise may grant mobile device access to a CRM resource may be different than the conditions for which an enterprise may grant access to a product information database. Accordingly, different access policies 218 can be created and used for different enterprise resources 130. In addition to depending on the requested enterprise resource(s) 130, an access policy 218 can require that the user 115 assigned to the access-requesting device 120 have certain properties, such as a specific role 206 (as in Use Case 8 described above) or another status indication. For example, for a CRM resource 130, an enterprise may wish to grant mobile device access only to users 115 with roles 206 involving sales or upper management. In that case, an access policy 218 for the CRM resource 130 may require that the user 115 assigned to the access-requesting device 120 have a sales or upper management role 206, and the mobile device manager 202 can be configured to deny access requests from mobile devices 120 assigned to users without those roles 206. An access policy 218 can further require that the user 115 assigned to the access-requesting device 120 be in good standing with the enterprise (e.g., users 115 whose employment is not terminated and who are not on a probationary status).

Meta-Application

Referring again to FIG. 1A, the meta-application 150, if present, can be configured to discover, model, and/or monitor various components of the enterprise system 110, including by methods described in Qureshi '536. The meta-application 150 can also be configured to use encoded logic rules to detect "features" and "problems," perform "root cause analysis," plan "remedial actions," and/or execute the remedial actions on the enterprise system 110, including by methods described in Qureshi '536. In this context, a logic rule can comprise a logical combination of features of the managed system 110, and can correspond to at least one problem. Further, a logic rule can include queries for specific information from the enterprise system ("telemetry queries") or from a model of the enterprise system ("enterprise model query"), wherein the enterprise model is generated by the meta-application 150. A problem can comprise any problematic state of any software, hardware, or firmware of the enterprise system 110 or of a mobile device 120. The meta-application 150 can detect a problem by satisfying the logic of a corresponding logic rule. A feature can comprise a condition of a problem. For example, a logic rule can contain a telemetry query or enterprise model query for detecting a feature of the enterprise system 110. Root cause analysis can refer to the detection of a component (again, software, hardware, firmware, or even the relationship between such types of components) that is a "root cause" of observed problematic behavior. The meta-application 150 can be configured to address detected problems by planning or executing remedial actions associated with the problems.

Inputs (e.g., features) to the logic rules used by the meta-application 150 to detect problems can come not only from the "backend" of the enterprise system 110 (the portion of the system 110 behind the internal firewall 124), but also from other sources, such as the secure mobile gateway 128, the enterprise agents 320 on the mobile devices 120, or an application tunnel mediator, such as embodiments of the mobile device management system 126. For example, an input to a logic rule can be a grant or denial of a mobile device's access request 402 by the secure mobile gateway 128. For instance, a logic rule can define a particular problem, at least in-part, as the denial by the gateway 128 of enterprise system access to a mobile device 120 used by the CEO of the enterprise. If the CEO is denied access, data indicative of this event satisfies this portion of the logic rule. In another example, an input to a logic rule can be data indicating that a user 115 has downloaded greater than a certain threshold amount of data within a specified time period. Such data could be provided to the meta-application 150 by an application tunnel mediator. In still another example, an input to a logic rule can be data indicative of the device's configuration or performance, such as data indicating that a user 115 has installed a certain software application on the user's mobile device 120. Such data could be provided to the meta-application 150 by the enterprise agent 320 of the user's device 120.

In certain embodiments, one type of remedial action defined by a logic rule used by the meta-application 150 can be the creation of a new gateway rule 404 or the modification of an existing gateway rule 404, along with sending the new or modified gateway rule to the secure mobile gateway 128. In this manner, the meta-application 150 can be configured to programmatically control the gateway 128 to block mobile device access requests in an automated fashion. Another type of remedial action can be the creation of a new access policy 218 or the modification of an existing access policy 218, along with sending the new or modified policy to the mobile device management system 126. Another type of remedial action can be the creation of a mobile device rule 214 or the modification of an existing mobile device rule 214, along with sending the new or modified mobile device rule to the mobile device management system 126 and/or one or more of the mobile devices 120. Another type of remedial action can be to send a command directly to one or more of the mobile devices 120, for execution by the enterprise agent 320. In this manner, the meta-application 150 can effectively execute actions on the devices 120, such as wiping data or applications from the devices 120, locking (i.e., preventing usage of) the devices 120, preventing certain applications installed on the devices from running, turning device features on or off, adjusting device settings, and the like.

In the embodiment of FIG. 1C, the meta-application comprises a portion 150 residing in the enterprise's backend, and a portion 151 residing in a cloud computing system or "cloud" 156. The cloud-based system 156 is ordinarily separate and distinct from the enterprise system 110 (e.g., the two systems do not share any physical computers or servers) and is ordinarily operated primarily by cloud service provider business entity that is separate and distinct from the enterprise. In certain embodiments, the backend meta-application portion 150 collects data from the enterprise system 110, sends it to the cloud-based meta-application portion 151, and possibly also detects "features" as mentioned above. In certain embodiments, the cloud-based meta-application portion 151 uses the data to model the enterprise system 110, to detect "problems" and "root causes," to plan remedial actions, and/or to execute the remedial actions.

Figure 8:
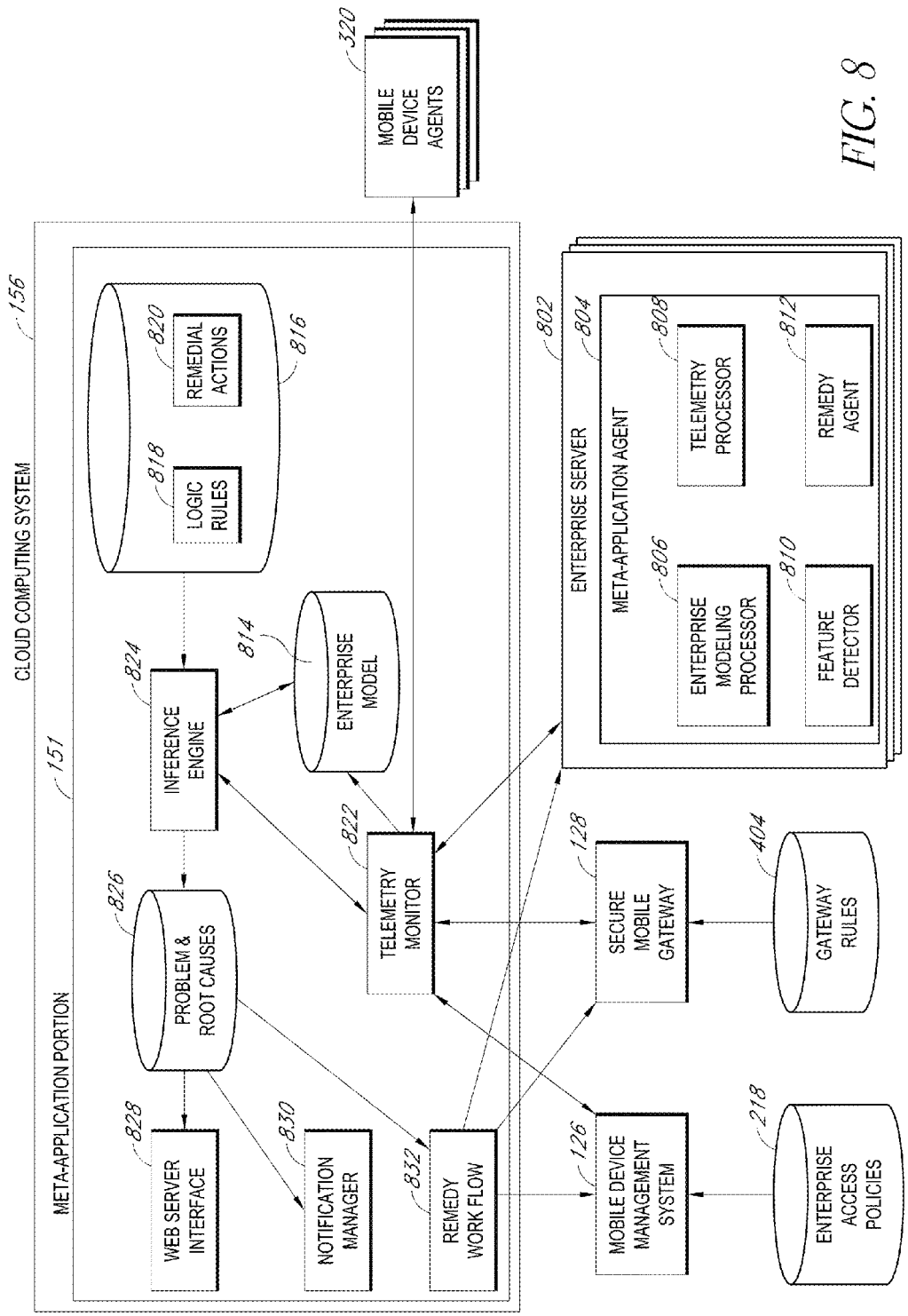
FIG. 8 is a schematic illustration of an embodiment of a partially cloud-based meta-application for managing an enterprise computer system, a mobile device management system, and/or a gateway for allowing or denying requests from mobile devices to access an enterprise computer system.

FIG. 8 shows one particular embodiment of a partially cloud-based meta-application. The meta-application includes several components residing on enterprise servers 802, and other components residing on servers within the cloud 156. Additionally, the meta-application communicates with the mobile device management system 126, the secure mobile gateway 128, and the enterprise device agents 320 running on the mobile devices 120.

In the illustrated embodiment, the enterprise system 110 includes one or more computer servers 802, which can include some or all of the elements shown in the systems 110 of FIGS. 1A-C. A meta-application agent 804 can be installed on each server 802 having components that are desired to be monitored and/or managed by the meta-application 150. Each meta-application agent 804 can be "born" (at installation) with the URL of the cloud-based meta-application portion. Alternatively, the agents 804 can be configured to receive the URL from an administrator. It will be understood that it is not necessary to install meta-application agents 804 on every computer server of the enterprise system 110. The enterprise-based portion of the meta-application can be configured to allow an IT administrator to select the enterprise servers 802 on which to install the meta-application agents 804, as part of the installation process of the meta-application.

In the illustrated embodiment, the meta-application agent 804 includes an enterprise modeling processor 806, a telemetry processor 808, a feature detector 810, and a remedy agent 812. These components are now described.

The enterprise modeling processor 806 can be configured to access and/or obtain information from the server 802, which is needed or useful for constructing a queriable model 814 of the enterprise system. The enterprise model 814 can describe the hardware, software, and/or firmware of the enterprise system 110, and can include, for example, configuration information, registry data, database information, and other information useful for evaluating logic rules 818. The enterprise model 814 can comprise an object graph, with the objects representing hardware, software, firmware, relationships therebetween, and the like. Exemplary methods and approaches to modeling are described in Qureshi '536, particularly the sections relating to "discovery" and "application models." Each enterprise modeling processor 806 can be configured to construct a model of the particular server 802 on which it is installed. The cloud-based meta-application portion can be configured to receive data from the enterprise modeling processors 806 and use the data to construct the overall enterprise model 814. The enterprise modeling processors 806 can be configured to send new data to the cloud-based meta-application portion on an ongoing basis, to support dynamic updating of the enterprise model 814. Finally, it will be appreciated that the enterprise agents 320 of the mobile devices 120 can also be configured to conduct discovery of information about the devices 120 and send the discovered information to the enterprise model 814, and the enterprise model 814 can thereby model one or more of the devices 120 as well as the enterprise system 110. In other words, agents 320 can include enterprise modeling processors 806 or similar functionality.

The telemetry processor 808 can be configured to receive, from the cloud-based meta-application portion 151, requests for specific data about the server 802 on which it is installed. The telemetry processor 808 can be configured to respond to such a request by gathering the requested data (referred to herein as "telemetry") and providing it to the feature detector 810 for analysis. The telemetry can comprise many different types of data about the hardware, software, and/or firmware of the enterprise system 110, including without limitation configuration data, performance data, data about the mobile devices 120, and data from or about the mobile device management system 126, secure mobile gateway 128, and enterprise resources 130. Telemetry can comprise "state metric data," as described in Qureshi '536. State metric data can comprise raw time-varying data indicative of a state of the server 802 or any component thereof. It will be appreciated that the enterprise agents 320 of the devices 120 can also be configured to gather device data based on requests for same from the meta-application portion 151, and to send the gathered telemetry to a local feature detector 810 or back to the meta-application portion 151. In other words, agents 320 can include telemetry processors 808 or similar functionality.

The feature detector 810 can be configured to analyze the telemetry received from the telemetry processor 808, to detect features of the logic rules 818. The features can be defined within a telemetry query that the cloud-based meta-application portion sends to the meta-application agent 804. Performing feature detection at least partly within the enterprise system 110, as opposed to within the cloud 156, can significantly reduce the bandwidth for communications between the meta-application agent 804 and the cloud 156, because not all of the telemetry is sent to the cloud 156 in certain applications. For instance, the meta-application agent 804 can merely send the detected features to the cloud 156. Skilled artisans will understand that a feature can be much less data-intensive than the raw telemetry from which the feature is detected. For example, a feature can simply be an indication that a particular condition is true. In an alternative embodiment, the feature detector 810 resides within the cloud 156, and the telemetry processor 808 can send some or all of the gathered telemetry to the cloud for feature detection. It will be appreciated that the enterprise agents 320 of the mobile devices 120 can also be configured to analyze telemetry gathered in response to a request from the meta-application portion 151, in order to detect features of the logic rules 818 and send those features back to the meta-application portion 151. In other words, agents 320 can include feature detectors 810 or similar functionality.

The remedy agent 812 can be configured to execute remedial actions 820 on the server 802 on which it is installed. The meta-application agent 804 can receive remedial actions 820 from the cloud-based meta-application portion. Although not shown in FIG. 8, the mobile device management system 126 can include a remedy agent 226 (FIG. 2), and so can the secure mobile gateway 128. Such remedy agents can allow the meta-application to execute remedial actions against the mobile device management system 126 and the secure mobile gateway 128. It will be appreciated that the enterprise agents 320 of the mobile devices 120 can also be configured to execute remedial actions 820 on the devices 120. In other words, agents 320 can include remedy agents 812 or similar functionality.

Referring still to FIG. 8, the illustrated cloud-based meta-application portion 151 includes a telemetry monitor 822, the enterprise model 814, logic rules repository 816, inference engine 824, repository 826 of detected problems and/or root causes, user interface 828, notification manager 830, and remedy workflow module 832. It will be understood that the cloud-based meta-application portion need not include all of these components, and can also include additional components not shown in FIG. 8.

The telemetry monitor 822 can manage communications between the cloud-based meta-application portion and the meta-application agents 804, as well as any other components that provide data that the cloud-based meta-application portion can use to evaluate the logic rules 818, such as the enterprise agents 320 of the mobile devices 120, the mobile device management system 126, and the secure mobile gateway 128. Hence, the telemetry monitor 822 can receive features detected by the feature detectors 810, and can provide the features to the inference engine 824. The telemetry monitor 822 can be configured to prioritize incoming features and other data, so that more important or urgent information is passed on to other components of the meta-application before less important or less urgent information.

The inference engine 824 can be configured to access the repository 816 of logic rules 818 and evaluate whether individual rules 818 are satisfied by features of the deployment, wherein each satisfied rule corresponds to the detection of at least one problem. A logic rule 818 can include queries for information, such as a telemetry query or an enterprise model query. The inference engine 824 can be configured to process these queries of the logic rules 818 by querying the enterprise model 814 or relevant ones of the meta-application agents 804 for the needed information (e.g., features of the rule). The inference engine 824 can also be configured to perform root cause analysis to detect root causes of problematic behavior of the enterprise system 110. A root cause can be an object of the enterprise model 814, which represents a component of the enterprise system 110. The inference engine 824 can be configured to employ rule evaluation methods and root cause analysis methods as taught in the '536 Qureshi patent (refer to discussions of "Problem Logic" and root cause analysis, respectively). The inference engine 824 can further be configured to log detected problems and root causes in a repository 826.

The user interface 828 can allow administrators to interact with the cloud-based meta-application portion. The illustrated user interface 828 comprises a web server interface to facilitate access over the Internet. The user interface 828 can also include a server terminal interface as well.

The notification manager 830 can be configured to send notifications to administrators about information detected or computed by the meta-application, such as problems and root causes. Notifications can comprise, for example, emails, voice messages, SMS text messages, and the like. Preferably, the notification manager 830 allows an IT administrator to set and adjust the criteria under which the notification manager 830 sends notifications.

The remedy workflow module 832 can be configured to select remedial actions 820 for attempting to solve or counter problems or root causes detected by the inference engine 824. The remedial actions 820 can be stored in the repository 816 of logic rules 818. A remedial action 820 can be stored in association with one or more of the logic rules 818. The remedy workflow module 832 can be configured to determine an optimal sequence of execution of remedial actions 820 associated with the detected problems or root causes. The remedial actions 820 can be abstract or generalized for many different types of managed computer systems 110. In that case, the remedy workflow module 832 can be configured to customize the remedial actions 820 into plans that are tailored for the specific enterprise system 110 and mobile devices 120 managed by the meta-application. The remedy workflow module 832 can be configured to send the customized plans and/or other instructions to the remedy agents 812 of the meta-application agents 804, to similar remedy agents of the mobile device management system 126 and secure mobile gateway 128, or to the enterprise agents 320 installed on the mobile devices 120. These remedy/enterprise agents can be configured to execute the plans and/or other instructions on such systems and devices. A plan can require human (e.g., an IT administrator) confirmation of plan steps at stages of the plan. A plan can also be designed to be executed by the remedy agent 812 without human intervention or approval.

The meta-application 150 of FIGS. 1A and 1B can include all of the components illustrated in FIG. 8, including the components residing within the cloud 156, and all of such components can reside within the enterprise system 110.

Meta-application components installed on the mobile devices 120 (e.g., within the enterprise agents 320 or separately) can be configured to collect state metric data from the devices 120 and send the data back to the cloud-based meta-application portion 150 and/or the enterprise system 110. Such data can be collected regularly (e.g., periodically) or upon specific request by the cloud-based or enterprise system-based meta-application portions. Such data can be analyzed (e.g., by the inference engine 824 using the logic rules 818) to diagnose problems involving the devices 120, and to select remedial actions for addressing such problems. Such analysis can be conducted even if there is no currently available connection to the device 120.

Persons of ordinary skill in the art will understand that the meta-application can be configured to enforce and implement a wide variety of different types of logic rules 818 and remedial actions 820 involving the mobile devices 120. For example, a logic rule 818 can define a problem as the downloading of more than a particular threshold amount of data to a mobile device 120. The enterprise backend portion of the meta-application can detect the throughput of data downloaded to a user's device 120 and determine if it exceeds the threshold defined in the rule 818. A remedial action 820 associated with the rule 818 can require the disabling of the mobile device 120, or perhaps merely the disabling of the device's ability to download data. Such remedial actions 820 may involve the meta-application sending to the device's enterprise agent 320 a command or script configured to enforce the remedy. Alternatively, the remedial action 820 can require the revocation of the mobile device's certificate by the mobile device management system 126. Still further, the rule 818 can revoke the device's permission to use application tunnels for communicating with enterprise resources 130 or other network resources.

In another example, the meta-application 150 can be configured to create gateway rules 404 based at least partly on the time(s) at which a mobile device 120 was "wiped" (e.g., deletion of some or all data stored on the device or removal of software application(s) from the device).

In an embodiment in which the meta-application 150 is configured to manage Microsoft Exchange™, the meta-application 150 can have full visibility into the ActiveSync partnership data for the mobile devices 120 associated with the enterprise. The meta-application 150 can use the ActiveSync partnership data to generate gateway rules 404 that filter mobile device access requests 402 based on such data. For example, the ActiveSync partnership data includes the ActiveSync DeviceID's of the mobile devices 120. The meta-application 150 can use this information to generate gateway rules 404 that filter access requests 402 based on the known DeviceID's.

Device-Resident Management System

In certain embodiments, an enterprise may wish to regulate the settings, applications, uses, other activities, or any combination thereof associated with the mobile devices 120 used by the enterprise's users 115. This can safeguard against threats to the security of enterprise data and resources and/or to address productivity risks—the risk of users using their mobile devices 120 in ways that can negatively affect user productivity in meeting the user's duties toward the enterprise. Such embodiments are now described.

With continued reference to FIG. 2, the illustrated mobile device management system 126 includes a computer-readable storage repository 212 storing a plurality of different mobile device rules 214. The storage repository 212 can be implemented on any suitable non-transitory computer-readable medium. A mobile device rule 214 can be an encoded, computer-readable rule configured to be used by a mobile device 120 (e.g., by an enterprise agent 320 installed on the mobile device 120) to detect a problem indicative of a security risk and/or a productivity risk to which the device 120 can expose the enterprise. Numerous examples or "use cases" of problems that can be detected using the mobile device rules 214 are described below.

The mobile device rules 214 can be relatively simple, taking the form of, for example, IF-THEN statements and/or simple declarative logic rules. In other embodiments, the mobile device rules 214 can be much more complex, such as the logic rules described in Qureshi '536, which describes logic rules that are configured to be used to generate virtual circuits that have atomic gates and downstream operator gates. The mobile device rules 214 can include metadata for calculating various parameters associated with the rules and related problems, such as a confidence value indicative of a confidence in the detection of the problem associated with a mobile device rule 214, for example, as taught by Qureshi '536.

In some embodiments, a mobile device rule 214 has the following format:

```
<rule name>
<security key><authentication information>
<encrypt><rule body>
```

The rule name can be a name of the particular mobile device rule 214. If the rule 214 is encrypted, the security key can allow the enterprise agent 320 to decrypt the rule body. The authentication information can include data concerning the applicability of the rule to the mobile device 120. The enterprise agent 320 can use the authentication information to determine whether the rule 214 can run on the mobile device 120. The rule body includes the underlying logic of the rule, and is the part that the enterprise agent 320 evaluates in order to detect problems and execute one or more associated remedial actions 216.

In certain embodiments, a mobile device rule 214 maps one or more mobile device state metric data values to one of a plurality of the aforementioned problems indicative of security risks and/or productivity risks to which the devices 120 can expose the enterprise. A "state metric" can be any data item indicative of a mobile device state, such as error log entries, records of activations of device features, operating system version, installed software applications 318 (including applications that the enterprise may have "blacklisted" as not being authorized for installation), whether the mobile device 120 is roaming, a battery level of the mobile device 120, a signal strength of a signal received by of the mobile device 120, available memory of the mobile device 120, etc. For example, a "state metric" can be a metric that indicates whether a mobile device feature (e.g., a camera, web browser, password-protection, etc.) has been activated. Another example of a state metric is an indicator of whether the mobile device's SIM card is properly engaged with the mobile device 120. Other examples of state metrics will be apparent from the examples of mobile device rule applications provided below.

With continued reference to FIG. 2, the repository 212 can include a plurality of encoded, computer-readable remedial actions 216 for countering the problems. In some embodiments, each of the remedial actions 216 corresponds to one or more of the problems associated with the mobile device rules 214. Examples of remedial actions 216 are provided below. In some embodiments, the mobile device management system 126 (or another component of the enterprise system 110) can include tools 221 that assist IT personnel in the creation and/or editing of mobile device rules 214 and/or remedial actions 216. Such tools 221 can comprise, e.g., a customized word processor or other software application with extensions, tutorials, and the like to help construct the rules 214 and/or actions 216.

In certain embodiments, the mobile device rules 214 and their associated remedial actions 216 are organized into separate "rule packages," each rule package including one or more of the rules 214 and preferably the rules' associated remedial actions 216. Each rule package can be designed or customized for users 115 with specific types of user roles 206 and/or mobile device properties 208. Accordingly, each rule package can be associated with one or more of the user roles 206, and/or with one or more of the mobile device properties 208. For example, a rule package of mobile device rules 214 and associated remedial actions 216 can be prepared for all users 115 having roles 206 that that are sales-oriented (e.g., all sales people of the enterprise). As another example, one rule package can be prepared for people using iPhones™ and another rule package can be prepared for people using Android™ devices. If it is desired to differentiate the permissible activities associated with mobile device users 115 having a given role 206, based on differences in their mobile device properties 208, then different rule packages of mobile device rules 214 and associated remedial actions 216 can be formed for the different types of mobile devices 120. For example, an enterprise can form one rule package of mobile device rules 214 and remedial actions 216 for sales people using iPhones™, another rule package of mobile device rules 214 and remedial actions 216 for sales people using Android™ devices, and so on. In this manner, rule packages can be customized as desired for different user roles 206 and/or mobile device properties 208.

It will be appreciated that different mobile device rule packages can share common mobile device rules 214 and/or remedial actions 216. For example, suppose that a first mobile device rule and an associated remedial action is suitable for sales people and corporate board members, and a second mobile device rule and associated remedial action is only suitable for sales people. A rule package for users 115 that are sales people can include the first and second mobile device rules and their remedial actions, while a mobile device rule package for users 115 that are board members of the corporate enterprise may include the first mobile device rule and remedial action but not the second mobile device rule and remedial action. Many other examples are possible and are in accordance with the principles and advantages described herein.

The mobile device manager 202 is preferably responsible for sending appropriate rule packages to the mobile devices 120, based on, e.g., the properties 208 of the mobile devices and/or the roles 206 of the users 115 assigned to the mobile devices. In certain embodiments, a deployment rule is associated with each rule package or individual mobile device rule 214 and associated remedial actions 216. The mobile device manager 202 can be configured to use the deployment rule to determine which mobile devices 120 to send the rule package or individual mobile device rule 214 and associated remedial actions 216. A deployment rule can cause the mobile device manager 202 to access the mobile device information 204 to identify the mobile devices 120 whose assigned users 115 have a role 206 associated with a given one of the rule packages or rules, and/or the mobile devices 120 whose properties 208 are associated with the given rule package or rule. Further, the mobile device manager 202 can be configured to send the given rule package (including mobile device rules 214 and/or remedial actions 216) to the identified mobile devices 120. In this manner, the mobile device manager 202 can send the appropriate mobile device rule package(s) to each mobile device 120.

For example, suppose that a new mobile device user 115 (e.g., a new employee) joins the enterprise. The new user's role information 206 and/or mobile device properties 208 can be entered (by administrators and/or by a computer-automated process) into the enterprise's mobile device information 204. In one embodiment, the user's role information 206 is entered into an RBAC system of the enterprise, and a software module (such as the mobile device manager 202) transfers the role information 206 to the mobile device information 204. In another embodiment, the user role information 206 of the mobile device information 204 is an RBAC role repository that directly supports an RBAC system. The mobile device manager 202 can be configured to use the new user's role information 206 and/or mobile device properties 208 to determine an appropriate mobile device rule package to send to the new user's mobile device 120. In another embodiment, the mobile device information 204 does not come from or support an RBAC system.

In another example, suppose that an enterprise modifies its policies regarding a particular group of mobile device users 115. IT personnel can modify a mobile device rule package customized for the particular user group. This can include creating new mobile device rules 214 for the rule package, deleting rules 214 from the rule package, and/or modifying some of the rules 214 of the rule package. Alternatively or additionally, modifying the mobile device rules package can include creating, deleting, and/or modifying remedial actions 216 of the rules package. The mobile device manager 202 can send the updated mobile device rule package to each of the mobile devices 120 of the users 115 of that particular group.

In many cases, the updated mobile device rule package may be fairly similar to older mobile device rule packages that have already been sent to the users' mobile devices 120. In such cases, the mobile device manager 202 can be configured to send only the new and/or modified mobile device rules 214 and/or remedial actions 216 to each mobile device 120, along with instructions for deletion of those rules 214 and/or actions 216 that have been deleted from the rule package, such instructions being carried out by the enterprise agent 320 of each mobile device 120. In this manner, the mobile device manager 202 can be configured to send mobile device rule package updates to the mobile devices 120.

In certain embodiments, the enterprise agent 320 is configured to implement and/or execute the mobile device rules 214 on the mobile device 120. Accordingly, the enterprise agent 320 is preferably configured to receive (e.g., via the network interface 310) mobile device rules 214 and/or remedial actions 216 from the mobile device management system 126 associated with the enterprise, and store the received rules 214 and/or remedial actions 216 in a computer-readable storage of the mobile device 120, such as the hard drive 306 or a memory card inserted into the memory card port 307. The enterprise agent 320 can be configured to receive and store the aforementioned mobile device rule packages and rule package updates from the mobile device management system 126 and store them on the hard drive 306 or memory card. In the illustrated embodiment, the hard drive 306 stores a plurality of mobile device rules 214 and remedial actions 216. In some embodiments, the enterprise agent 320 is configured to separately store the mobile device rules 214 and remedial actions 216 of the rule packages and/or rule package updates. In other embodiments, the mobile device rules 214 and their corresponding remedial actions 216 are stored together in association with one another. In some embodiments, a mobile device 120 can receive mobile device rules 214 and/or remedial actions 216 from sources other than the mobile device management system 126.

Figure 9:
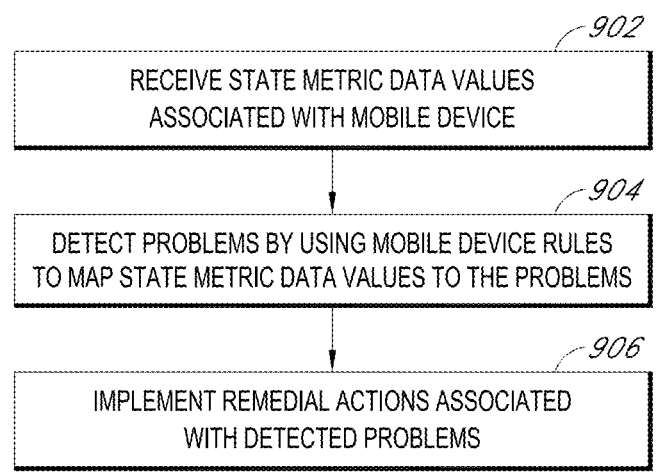
FIG. 9 is a flowchart illustrating an embodiment of a method in which a mobile device uses encoded rules and remedial actions to detect and address security-related or productivity-related problems.

FIG. 9 is a high-level flowchart illustrating an embodiment of a method in which a mobile device 120 applies mobile device rules 214 to detect security-related or productivity-related problems associated with the mobile device 120, and in which the mobile device 120 addresses the problems. According to the method illustrated in FIG. 9, in step 902 the enterprise agent 320 obtains or receives state metric data values associated with the mobile device 120. These state metric data values are preferably for state metrics represented in one or more of the mobile device rules 214. The enterprise agent 320 can be configured to obtain or receive one or more state metric data values from other hardware, software, or firmware components of the mobile device 120. The enterprise agent 320 can be configured to proactively gather data values of certain state metrics, for example by issuing an API call for data. For other state metrics or operating systems, the agent 320 can subscribe to a notification callback mechanism of the mobile device 120, so that the mobile device 120 notifies the enterprise agent 320 about certain events that occur on the mobile device 120.

With continued reference to FIG. 9, in step 904 the enterprise agent 320 detects one or more problems defined by the mobile device rules 214. The enterprise agent 320 is preferably configured to programmatically detect instances of the problems, at least in-part, by using the mobile device rules 214 to analyze the received state metric data values. In certain embodiments, the received state metric data can be analyzed in combination with other data values (e.g., user properties, time of day, date, etc.). Further, the enterprise agent 320 can be configured to respond to a detected instance of one of the problems by executing, in step 906, one of the remedial actions 216 on the mobile device 120, in which the executed remedial action 216 corresponds to the problem detected in step 904. In some cases, there may be multiple remedial actions 216 corresponding to a particular problem, and the enterprise agent 320 may be configured to select among the available remedial actions based on various factors, such as likelihood of successfully countering the problem (e.g., based on past results of running remedial actions), computing costs associated with executing the remedial actions, user preferences, enterprise preferences, and the like. In certain instances, the enterprise agent 320 can execute two or more remedial actions 216 in response to detecting a particular problem.

Some remedial actions 216 can comprise producing an alert, such as a message delivered to the user 115 of the mobile device 120. The message can include text, images, audio, and/or video. The enterprise agent 320 can be configured to produce the message and convey the message to the user 115 via the user interface 304, such as displaying the message on the screen 326 and/or playing an audible message using the speaker 328. The message can comprise information about a detected problem, and/or instructions to the user 115 to execute an action on the mobile device 120, such as activating or deactivating a feature of the device 120. The message can be statically defined in the remedial action 216. Alternatively, the message can be defined using variables that can be bound to actual data values when evaluating a mobile device rule 214 (e.g., by the resolution of queries), for example, as taught in Qureshi '536. This can allow the enterprise agent 320 to customize the message to the specific circumstances of the device 120. Further, any remedial action 216 instructing the agent 320 to produce such a message can further include instructions for actions to be conducted by the enterprise agent 320 if the user 115 (or other person handling the mobile device 120) does not execute the action instructed by the message. For example, the remedial action 216 can cause the enterprise agent 320 to conduct the action if the user 115 does not execute the instructed action within a time period defined in the remedial action.

An enterprise can vary the punitiveness of the remedial action 216 to be applied for a detected problem or violation of a mobile device rule 214 based on properties of the mobile device 120 and/or its user 115. For instance, it may be desirable to vary the remedy based on the role 206 of the user 115. In one example, an enterprise may wish to apply less stringent remedial actions for higher level executives of an enterprise.

As noted above, some remedial actions 216 can comprise an action (other than generating and conveying a message to the user) executed by the enterprise agent 320 on the mobile device 120. In certain embodiments, the remedial actions 216 can comprise actions that the mobile device 120 is already designed to conduct, such as activating or deactivating certain mobile device features, adjusting device settings, and the like. In such cases, the enterprise agent 320 can be configured to use the mobile device's API's to conduct such remedial actions 216.

In some embodiments, the enterprise agent 320 includes a scripting engine 322, and at least one of the remedial actions 216 comprises a script that the scripting engine 322 is configured to execute on the mobile device 120. The scripts can be written in a scripting language associated with the mobile device 120, which can be a command set targeted at controlling the device hardware, software, and/or operating system. The scripting engine 322 can be configured to interpret a script, and/or to convert the script to a bytecode or other form that can be interpreted relatively quickly. In some cases, the mobile device management system 126 (or another component of the enterprise system 110) can include one or more script-creation tools or applications 220 that assist IT personnel in the creation of the scripts.

In some embodiments, a script can have the following high-level format:

```
# USE CASE: [description of what the script does]
import android
import zenlib
[decryption & authentication]
[rule body]
```

In this example, the script imports a library of code ("android") associated with the Android™ operating system, as well as a library of compiled code ("zenlib") that interprets the rule body and decryption and authentication information. For example, the "zenlib" code can be configured to interpret logical, mathematical, and/or Boolean operators such as "AND," "OR," "THEN," "LESS THAN," "MORE THAN," etc.

From the various use cases described below, it will be appreciated that it is possible to provide many different types of mobile device rules 214 that cause the enterprise agent 320 to detect and guard against various types of problematic events associated with the mobile device 120. It is also possible to provide many different types of corresponding remedial actions 216 that cause the agent 320 to react to such problematic events by conducting various types of actions, such as restricting network communications, enforcing password-protections, sending reports back to the enterprise system 110 (e.g., reports of data content stored on the mobile device 120, data usage on the device 120, applications 318 running on the mobile device 120, and many other types of information), deleting data from the device 120, uninstalling applications 318 from the mobile device 120, and many other actions.

The use of mobile device rules 214, remedial actions 216, and/or scripts to be run by the scripting engine 322 can be leveraged to conduct compliance audits of mobile devices 120. In certain embodiments, an enterprise system 110 can be configured to cause the enterprise agents 320 of all or just some of the mobile devices 120 enrolled with the mobile device manager 202 to run one or more mobile device rules 214 at the request of the enterprise.

For example, suppose that the enterprise learns of a new computer virus to which the enterprise's mobile devices 120 may be particularly vulnerable. In such a case, the enterprise's IT personnel can cause the mobile device manager 202 to send instructions to the enterprise agents 320, for example, to run a particular mobile device rule 214 that scans for the new virus or simply determines whether the mobile device 120 is using the latest antivirus software updates.

In some cases, the enterprise's IT personnel can cause the mobile device manager 202 to send one or more "special" mobile device rules 214 to the mobile devices 120. In certain instances, the special mobile device rules 214 can be sent with instructions for the enterprise agents 320 to immediately determine whether the mobile devices 120 comply with these rules. Also, the special mobile device rules 214 can be sent with associated remedial actions 216, and it will be understood that different types of these special mobile device rules 214 and remedial actions 216 can be sent to different types of mobile devices 120. The mobile device manager 202 can send a special mobile device rule 214 to all of the mobile devices 120 whose assigned users 115 have particular roles 206. These special mobile device rules 214 may or may not be the same as the mobile device rules 214 and remedial actions 216 provided within the customized rule packages described above.

Upon receipt of such a special mobile device rule 214 and possibly a special remedial action 216, or upon receipt of instructions to run a mobile device rule 214 already stored on the mobile device 120, a mobile device's enterprise agent 320 can be configured to immediately determine whether the mobile device 120 is in compliance with the rule 214. If the mobile device 120 is not in compliance, the enterprise agent 320 can be configured to simply implement the special remedial action 216.

Alternatively or additionally, the agent 320 can be configured to send a compliance report to the mobile device manager 202, detailing the results of running the special mobile device rule 214 (e.g., a report detailing compliance or non-compliance with the rule, and/or a degree of compliance). The mobile device manager 202 can be configured to use these reports for various purposes. For example, the mobile device manager 202 can respond to the reports by sending, only to those mobile devices 120 that are not in compliance with the executed mobile device rule(s), (1) instructions for the agent 320 to run one or more additional mobile device rules 214 and, if the mobile device 120 is not in compliance with the additional mobile device rules 214, one or more additional remedial actions, or (2) additional special mobile device rules 214 and/or special remedial actions 216. These additional mobile device rules 214 can check for other forms of non-compliance, based on the assumption that a mobile device 120 that does not comply with one mobile device rule 214 is more likely to be out of compliance with other mobile device rules 214.

Example Use Cases for Device-Resident Management System

There are numerous possible "use cases" for which an enterprise may wish to use a mobile device rule 214 and an associated remedial action 216 on a mobile device 120. Examples of such use cases are now described. It will be understood that the following examples are not exhaustive, and that many different types of mobile device rules 214 and associated remedial actions 216 can be used for many different purposes. Further, skilled artisans will understand that a remedial action described below for a particular use case can be alternatively be executed for any other mobile device rules, problems, or use cases, as may be desired by the enterprise. Some of the use cases described below contain one or more sub-cases, also described below. Finally, some of these use cases overlap in certain ways.

Use Case 1:

One possible use case involves a situation in which a mobile device 120 is lost or stolen from its assigned user 115 (FIG. 1A). A mobile device rule 214 can define conditions for concluding that the device is lost or stolen. The mobile device rule 214 can specify that a mobile device 120 is lost or stolen, for example, when a different SIM card is installed, when a certain period of time elapses without a user login, or when the mobile device is reported as lost or stolen. An associated remedial action 216 can cause the enterprise agent 320 to remove data and/or software applications 318 from the mobile device 120, such as enterprise-related applications, all applications, enterprise-related data, or all data. An alternative remedial action 216 can cause the agent 320 to lock the device 120 to render it unusable. These remedies are useful because the mobile device 120 may contain valuable and/or confidential enterprise-related data that is desired to be kept from persons not associated with the enterprise. In some implementations, then the enterprise system 110 can issue a command to the device 120 to delete the data and/or destroy an encryption key used to decrypt the data. This command can be sent by the mobile device management system to the mobile device 120 over a wireless carrier network 125.

Use Case 2:

This use case relates to Use Case 1. A thief can prevent a wireless command, sent from the enterprise system 110, from reaching the mobile device 120 by removing the device's SIM card (or, depending on the mobile device 120, a similar or equivalent card that securely stores, e.g., the service-subscriber key (IMSI) used to identify a subscriber on the mobile device 120) from the SIM card port 312, which can effectively disable the connectivity of the mobile device 120 to the carrier network 125. In such an instance, the enterprise may be prevented from deleting the data from the device 120, and the thief may be able to access the data. This problem can be addressed by providing a mobile device rule 214 that the enterprise agent 320 uses to detect the disengagement of the SIM card from the SIM card port 312 of the device 120. In this use case, the agent 320 can execute a remedial action 216 that comprises producing a message delivered via the user interface 304, the message instructing the person using the device 120 (e.g., the user 115 or a thief) to reengage the SIM card with the SIM card port 312. For example, the message can instruct the person to reengage the SIM card with the SIM card port 312 within a specified time period (e.g., five minutes), or all of the data on the mobile device 120 (or just the enterprise-related data) will be deleted. In that case, the agent 320 can be further configured to delete the data if the SIM card is not reengaged within the specified time period. Alternatively or additionally, an encryption key used to decrypt the enterprise data can be invalidated or deleted as a remedial action associated with problems related to the SIM card disengagement.

Use Case 3:

The enterprise agent 320 can use a mobile device rule 214 to detect a problem defined as the disablement of password-protection for the mobile device 120. A corresponding remedial action 216 can cause the agent 320 to produce a message on the user interface 304, the message instructing the user 115 to activate password-protection on the device 120, perhaps within a specified time period. The remedial action 216 can further include instructions for the agent 320 in the event that password-protection is not activated, such as disabling the mobile device 120, deleting enterprise-related data from the device 120, decommissioning the device 120 (e.g., revoking its certificate and/or terminating its enrollment with the mobile device manager 202), and the like. It will be understood that deleting data from the mobile device 120 (in the context of this use case or any other) can include permanently deleting the data or, alternatively, merely deleting pointers to the data or deleting and/or invalidating data decryption keys. In a related example, a mobile device rule 214 can require the user 115 to change the password periodically, such as every 90 days.

Use Case 4:

The enterprise agent 320 can use a mobile device rule 214 to detect a problem defined as the mobile device 120 being located outside of an authorized geographical zone, or the device being located within an unauthorized geographical zone. A geographical zone can be specified in a variety of different ways, such as by inputting a location (e.g., on a map, or longitude/latitude values), a shape and size of the geographical zone, and a positional relationship between the inputted location and the shape of the zone. For example, a circular zone centered about the inputted location can be defined by specifying a radius of the geographic circle. A mobile device rule 214 can also include time ranges (hours, days, etc.) within which the restriction applies. The agent 320 can detect the location of the device 120 using the GPS chip 316.

A corresponding remedial action 216 can cause the agent 320 to produce a message delivered via the user interface 304, the message instructing the user 115 to return the device 120 to the authorized geographical zone or leave the unauthorized zone, for example, within a specified time period. The remedial action 216 can further include instructions for the agent 320 in the event that the device 120 is moved as instructed, such as disabling the mobile device 120, disabling features or software applications (e.g., the camera, Bluetooth connectivity, Wi-Fi connectivity, etc.) of the device 120, deleting enterprise-related data from the device 120, and the like. A remedial action 216 can simply send a communication (e.g., SMS text, email) to appropriate authorities of the enterprise, alerting them to the mobile device's location.

Use Case 5:

As described above in Use Case 4, mobile device rules 214 can effectively lead to activation or deactivation of mobile device features based on a location of the mobile device 120 (e.g., as determined by using the GPS chip 316) and/or temporal data. The mobile device feature in question can be the user interface 304 (keyboard, touchscreen, etc.), network interface 310, camera 314, microphone 330, USB connection, etc.

Take for example the camera 314. The enterprise agent 320 can use a mobile device rule 214 to detect a problem defined as the mobile device 120 being located within premises of the enterprise with the camera 314 being available for use. An enterprise may wish to prevent use of the camera 314 while the mobile device 120 is within the enterprise premises, to prevent the camera from capturing any sensitive or confidential information, images, or video from within the premises. As used herein, "enterprise premises" can include any buildings, facilities, factories, campuses, design houses, or other structures or areas owned, used, or operated by the enterprise. In one embodiment, a remedial action 216 corresponding to this problem can cause the agent 320 to deactivate or disable the camera 314 without the user's consent. In another embodiment, a remedial action 216 corresponding to this problem can cause the agent 320 to produce a message delivered via the user interface 304, the message instructing the user 115 to deactivate or disable the camera 314, perhaps within a specified time period. The remedial action 216 can further include instructions for the agent 320 in the event that the user 115 does not deactivate or disable the camera 314, such as deactivating or disabling the camera 314 without the user's consent. Preferably, after the remedial action 216 has been executed (and the camera 314 has been disabled), the agent 320 is configured to detect when the mobile device 120 has left the enterprise premises. At that point, the agent 320 can be configured to either reactivate the camera 314 without the user's consent, or produce a message delivered via the user interface 304, informing the user 115 that the user is authorized to reactivate the camera 314.

Use Case 6:

Related to Use Case 5, another example of a mobile device "feature" that can be regulated based on mobile device location is a software application 318, such as the device's web browser. For example, the enterprise agent 320 can use a mobile device rule 214 to detect a problem defined as the mobile device 120 being located within premises of the enterprise with the device's web browser being available for use. Corresponding remedial actions 216 can cause the agent 320 to instruct the user to disable the web browser (by producing a message on the user interface 304), or to simply disable the web browser without the user's consent. Then, when the mobile device 120 subsequently leaves the enterprise premises, the agent 320 can be configured to detect this and either inform the user that the web browser can be used or simply re-enable the web browser without the user's knowledge or consent. It will be appreciated that other software applications 318, aside from the web browser, can be regulated similarly.

Use Case 7:

Related to Use Cases 4 and 5, upon detecting that the mobile device 120 has entered a defined geographical area (e.g., the enterprise premises), the enterprise agent 320 can be configured to execute a remedial action 216 that causes the agent 320 to require the user 115 to enter a password into the device 120 in order to use certain device features, such as the camera 314 and/or web browser. Such a remedial action may be more appropriate for users 115 whose roles 206 require the users to have access to such features within the geographical area. Once the mobile device 120 leaves the defined area, the agent 320 can be configured to no longer require the password for the user 115 to use such mobile device features.

Use Case 8:

A mobile device rule 214 can cause the enterprise agent 320 to disable certain mobile device features (e.g., camera, microphone) based on temporal information (possibly without considering geographical data), such as the time of the day, the day of the week, a date range of the calendar, etc.

Use Case 9:

The mobile device 120 can comprise a credit card scanner for use within a store or other retail establishment. When an agent 320 of the scanner detects that the scanner has physically left the store, the agent can execute a remedial action 216 that instructs a user 115 of the scanner to return the scanner to the store, perhaps within a specified time period. The remedial action 216 can further include instructions to delete scanned credit card data from the scanner if the scanner is not returned to the store.

Use Case 10:

Another mobile device feature that can be regulated is the device's network connection capability, such as the network interface 310. The enterprise agent 320 can use a mobile device rule 214 to detect a problem defined as the mobile device's use of the network connection capability to connect or attempt to connect to a communication network that is unsecured or blacklisted by the enterprise (e.g., a false base Wi-Fi station). For example, the user 115 may attempt to connect to an unsecured WiFi network or blacklisted cellular service towers, which may expose the mobile device 120 to a security threat. A remedial action 216 can prevent the device 120 from accessing the restricted network(s).

In another embodiment, a remedial action 216 corresponding to this problem can cause the agent 320 to terminate or prevent the mobile device's connection to the unsecured network, without the user's consent. In another embodiment, the remedial action 216 can cause the agent 320 to deactivate the mobile device's network connection capability (e.g., by shutting down the network interface 310), without the user's consent. Such an action may leave one type of network communication capability (e.g., cellular networks, such as 3G or 4G networks) available, while only terminating a network communication capability (e.g., Wi-Fi) associated with the connection to the unsecured network. In another embodiment, the remedial action 216 can cause the agent 320 to produce an audio alert to the user 115 or a message delivered via the user interface 304, the message instructing the user 115 of the device 120 to terminate the connection to the unsecured network, perhaps within a specified time period. In yet another embodiment, the remedial action 216 can cause the agent 320 to produce a message delivered via the user interface 304, the message instructing the user 115 of the device 120 to deactivate the device's network connection capability, perhaps within a specified time period. In embodiments in which the agent 320 produces a message delivered via the user interface 304, the remedial action 216 can further include instructions for the agent 320 in the event that the user 115 does not terminate the connection or deactivate the network connection capability, such as taking one of such actions without the user's consent. In still other embodiments, a remedial action 216 can cause the agent 320 to lock the mobile device 120 to render it unusable, perhaps until the device disconnects from the unsecured or blacklisted communication network.

Use Case 11:

An enterprise may wish to regulate which software applications 318 are authorized for installation on a mobile device 120. For example, certain types of software applications 318 can negatively impact a user's productivity (e.g., by distracting the user from his or her duties), while other applications 318 can introduce a security threat (e.g., file-sharing applications that may allow other devices to copy enterprise data stored on the mobile device 120; or a rogue application that has malware or has been determined to collect device data and send the data to a rogue server). The enterprise agent 320 can use a mobile device rule 214 to detect a problem defined as the mobile device 120 having installed a software application 318 that the enterprise has blacklisted (i.e., forbidden for installation) or at least not white-listed (expressly permitted for installation). The agent 320 can be configured to use device-specific API's to determine which applications are installed on the mobile device 120.

Since different mobile device platforms vary as to the ability of an enterprise system 110 to uninstall the unauthorized application 318 without the user's consent, several different remedial actions 216 are possible. In one embodiment, a corresponding remedial action 216 can cause the agent 320 to producing a message on the user interface 304, the message instructing the user 115 to uninstall the unauthorized software application 318 from the mobile device 120, perhaps within a specified time period. The remedial action 216 can further include instructions for the agent 320 in the event that the user 115 does not uninstall the unauthorized application 318, such as disabling the mobile device 120, uninstalling the unauthorized application 318 (e.g., by causing the scripting engine 322 to run a script or plan that uninstalls the application), preventing the unauthorized application 318 from starting or running (e.g., by causing the scripting engine 322 to run a script that terminates one or more processes associated with the unauthorized application 318), deleting enterprise-related data from the device 120 (which can also be achieved by the scripting engine 322 running an appropriate script), sending an alert message (SMS text, email, etc.) to enterprise authorities about the installation of the blacklisted software application, and the like. In another embodiment, a corresponding remedial action 216 can cause the agent 320 to uninstall the unauthorized application 318 from the mobile device 120 without the user's consent. For mobile device platforms that do not permit an enterprise system 110 to uninstall software applications 318 from a mobile device 120 without the user's consent, the enterprise may opt to cause the agent 320 to use the scripting engine 322 to run a script that terminates one or more processes associated with the unauthorized application 318, thereby preventing it from running on the mobile device.

An enterprise can vary the punitiveness of the remedial action based on the role 206 of the user 115 assigned to the mobile device 120 that is running an unauthorized software application 318. For example, consider a corporate enterprise having some users 115 with roles 206 corresponding to high level executives, other users 115 having roles 206 corresponding to mid-level managers, and other users having roles 206 that correspond to lower level employees. For a high level executive whose mobile device 120 has an unauthorized application 318, the agent 320 can implement a remedial action 216 that simply instructs the user 115 to uninstall the application 318. For a mid-level manager whose mobile device 120 has an unauthorized application 318, the agent 320 can implement a remedial action 216 that causes the scripting engine 322 to terminate one or more processes associated with the unauthorized application 318, thereby preventing it from running on the mobile device 120. Moreover, the agent 320 might run such a script only under certain conditions (e.g., when the mobile device is on enterprise premises during normal working hours). Finally, for a lower level employee whose mobile device 120 has an unauthorized application 318, the agent 320 can implement a remedial action 216 that uninstalls the application 318 without the user's consent. Skilled artisans will appreciate that an enterprise can vary its remedial actions in many different ways based on different sets of criteria, and that this is just one example.

The enterprise may allow certain software applications 318 to be installed on a mobile device 120, but only under certain conditions, such as conditions relating to user roles 206 and/or mobile device properties 208. An enterprise may allow users 115 with particular roles 206 to install such applications 318 on their devices 120, while disallowing other users 115 from doing so. An enterprise may allow mobile devices 120 having certain device-types to install particular software applications 318, while disallowing the same for different device types. Prohibitions on the installation of particular software applications 318 on the mobile devices 120 can be regulated in a very flexible and customizable way, by defining appropriate mobile device rules 214.

Use Case 12:

Related to Use Case 11, a mobile device rule 214 can define a problem as an attempt to run (as opposed to install) a software application 318 in violation of defined restrictions. Such restrictions can be temporal (the application is allowed to run only during certain times and/or days), geographical (the application is allowed to run only when the mobile device 120 is in one or more defined geographical zones), password-dependent (the application is allowed to run only if the user provides a correct password associated with the application), other types of restrictions or conditions, or combinations thereof.

In one embodiment, the rule 214 includes a list of restricted or blacklisted applications 318, and possibly even a list of unrestricted or white-listed applications 318. The enterprise agent 320 can use an application monitor service 334 (which can be part of the agent 320 itself, or alternatively another part of the mobile device 120, as shown) to detect which applications 318 or processes are running. For example, the Android™ operating system provides a mechanism for collecting and viewing system output, whereby logs from various applications and portions of the system are collected in a series of circular buffers, which then can be viewed and filtered by the "logcat" command. The "logcat" command can be used from an ADB (Android Debug Bridge) shell to read the log messages. Alternatively, Android's Dalvik Debug Monitor Server (DDMS) can automatically report "logcat" information via connection to ADB. Hence, in a mobile device 120 running the Android™ operating system, the enterprise agent 320 can be configured to "listen" to certain "logcat" information and detect the invocation of mobile device applications of interest. It will be appreciated that other mobile device operating systems provide alternative systems and methods for detecting the invocation of mobile device applications.

When the agent 320 determines that an application 318 is invoked, the agent 320 determines if the application is blacklisted (or white-listed). If the application 318 is white-listed or at least not blacklisted, the agent 320 allows the application to run. If the application 318 is blacklisted (or perhaps, more strictly, not white-listed), the agent 320 can use the rule 214 to determine the defined restriction(s) for the application and whether the restrictions apply. For example, if a restriction is temporal, the agent 320 can determine if allowing the application to run currently would violate the temporal restriction. If a restriction is geographical, the agent 320 can determine if the device 120 is in a restricted geographical zone. If a restriction is password-dependent, the agent 320 can invoke a password input activity (which can be part of a remedial action 216) that prompts the user 115 for a password associated with the application 318. If any of the restrictions is violated (e.g., unauthorized time or day, device 120 outside of authorized geographical zone, incorrect password provided, other restrictions, combinations of these restrictions, etc. as defined by the rule 214), then the agent 320 can prevent the application 318 from running by, e.g., using the scripting engine 322 to run a script that kills the application.

In certain embodiments, the agent 320 is configured to terminate a running application 318 if the use restriction is violated after the application 318 was invoked. In other words, if the use conditions are met at the invocation of the application 318, but then subsequently violated during the use of the application 318, the agent 320 can be configured to kill the application 318. For example, suppose that the applicable mobile device rule 318 allows for an application 318 to be used only during a defined time window, and that the application 318 is invoked during the allowed time window but then remains in use at the expiration of the time window. In this case, the rule 318 may direct the agent 320 to terminate the application 318. In another example, suppose that the mobile device rule 318 allows for an application 318 to be used only when the mobile device 120 is in a defined geographical zone, and that the application 318 is invoked when this condition is met. Suppose further that the user 115 takes the device 120 outside of the defined geographical zone during the use of the application 318. In this case, the rule 318 may direct the agent 320 to terminate the application 318 as soon as the device 120 leaves the defined geographical zone.

Use Case 13:

A mobile device rule 214 can also define a problem as the removal of a required software application 318 from the mobile device 120. A user 115 might accidentally or intentionally uninstall the application. An associated remedial action 216 can cause the enterprise agent 320 to notify the user 115 of the removal of the application 318, and that its reinstallation is required.

Use Case 14:

Related to Use Case 13, a mobile device rule 214 can also be used by the enterprise agent 320 to detect when a required software application 318 is installed but not running on the mobile device 120. An associated remedial action 216 can cause the enterprise agent 320 to notify the user 115 and instruct the user to run the required application.

Use Case 15:

The enterprise agent 320 can use a mobile device rule 214 to detect a problem defined as the mobile device 120 storing enterprise-related data for which the device is not authorized to store. In one embodiment, a corresponding remedial action 216 can cause the agent 320 to produce a message on the user interface 304, the message instructing the user 115 to delete the unauthorized enterprise-related data from the mobile device 120, perhaps within a specified time period. The remedial action 216 can further include instructions for the agent 320 in the event that the user does not delete the data, such as deleting the data from the device 120 without the user's consent, disabling the device 120, and the like. In another embodiment, a corresponding remedial action 216 can cause the agent 320 to delete the enterprise-related data from the mobile device 120 without the user's consent.

Use Case 16:

A mobile device rule 214 can be used by an enterprise agent 320 to detect when the mobile device 120 is in a roaming network, and an associated remedial action 216 can cause the agent 320 to alert the user 115 of the same. A remedial action 216 can also cause the agent 320 to connect the device 120 to available Wi-Fi networks while the device is roaming.

Use Case 17:

A remedial action 216 can cause the agent 320 to begin recording the mobile device's location for a certain time period, such as when the device 120 is roaming. The agent 320 can report this information back to the enterprise system 110.

Use Case 18:

A mobile device rule 214 can cause the enterprise agent 320 to activate or make applicable new mobile device rules 214 if a mobile device 120 goes a certain time period (e.g., a few hours or days) without connecting to the enterprise system 110.

Use Case 19:

A mobile device rule 214 can cause the enterprise agent 320 to toggle the mobile device 120 from its airplane mode if a Wi-Fi or other network becomes available to the device.

Use Case 20:

If the mobile device 120 uses a VPN, a mobile device rule 214 can cause the enterprise agent 320 to disable connectivity to networking hotspots.

Use Case 21:

Related to Use Case 11, a mobile device rule 214 can cause the enterprise agent 320 to detect when a user 115 or mobile device 120 attempts to use a software application 318 (e.g., Facebook™, Dropbox™, Gmail™, Hotmail™, etc.) to send enterprise data that is sensitive or confidential. An associated remedial action 216 can cause the agent 320 to kill the software application 318, uninstall it, or other action preventing the data transfer.

Use Case 22:

Related to Use Case 21, a mobile device rule 214 can cause the enterprise agent 320 to detect when a user 115 or mobile device 120 is connected to an enterprise resource 130 and accessing sensitive or confidential data. In certain circumstances, a remedial action 216 can cause the agent 320 to prevent the device 120 from downloading, copying, and/or sending the data to anyone else.

Use Case 23:

A mobile device rule 214 can cause the enterprise agent 320 to detect when the number of SMS messages in a mobile device inbox exceeds a defined amount, and an associated remedial action 216 can cause the agent 320 to alert an IT administrator of the same.

Use Case 24:

A mobile device rule 214 can cause the enterprise agent 320 to monitor the mobile device's message inbox and detect inbound SMS messages from blacklisted telephone numbers or messages that include enterprise information that is confidential or sensitive. An associated remedial action 216 can cause the agent 320 to alert an IT administrator of the same, disable the device 120, delete the sensitive messages, disable the device's messaging capability, and the like.

Use Case 25:

Related to Use Case 24, a mobile device rule 214 can cause the enterprise agent 320 to monitor the mobile device's outbound message queue and detect outbound SMS messages to blacklisted telephone numbers or messages that include enterprise information that is confidential or sensitive. An associated remedial action 216 can cause the agent 320 to alert an IT administrator of the same, disable the device 120, delete the sensitive messages, disable the device's messaging capability, and the like.

Use Case 26:

A mobile device rule 214 can be used by the enterprise agent 320 to detect when a new or unauthorized SIM card is inserted into the mobile device 120. A remedial action 216 can cause the agent 320 to send a communication to enterprise authorities of the new SIM card, instruct the user 115 to remove the SIM card, etc.

Use Case 27:

A mobile device rule 214 can be used by the enterprise agent 320 to detect a pattern or signature of suspicious behavior by a user 115 of a mobile device 120. For example, the rule 214 can define a problem involving some logical combination of user behaviors, such as frequenting of blacklisted or suspicious websites, use of blacklisted or suspicious IP addresses, and/or the installation or running of blacklisted mobile device applications. If the agent 320 determines that the behaviors of a user 115 have violated the rule 214, the agent 320 can enforce a remedial action 216 such as preventing the user 115 from logging into the enterprise system 110, deleting all enterprise data from the device 120, etc.

Some mobile device operating systems do not permit an application (such as the enterprise agent 320) to see what other applications on the device 120 are doing. This is sometimes referred to as the "sandboxing" of applications on the device 120. Preferably, the mobile device's applications whose usage is necessary to implicate the mobile device rule 214 that defines the user's suspicious behavior pattern are programmed to record these behaviors into a secure document container 336, which is described more fully below. By doing so, the agent 320 can be configured to read those suspicious behaviors by accessing the container 336.

Use Case 28:

The enterprise agent 320 can use a mobile device rule 214 to detect a problem defined as the mobile device's receipt of an unauthorized or suspicious network connection. Generally, a mobile device 120 receives much fewer incoming network connections than it generates outgoing connections, because users 115 of mobile devices 120 more typically connect outwardly (e.g., when users 115 browse web sites, search online stores, etc.). Hence, the incoming network connection may be due to an attempt by a third party to hack into the mobile device 120 for nefarious reasons, such as to steal enterprise information, disable the device 120, and the like. Of course, there are some instances when incoming connections are authorized or benign, such as when a mobile device 120 receives email. However, email is typically received through a well known port of the device 120, which the agent can be configured to determine. Thus, the enterprise agent 320 can be configured to react to the receipt of an incoming network connection by inspecting parameters of the connection (e.g., the mobile device port for the connection). If the inspection leads to a determination that the incoming connection is authorized, then the agent 320 can be configured to allow the incoming connection. On the other hand, if the inspection leads to a determination that the incoming connection is not authorized or is suspicious, the agent 320 can be configured to execute a corresponding remedial action 216 that denies, prevents, or terminates the unauthorized or suspicious network connection. This functionality may be referred to as a "mobile firewall."

Cloud-Based Enterprises

In some embodiments, the enterprise system 110 is provided substantially or entirely within the cloud 156. Any needed mobile device management systems 126, secure mobile gateways 128, and enterprise resources 130 are deployed substantially or entirely within the cloud 156 in such cloud-based enterprise systems 110. A meta-application system can be deployed within the cloud 156 and/or the mobile devices 120 to help manage the devices 120. Such embodiments may or may not include a non-cloud enterprise system, or meta-application components deployed within a non-cloud enterprise system.

For example, an enterprise (e.g., a social networking enterprise) can provide mobile devices 120 (e.g., iPads™) to a group of people, with meta-application components being deployed within the devices 120, and with meta-application components and any needed systems 126, gateways 128, and resources 130 being deployed solely within the cloud 156. In certain embodiments, an enterprise can use policies (e.g., access policies 218) stored within the cloud 156 and/or the devices 120 to help manage or restrict mobile device communications or access to cloud-based enterprise resources. The meta-application can also be used to monitor/measure/remediate the cloud or cloud-based services used by the enterprise.

Improved Communication Experience Between Enterprise and Mobile Devices

For many carrier networks 125, there are typically some geographical areas in which wireless service is weak or unavailable. This can occur if, for example, the wireless carrier has relatively few or no cellular communication nodes or towers in such areas. With reference to FIG. 1A, the network connection 142 between the mobile device 120 and the carrier network 125 is often unreliable, particularly when the mobile device 120 is located within such areas with weak or nonexistent wireless service. Accordingly, the network connection 142, 144 between the mobile device 120 and the enterprise system 110 is often unreliable.

From the perspective of a mobile device 120, the loss of the network connection 142 can be inconvenient when a user 115 inputs data to be sent to an enterprise resource 130 of the enterprise system 110. For example, a software application 318 may be configured to open a network connection 142, 144 to the mobile device management system 126 or other network component, and to request data input from the user, typically via the user interface 304 of the mobile device 120. For instance, an application 318 can be configured to provide one or more data fields on the display 326, the data fields configured to receive the user's data as text entry via the keypad 324. The application 318 can be further configured to send the data to the enterprise resource 130 once the data is input by the user 115. However, if the network connection 142 is lost before the data is sent to the mobile device management system 126, the application 318 might discard the data that the user 115 input. For example, the application 318 might discard the data upon receipt of a TCP socket error reporting the lost connection 142. Or, the application 318 may attempt to send the data to the mobile device management system 126 and wait for a reply. Since the connection 142 is lost, the application 318 would eventually time-out after receiving no reply for a certain time period. In either case, the application 318 might discard the data that the user 115 provided, without the data being sent to the mobile device management system 126. Ultimately, this makes the user 115 re-enter the data once the connection 142 is regained.

A somewhat similar dynamic may occur from the perspective of an enterprise resource 130 and tunneling mediator 224 (or other tunneling mediator). In particular, the mobile device's network connection 142 can become lost when the tunneling mediator 224 attempts to send data to a mobile device 120 via an application tunnel.

In some embodiments, upon the creation of an application tunnel between a software application 318 of a mobile device 120 and an enterprise resource 130 as described above, the device's enterprise agent 320 and/or the enterprise's tunneling mediator 224 (or other tunneling mediator) can be configured to enhance communications between the mobile device 120 and the enterprise resource 130, by caching data. For example, the agent 320 can cache data on the mobile device 120, and the tunneling mediator 224 can cache data within the mobile device management system 126.

Figure 10:
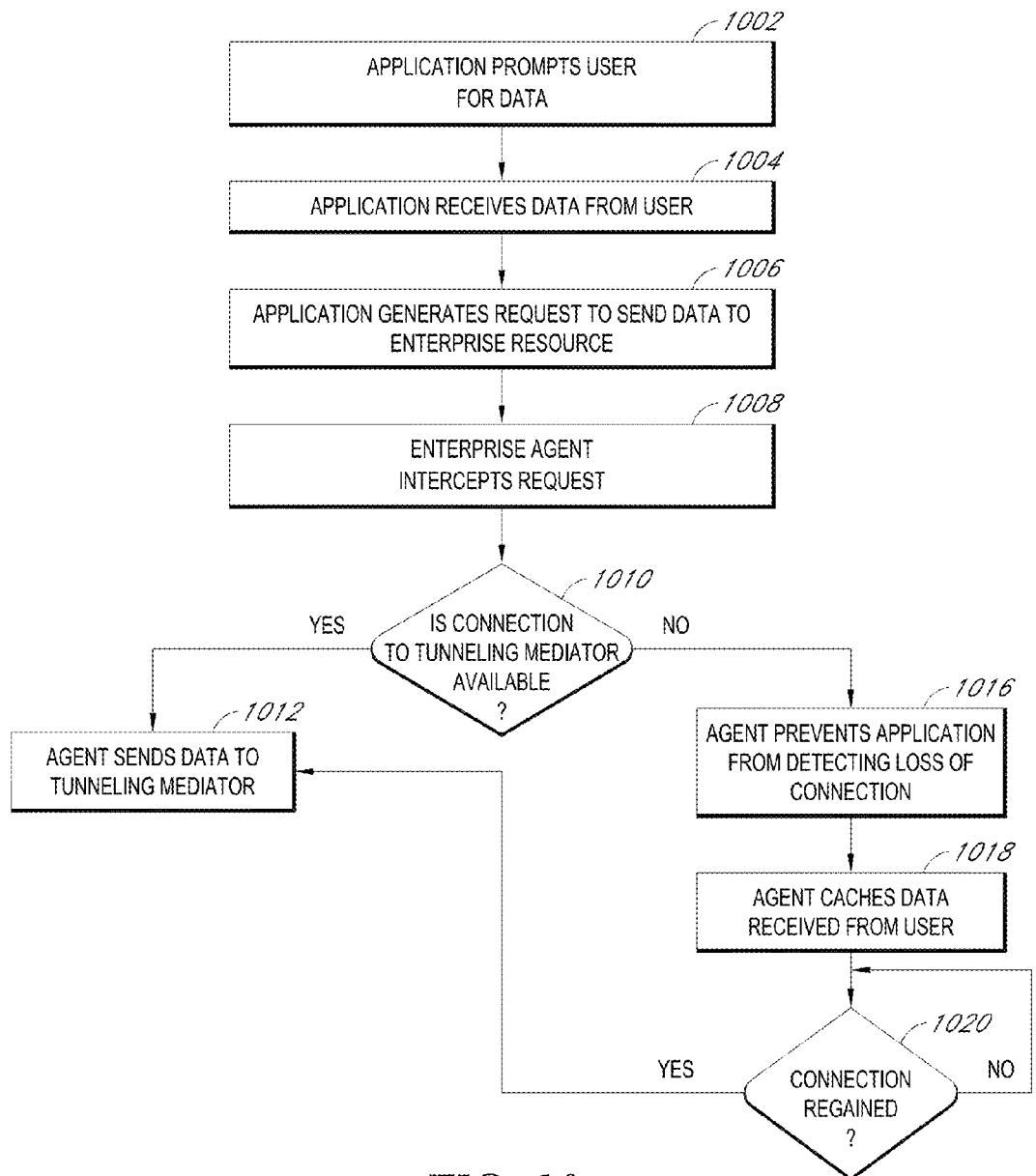
FIG. 10 is a flowchart illustrating an embodiment of a method in which a mobile device caches data input by a user in response to a loss of a network connection to an enterprise computer system.

FIG. 10 is a flowchart illustrating an embodiment of a method in which a mobile device 120 can cache data input by a user 115 in response to a loss of a network connection 142 to an enterprise computer system 110. The method is described in the context of FIG. 1A, but could also be used in other computing systems, such as any of the systems of FIGS. 1B-1E. The method begins in step 1002, in which a software application 318 on the mobile device 120 prompts the user 115 for data. At this point, an application tunnel may have already been formed between the application 318 and an enterprise resource 130 via a tunneling mediator. In step 1004, the application 318 receives the data, for example, via the user interface 304 of the mobile device 120. In step 1006, the application 318 generates a request to send the received data to an enterprise resource 130 of the enterprise system 110. In step 1008, the enterprise agent 320 receives or intercepts the application's request to send the received data to the enterprise resource 130. In decision step 1010, the agent 320 determines the availability of the network connection 142, 144 between the mobile device 120 and the tunneling mediator 224. If the network connection 142, 144 is available, then, in step 1012, the agent 320 begins sending the data to the tunneling mediator via the connection 142, 144. For example, the agent 320 can open up a TCP socket to the tunneling mediator server. If the agent is able to send all of the data received from the user 115, the application 318 may take no further action relate to the data previously received from the user at step 1004. In some embodiments, the method may return to step 1004 if the user 115 is still inputting new data to the application 318.

If the network connection 142, 144 is lost and unavailable, then, in step 1016, the agent 320 can prevent the software application 318 from detecting the loss of the network connection 142, 144. For example, the agent 320 can prevent the application 318 from detecting a TCP socket error caused by the loss of the connection 142, 144. Then, in step 1018, the agent 320 caches at least a portion (and preferably all) of the received data that has not been sent from the mobile device 120 to the tunneling mediator 224. The data can be cached in any suitable machine-readable memory device, such as the random access memory 308, the hard drive 306, flash memory, or a memory card engaged with the memory card port 307 of the mobile device 120. Then, in decision step 1020, the agent 320 determines whether the network connection 142, 144 to the tunneling mediator 224 has been regained. The determination in decision step 1020 can involve the agent 320 receiving a notification from a notification service to which the agent has subscribed. If the network connection 142, 144 to the tunneling mediator 224 has not been regained, the method can wait for a time period and then return to decision step 1020. Once the network connection 142, 144 is regained, the agent 320 sends the cached data to the tunneling mediator 224 via the regained network connection 142, 144.

In the illustrated embodiment, the enterprise agent 320 caches user-provided data (step 1018) only after the agent 320 determines that the connection to the tunneling mediator 224 has been lost (step 1010). In other embodiments, the agent 320 can be configured to cache user-provided data before determining whether the connection to the tunneling mediator 224 is lost or available. For instance, the agent 320 can cache the data in response to receiving the data from the user at step 1004. In such embodiments, the cached data can be erased after the data has been sent to the tunneling mediator 224.

It will be appreciated that the software application 318 may conduct a process in which the user inputs data in several successive stages, wherein the application 318 attempts to send the received data after each stage. If the network connection 142, 144 is lost before the final data input stage, and the application 318 receives additional data after the connection 142, 144 is lost, then the enterprise agent 320 can be configured to cache at least a portion (and preferably all) of the additional data. In that case, the agent 320 can respond to a regaining of the network connection 142, 144 by sending the cached additional data to the tunneling mediator via the regained network connection 142, 144.

As noted above, in step 1016 the enterprise agent 320 can prevent the software application 318 from detecting the loss of the network connection 142, 144. From the perspective of the software application 318, the connection 142, 144 is available in such circumstances. As far as the application 318 is concerned, it has an IP address and a server port with which to communicate. In this way, the application 318 can be given the impression that it is communicating with the enterprise resource 130, when in reality it is either communicating only with the agent 320 (when the connection 142, 144 is lost) or with the tunneling mediator 224 via the agent 320 (when the connection 142, 144 is available). When the connection 142, 144 is lost, the agent 320 can give the application 318 the impression that the enterprise resource 130 is still in the process of reading and responding to the request, thereby preventing the application 318 from timing out.

The mobile device user's experience can be similar to that of the application 318. The user's experience is dependent on the application 318. So, if the agent 320 keeps the application 318 unaware of the lost network connection 142, 144, the user may also remain unaware of it. This method can prevent, for example, the aforementioned problem of the user having to reenter the data into the application 318 when the connection 142, 144 is lost.

Figure 11:
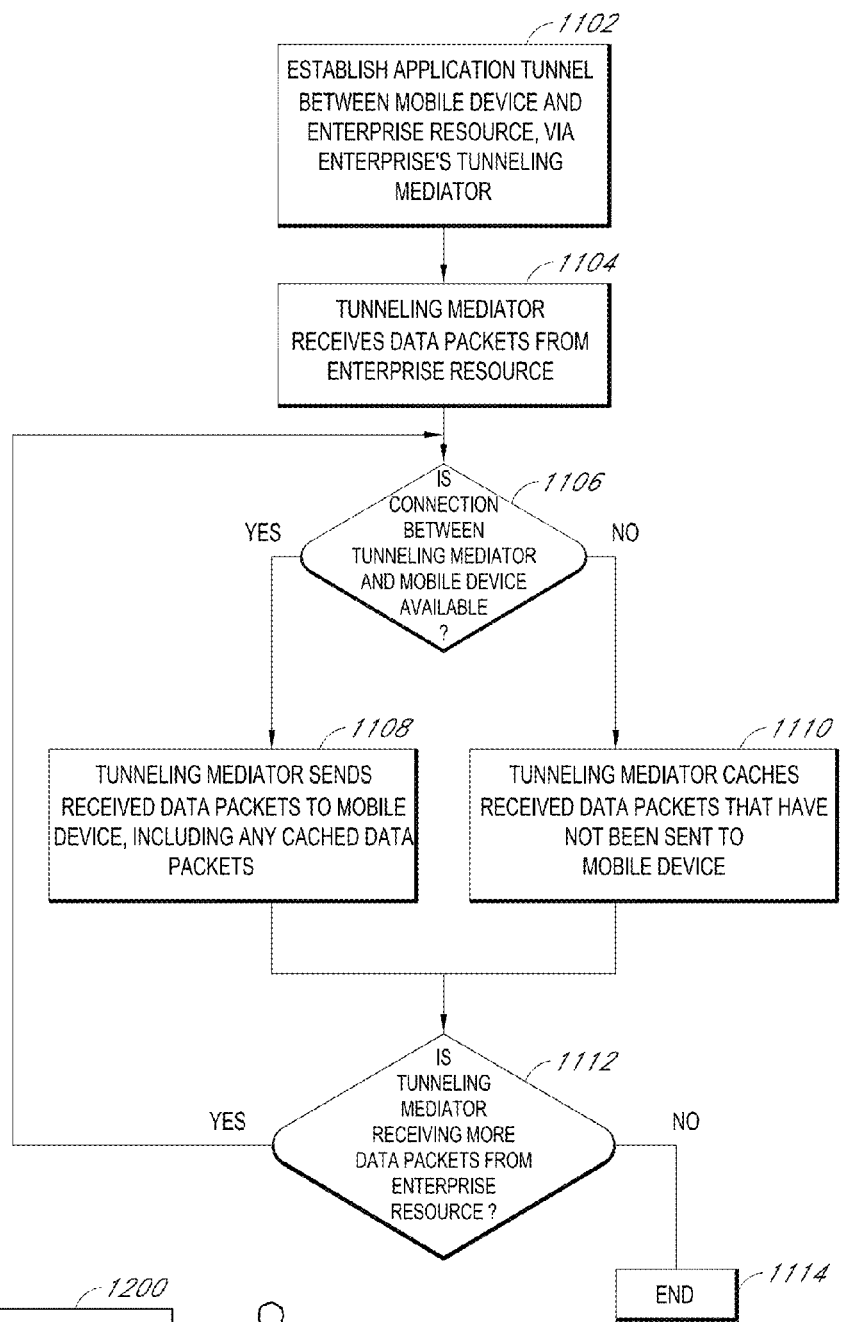
FIG. 11 is a flowchart illustrating an embodiment of a method in which an enterprise computer system caches data to be sent to a mobile device when a network connection to the mobile device is lost.

In some cases, particularly when a mobile device 120 is downloading a large amount of data from the enterprise system 110, it may be useful to respond to a lost network connection by caching data packets within the enterprise system 110. FIG. 11 is a flowchart illustrating an embodiment of a method in which an enterprise computer system 110 caches data to be sent to a mobile device 120 when a network connection 142, 144 to the mobile device 120 is lost. The method is described in the context of an enterprise resource 130 sending data to the mobile device 120. While the method is described in the context of FIG. 1A, it could be used in other computing systems, such as any of the systems of FIGS. 1B-1E. The method begins in step 1102, wherein an application tunnel is established between a mobile device application 318 and an enterprise resource 130, via the tunneling mediator 224, for example, as described above. For instance, the application tunnel may be established in response to an access request generated by a software application 318 on the mobile device 120. In step 1104, the tunneling mediator 224 receives one or more data packets from the enterprise resource 130. In decision step 1106, the tunneling mediator 224 determines whether the network connection 142, 144 between the tunneling mediator 224 and the mobile device 120 is available. If the network connection 142, 144 is available, then, in step 1108, the tunneling mediator 224 sends the data packets to the mobile device 120 via the network connection 142, 144. On the other hand, if the network connection 142, 144 is not available, then, in step 1110, the tunneling mediator 224 caches the one or more received data packets in a computer-readable storage, such as a storage of the mobile device management system 126. In step 1110, the tunneling mediator 224 can be configured to send to the enterprise resource 130, one or more acknowledgements of receipt of the data, on behalf of the mobile device 120, if the resource 130 expects such acknowledgement(s) from the device 120. After either of steps 1108 and 1110, the tunneling mediator 224 determines, in decision step 1112, whether the tunneling mediator 224 is receiving additional data packets from the enterprise resource 130. If so, then the method returns to decision step 1106. If not, then the method can end in step 1114.

In the illustrated embodiment, the tunneling mediator 224 caches data (step 1110) only after the mediator 224 determines that the connection to the mobile device 120 has been lost (step 1106). In other embodiments, the tunneling mediator 224 can be configured to cache the data before determining whether the connection to the mobile device 120 is lost or available. For instance, the tunneling mediator 224 can cache the data responsive to receipt of the data from the enterprise resource 130. In such embodiments, the cached data can be erased after the data has been sent to the mobile device 120.

As noted above, during the method illustrated in FIG. 10, the enterprise agent 320 on the mobile device 120 preferably gives the software application 318 (which may be the intended recipient of the data being sent by the enterprise resource 130) an impression that the network connection 142, 144 has not been lost, using the methods described above. Similarly, the tunneling mediator (e.g., the mediator 224) can be configured to give the enterprise resource 130 an impression that the network connection 142, 144 has not been lost, for example, in accordance with the method illustrated in FIG. 11.

In some embodiments, the tunneling mediator (e.g., the mediator 224) and/or the enterprise agent 320 is configured to compress data transmitted through the application tunnel. The tunneling mediator can be configured to compress data received from the enterprise resource 130 (or another resource outside the enterprise system 110) through the resource network connection 152, and to send the compressed data to the mobile device 120 through the network connection 142, 144. Upon receipt of the compressed data, the enterprise agent 320 can be configured to decompress the data before it is provided to a software application 318 that is the intended recipient of the data. Thus, the application 318 need not be capable of decompressing the data.

Similarly, the mobile device's enterprise agent 320 can be configured to compress data intercepted or received from a software application 318, and to send the compressed data to the tunneling mediator through the network connection 142, 144. Upon receipt of the compressed data, the tunneling mediator can be configured to decompress the data before it is provided to an enterprise resource 130 (or another resource outside the enterprise network 110) that is the intended recipient of the data. Thus, the enterprise resource 130 need not be capable of decompressing the data.

This compression functionality can be useful when the mobile device 120 is sending or receiving large data files, or when the mobile device 120 is in an area in which the network connection 142, 144 has low bandwidth. In certain embodiments, data is compressed by about 20-95%. The extent of the data compression can depend on the data type, the available bandwidth of the network connections 142, 144, and 152, as well as other factors. Moreover, both the application 318 and the user 115 of the mobile device 120 can remain unaware of the compression and decompression of the data.

In some embodiments, an application tunnel can be used by the enterprise system 110 for error correction (e.g., parity checks), resending of lost data packets, etc. The tunneling mediator 224 can be used for load balancing or thread safety/synchronization of a thread unsafe server application.

"Remote Control" of Mobile Devices

In some embodiments, a "remote control" system and methodology can be provided to allow an enterprise's mobile devices 120 to be diagnosed and controlled by one or more helpdesk operators, administrators or other persons (collectively referred to herein as "controllers") at computers ("controller computers") that are remotely located with respect to the mobile devices 120. Such systems and methods are now described.

Figure 12:
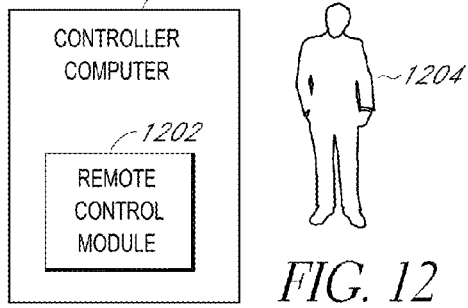
FIG. 12 is a schematic illustration of an embodiment of a controller computer for remotely controlling a mobile device.

With reference to FIGS. 2 and 12, the mobile device management system 126 can be configured to facilitate a "remote control session" between a mobile device 120 and a controller computer 1200 having installed thereon a remote control module 1202. The controller computer 1200 is operated by a user referred to herein as a controller 1204 and may be located either within or outside of the enterprise computer system 110 (FIG. 1A). In this context, the tunneling mediator 224 can help form an application tunnel between the controller computer 1200 and the enterprise agent 320 (FIG. 3) of the mobile device 120.

With reference to FIG. 12, the remote control module 1202 is preferably configured to initiate a network connection (e.g., over the Internet) to a server associated with the tunneling mediator 224 (e.g., a server on which the tunnel definitions 228 are stored, or a proxy server). In some embodiments, this connection is via an application tunnel, such as those described above. It will be appreciated that the enterprise may have multiple mobile device management systems 126. Hence, the remote control module 1202 can allow the controller 1204 to specify one or more tunneling mediators 224 with which to connect.

A user 115 of a mobile device 120 may encounter technical difficulties with the user's mobile device 120, and may wish to seek help from a helpdesk service. A helpdesk service can be operated exclusively by or for the enterprise, or alternatively for multiple enterprises. In some embodiments, the user 115 can request a remote control session with a controller computer 1200 by contacting the helpdesk service (e.g., by a phone call, email, text message, and the like). In such embodiments, a controller 1204 associated with the helpdesk service can then cause a remote control module 1202 of a controller computer 1200 to send to the user's mobile device 120 a request for a remote control session between the controller computer 1200 and the mobile device 120. In some embodiments, the enterprise agent 320 of a mobile device 120 allows the user 115 to request or initiate a remote control session with the controller computer 1200. In some embodiments, a remote control session can be initiated by a controller 1204 without first being requested by the user 115.

Figure 13:
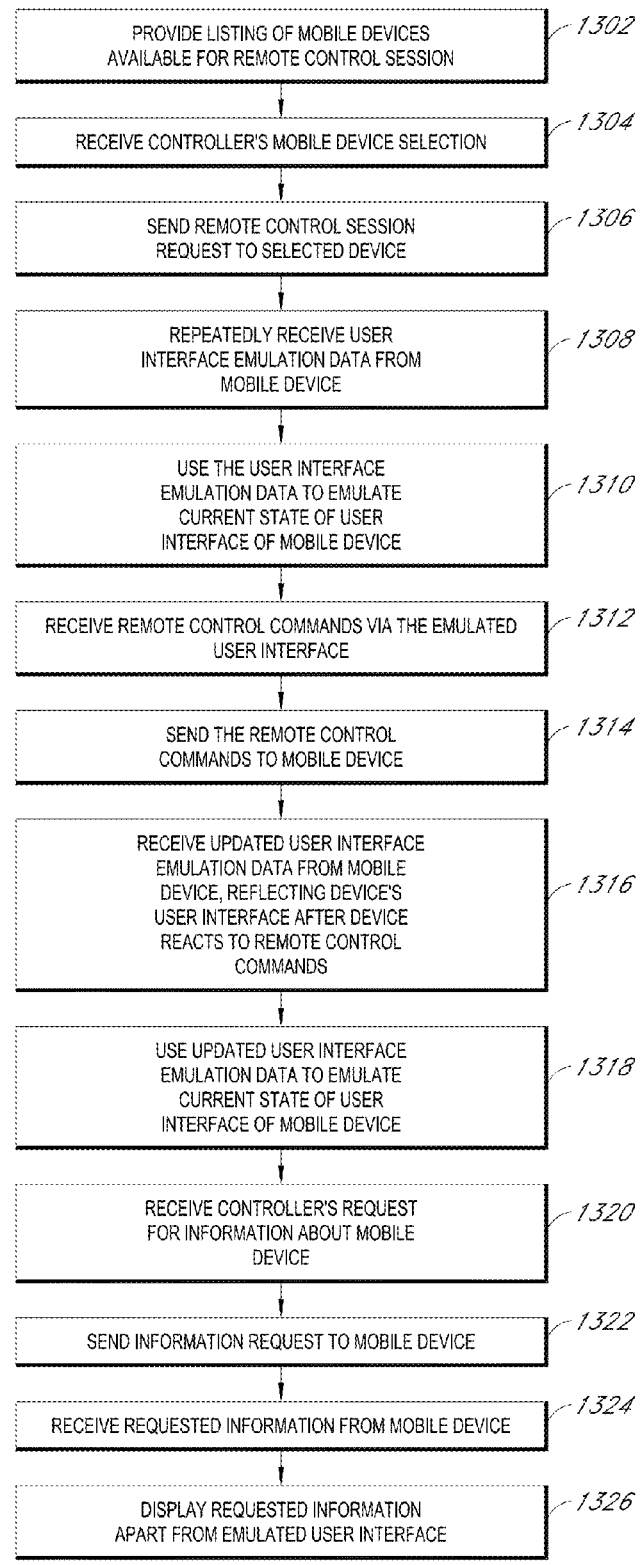
FIG. 13 is a flowchart illustrating an embodiment of a method in which a controller computer participates in a remote control session with a mobile device.

FIG. 13 is a flowchart illustrating an embodiment of a method in which a controller computer 1200 (FIG. 12) participates in a remote control session with a mobile device 120. The method begins at a point at which the remote control module 1202 has connected to a server associated with the tunneling mediator 224 (or another mediator of remote control sessions with mobile devices 120).

In step 1302, the remote control module 1202 provides, for the controller 1204, identifications of one or more mobile devices 120 that are available for a remote control session. This may be achieved by the remote control module 1202 sending a request to the mobile device management system 126 for such identifications, and the mobile device manager 202 responding by looking up the information in the mobile device information 204 and sending the requested information to the controller computer 1200. The provided identifications can comprise, e.g., the names or usernames of the users 115 assigned to the mobile devices 120. The identified devices 120 can be filtered (e.g., by the mobile device manager 202 or the remote control module 1202) in accordance with any criteria, such as criteria specified by the controller 1204 to the remote control module 1202. For example, the remote control module 1202 can list only those mobile devices 120 that are currently connected to the enterprise system 110, or only those mobile devices 120 or users 115 that are members of a defined user group, etc. Also, the remote control module 1202 can be configured to allow the controller 1204 to conduct searches against the enrolled mobile devices 120, to, e.g., search for a specific device 120 or user 115. In addition to identifying the users 115 of the mobile devices 120 to the controller 1204, the remote control module 1202 can also be configured to provide additional information about the identified devices 120, such as device model, operating system version, platform, etc. The mobile device manager 202 can obtain such information from the mobile device information 204, such as the mobile device properties 208.

Referring still to FIG. 13, in step 1304 the remote control module 1202 receives from the controller 1204 a selection of at least one of the mobile devices 120, and/or an instruction to initiate a remote control session with the selected device 120. In step 1306, the remote control module 1202 sends a request for a remote control session to the selected mobile device 120. In embodiments in which the remote control sessions are conducted via application tunnels, the request can be sent to the tunneling mediator 224. In other embodiments, the request is sent directly to the selected mobile device 120. In step 1308, the controller computer 1200 begins to repeatedly receive batches of newly updated "user interface emulation data" from the mobile device 120. In an application tunnel context, this data flows from the mobile device 120 to the controller computer 1200 via the tunneling mediator 224. User interface emulation data may comprise data that the enterprise agent 320 of the mobile device 120 captures using any of various device display "scraping" methods (also referred to as "screen scraping" and/or "screen buffer capture"), as known generally in the desktop computer field. For example, in the desktop computer environment, one known protocol for providing a graphical interface to another computer is Remote Desktop Protocol (RDP), developed by Microsoft™.

Figure 14:
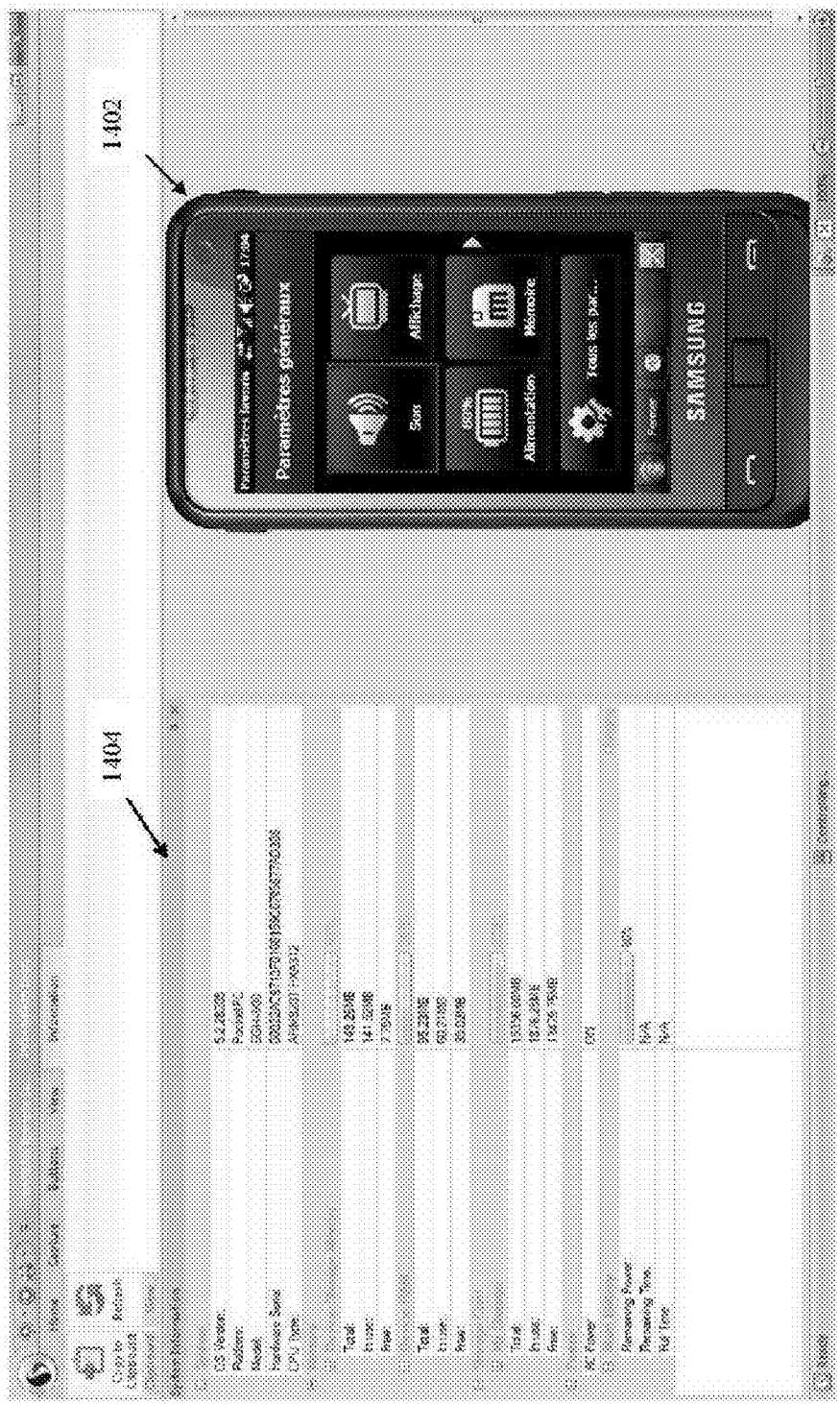
FIG. 14 shows an embodiment of a screen display of a controller computer engaged in a remote control session with a mobile device, including system information of the mobile device.

With continued reference to FIG. 13, in step 1310, the remote control module 1202 uses the user interface emulation data to emulate a current state of the user interface 304 of the mobile device 120. For example, FIG. 14 shows an embodiment of a screen display for a controller computer 1200, including a virtual user interface 1402 that emulates a user interface 304 of a mobile device 120 engaged in a remote control session with the controller computer 1200. Referring again to FIG. 13, steps 1308 and 1310 will ordinarily occur repeatedly and one after the other. Accordingly, a batch of user interface emulation data is received (step 1308) and then used by the remote control module 1202 to emulate the mobile device's user interface 304 (step 1310), and then a new batch of user interface emulation data is received (step 1308) and then used to emulate the user interface 304 (step 1310), and so on. In this manner, the remote control module 1202 keeps updating the emulated user interface to reflect a current state of the user interface 304.

Preferably, the remote control module 1202 of the controller computer 1200 allows the controller 1204 to issue commands to the mobile device 120. Such commands are referred to herein as "remote control commands." Accordingly, referring still to FIG. 13, the remote control module 1202 can receive, in step 1312, remote control commands from the controller 1204. In some embodiments, the controller 1204 can provide these commands via the emulated user interface 1402. The remote control commands can be for accessing resources installed on the mobile device 120. In this context, the mobile device resources can include operating system features and functionalities, software applications, mobile device hardware, data resources, files, and the like. Then, in step 1314, the remote control module 1202 sends the remote control commands to the mobile device 120. At least some of the remote control commands can be commands that the user 115 could otherwise input directly into the mobile device 120. The mobile device 120 can react to such remote control commands as if they were received via the user interface 304 of the device 120. These types of remote control commands will typically cause the user interface 304 of the mobile device 120 to change, which in turn will be reflected in a new batch of user interface emulation data received from the mobile device. Accordingly, in step 1316, the remote control module 1202 receives updated user interface emulation data from the mobile device 120, reflecting a state of the device's user interface 304 after the device 120 reacts to at least some of the remote control commands, as if they were received via the user interface 304. Then, in step 1318, the remote control module 1202 uses the updated user interface emulation data to emulate the current state of the user interface 304 of the mobile device 120.

In certain embodiments, the remote control module 1202 can allow the controller 1204 to view information about the mobile device 120. The controller's viewing of information can be sequestered from the user interface 304 of the mobile device 120. Hence, in step 1320, the remote control module 1202 can receive a request from the controller 1204 for information about the mobile device 120. In step 1322, the remote control module 1202 can send the request for information to the mobile device 120. The request can essentially automate an API for a mobile device feature that returns requested information (e.g., API's for task manager, file explorer, registry editor, etc.). In step 1324, the remote control module 1202 can receive the requested information from the mobile device 120, preferably without displaying the information within the emulated user interface 1402. In step 1326, the remote control module 1202 can display the requested information on a display associated with the controller computer 1200, preferably in a location other than the emulated user interface 1402. Examples of mobile device information that can be requested in steps 1320 and 1322, received in step 1324, and displayed in step 1326 include the mobile device's system information, processes occurring on the mobile device, files stored on the mobile device, the mobile device's registry, and other data.

For example, the screen display of FIG. 14 includes a system information display 1404 shown next to the emulated user interface 1402. The system information display 1404 can provide some or all of, e.g., the mobile device's operating system version, platform, model, hardware serial number, CPU type, total storage memory capacity, storage memory in use, storage memory that is free, total RAM, RAM in use, RAM that is free, total storage card memory (e.g., SD card) capacity, storage card memory in use, storage card memory that is free, AC power availability, remaining battery power, and/or device usage time available from remaining battery power. It will be appreciated that additional system information can also be provided.

Figure 15:
FIG. 15 shows an embodiment of a screen display of a controller computer engaged in a remote control session with a mobile device, including access to a task manager of the mobile device.

In another example, FIG. 15 shows an embodiment of a screen display of a controller computer 1200 engaged in a remote control session with a mobile device 120, wherein the screen display includes a task manager display 1502 showing application processes occurring on the mobile device 120. The illustrated task manager display 1502 is shown next to the emulated user interface 1402. The task manager display 1502 can show some or all of, e.g., names of applications associated with the processes, amounts of RAM being used by the processes, percentages of CPU power being utilized by the processes, amounts of CPU time consumed by the processes, numbers of threads associated with the processes, and the device paths. It will be appreciated that additional information concerning such processes can also be provided. In some embodiments, the controller 1204 can issue remote control commands (to the remote control module 1202) associated with the task manager, such as terminating one or more processes on the mobile device 120. For instance, such remote control commands can be issued responsive to a selection made via the task manager display 1502.

Figure 16:
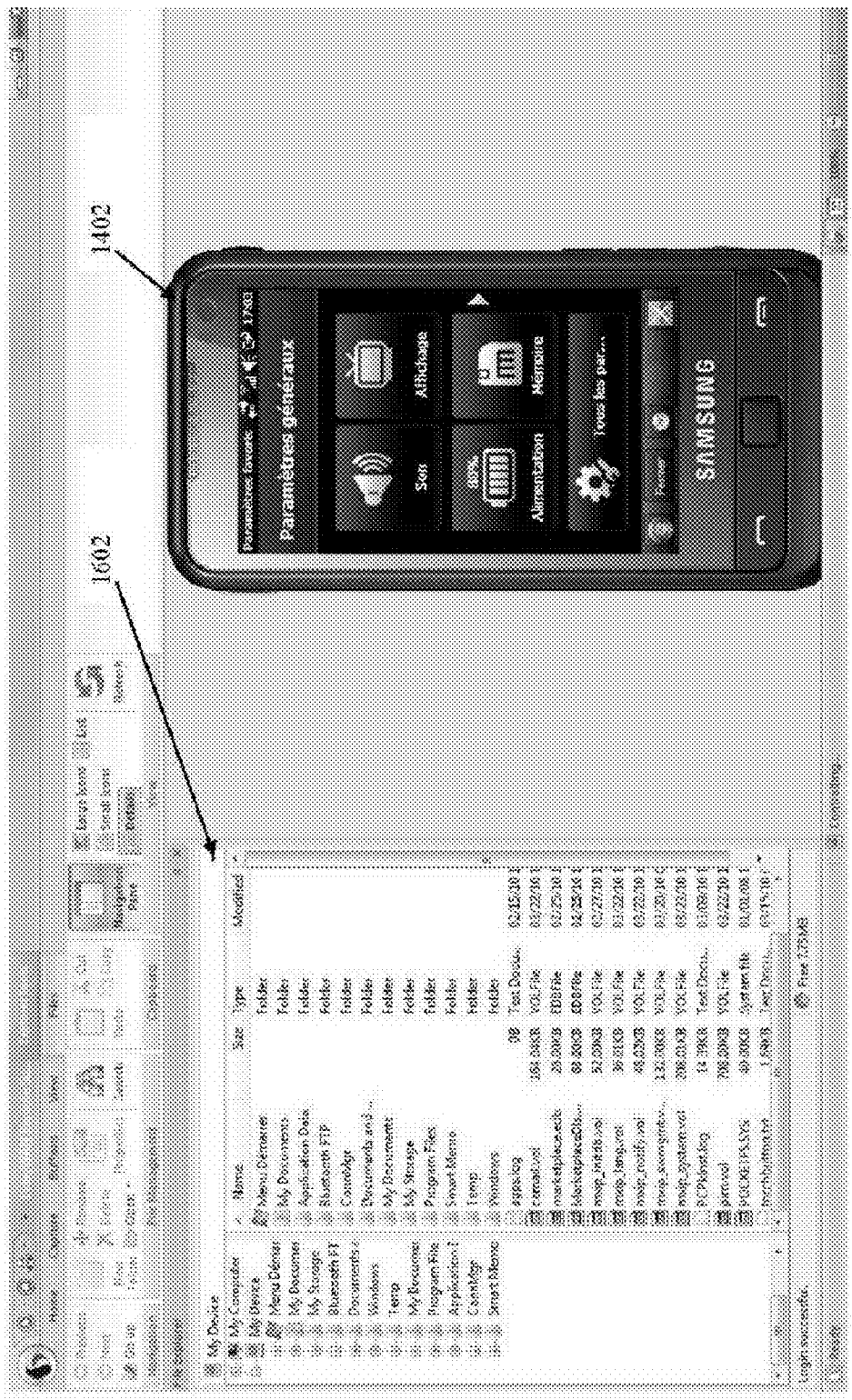
FIG. 16 shows an embodiment of a screen display of a controller computer engaged in a remote control session with a mobile device, including an interface for file transfers between the controller computer and the mobile device.

FIG. 16 shows an embodiment of a screen display of a controller computer 1200 engaged in a remote control session with a mobile device 120, including an interface 1602 for viewing files stored on the mobile device 120 (in any of the aforementioned memory storages), downloading files from the mobile device 120 to the controller computer 1200, and/or uploading files from the controller computer 1200 or from a different networked computer to the mobile device 120. The commands issued by the controller 1204 to the remote control module 1202 to view files, download files, and/or upload files can be sent to the mobile device 120 as remote control commands.

Figure 17:
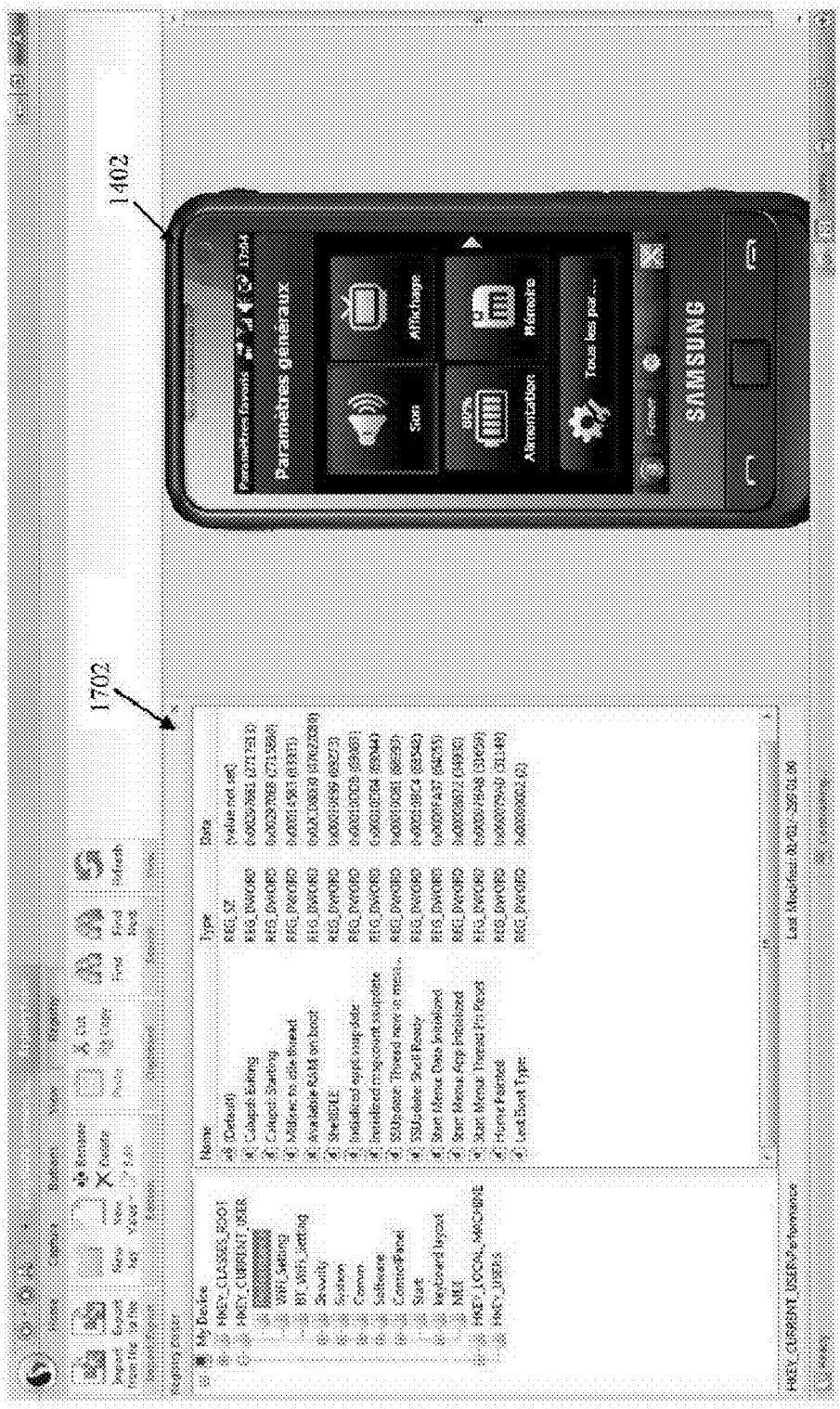
FIG. 17 shows an embodiment of a screen display of a controller computer engaged in a remote control session with a mobile device, including an interface for editing a registry of the mobile device.

In another example, FIG. 17 shows an embodiment of a screen display of a controller computer 1200 engaged in a remote control session with a mobile device 120, including an interface 1702 for viewing and/or editing a registry of the mobile device 120. The illustrated registry interface 1702 is shown next to the emulated user interface 1402.

Figure 18:
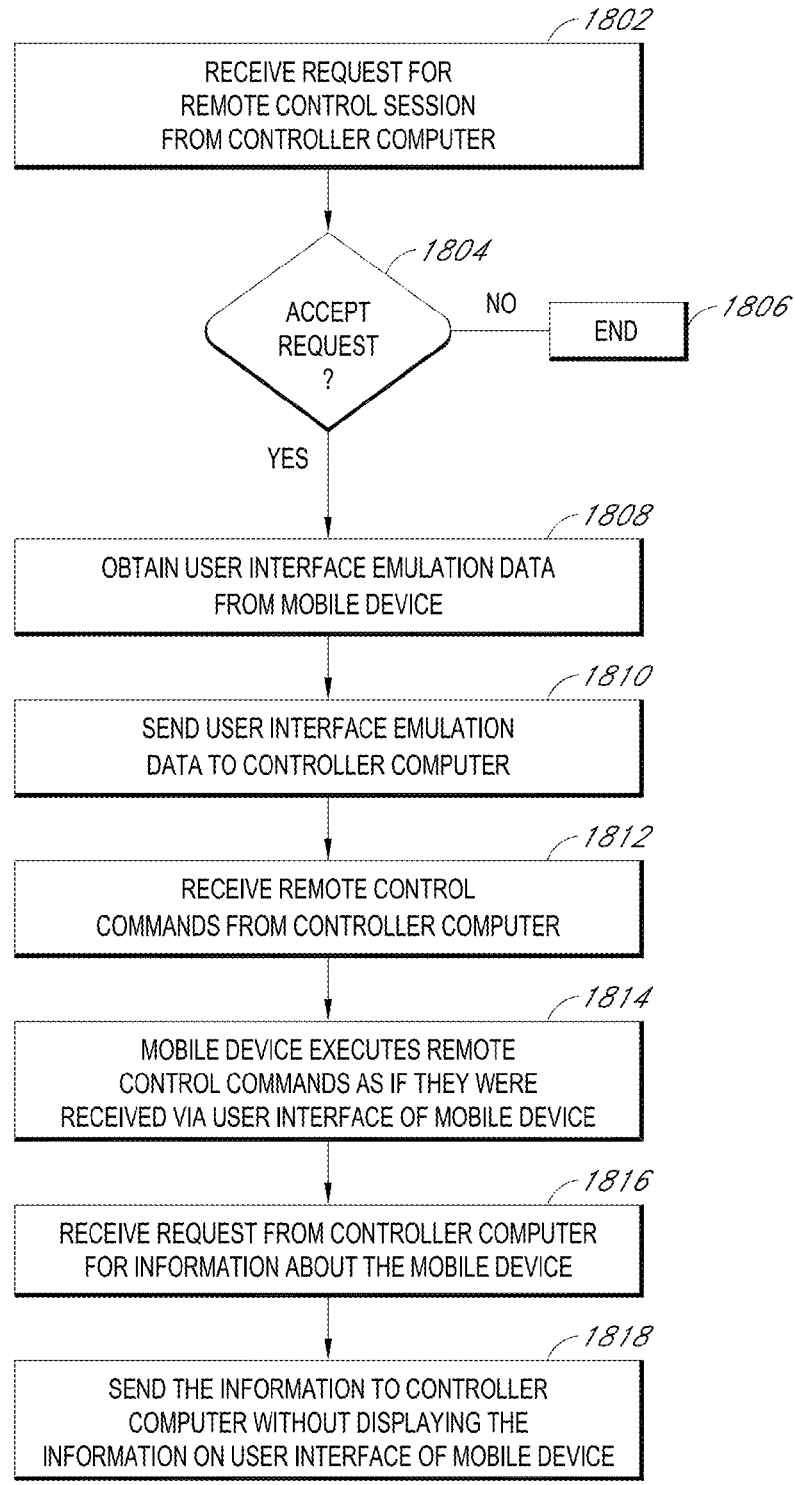
FIG. 18 is a flowchart illustrating an embodiment of a method in which a mobile device participates in a remote control session with a controller computer.

FIG. 18 is a flowchart illustrating an embodiment of a method in which a mobile device 120 participates in a remote control session with a controller computer 1200. The method shown in FIG. 18 can correspond to the method shown in FIG. 13, except that the method of FIG. 18 is shown from the perspective of a mobile device 120. As described elsewhere herein, the mobile device 120 can comprise a user interface 304 configured to receive local commands from a user 115 of the mobile device 120, for accessing resources installed on the mobile device. Further, the user interface 304 is typically configured to convey information to the user 115, such as via a screen or display 326.

The method begins in step 1802, in which the enterprise agent 320 of the mobile device 120 receives a request from a controller computer 1200 to participate in a remote control session with the controller computer. In some embodiments, the agent 320 can be configured to automatically accept such requests. In other embodiments, the agent 320 is configured to obtain permission from the user 115 to participate in the remote control session, e.g., by prompting the user for an indication of permission. In the illustrated method, the agent 320 determines, in decision step 1804, whether to accept the request. If the agent 320 does not accept the request (e.g., due to the user 115 denying the request, or due to the user 115 simply not giving permission within a predefined time period), then the method can end in step 1806.

On the other hand, if the enterprise agent 320 accepts the request, then the agent 320 responds to the request by requesting or establishing an application tunnel connection with the controller computer 1200 and obtaining, in step 1808, user interface emulation data (described above) from the mobile device 120. In step 1810, the agent 320 sends the user interface emulation data to the controller computer 1200. The agent 320 can repeatedly send updated user interface emulation data, for example at fixed time intervals or perhaps only when changes occur to the mobile device's user interface 304.

Referring still to FIG. 18, in step 1812 the agent 320 can receive remote control commands from the controller computer 1200, for accessing resources installed on the mobile device 120. As mentioned above, such mobile device resources can include operating system features and functionalities, software applications, mobile device hardware, data resources, files, and the like. At least some of these remote control commands can be commands that the user 115 could otherwise input directly into the mobile device 120 via the user interface 304. Hence, in step 1814, the mobile device 120 reacts to at least some of the remote control commands as if they were received via the user interface 304. Step 1814 can involve the agent 320 translating and/or providing the remote control commands to the device's hardware and/or software in a native language of the device, in the same manner that such hardware and/or software would receive the commands if the commands had been received via the mobile device's user interface 304. Since step 1814 can result in changes to the device's user interface 304, the agent 320 can be configured to subsequently send updated user interface emulation data to the controller computer 1200.

In step 1816, the enterprise agent 320 of the mobile device 120 receives a request from the controller computer 1200 for information about the mobile device. For example, such information can include the information described above in steps 1320, 1322, 1324, and 1326 of FIG. 13. In step 1818, the agent 320 sends the requested information to the controller computer 1200, without displaying the information on the user interface 304 of the mobile device 120.

In conducting a remote control session with a remote control module 1202 of a controller computer 1200, the enterprise agent 320 of a mobile device 120 can be configured to allow the controller 1204 to execute actions on the mobile device 120. In some cases, these can include actions that even the user 115 of the device 120 cannot perform (e.g., if the remote control module 1202 has functionality beyond that of the software applications 318 installed on the mobile device 120).

It will be appreciated that the remote control module 1202 can be configured to allow the controller 1204 to conduct numerous other operations against the mobile device 120 during a remote control session. For example, the remote control module 1202 can be configured to allow the controller 1204 to shut down or reboot the mobile device 120. In another example, the remote control module 1202 can be configured to allow the controller 1204 to install new software onto the mobile device 120. This may involve sending software application installation files from the controller computer 1200 or another networked computer to the mobile device 120, and then installing the application. In another example, the remote control module 1202 can be configured to allow the controller 1204 to uninstall software applications 318 from the mobile device 120. Many other operations are possible.

In some embodiments, the remote control module 1202 of the controller computer 1200 and the enterprise agent 320 of the mobile device 120 are configured to enable the controller 1204 and the mobile device user 115 to communicate with one another, using the controller computer 1200 and mobile device 120. For example, the remote control module 1202 and the enterprise agent 320 can be configured to enable a voice over internet protocol (VOIP) session that allows the controller 1204 and user 115 to speak to each other audibly. The mobile device 120 can use the speaker 328 of the mobile device 120 to audibly broadcast the controller's speech (input via a microphone of the controller computer 1200) to the user 115. Alternatively, the user 115 can listen to the controller's speech by connecting a pair of headphones to a headphone jack of the mobile device 120. Similarly, a speaker of the controller computer 1200 can broadcast the user's speech (input at the microphone 330 of the mobile device 120) to the controller 1204.

Figure 19A:
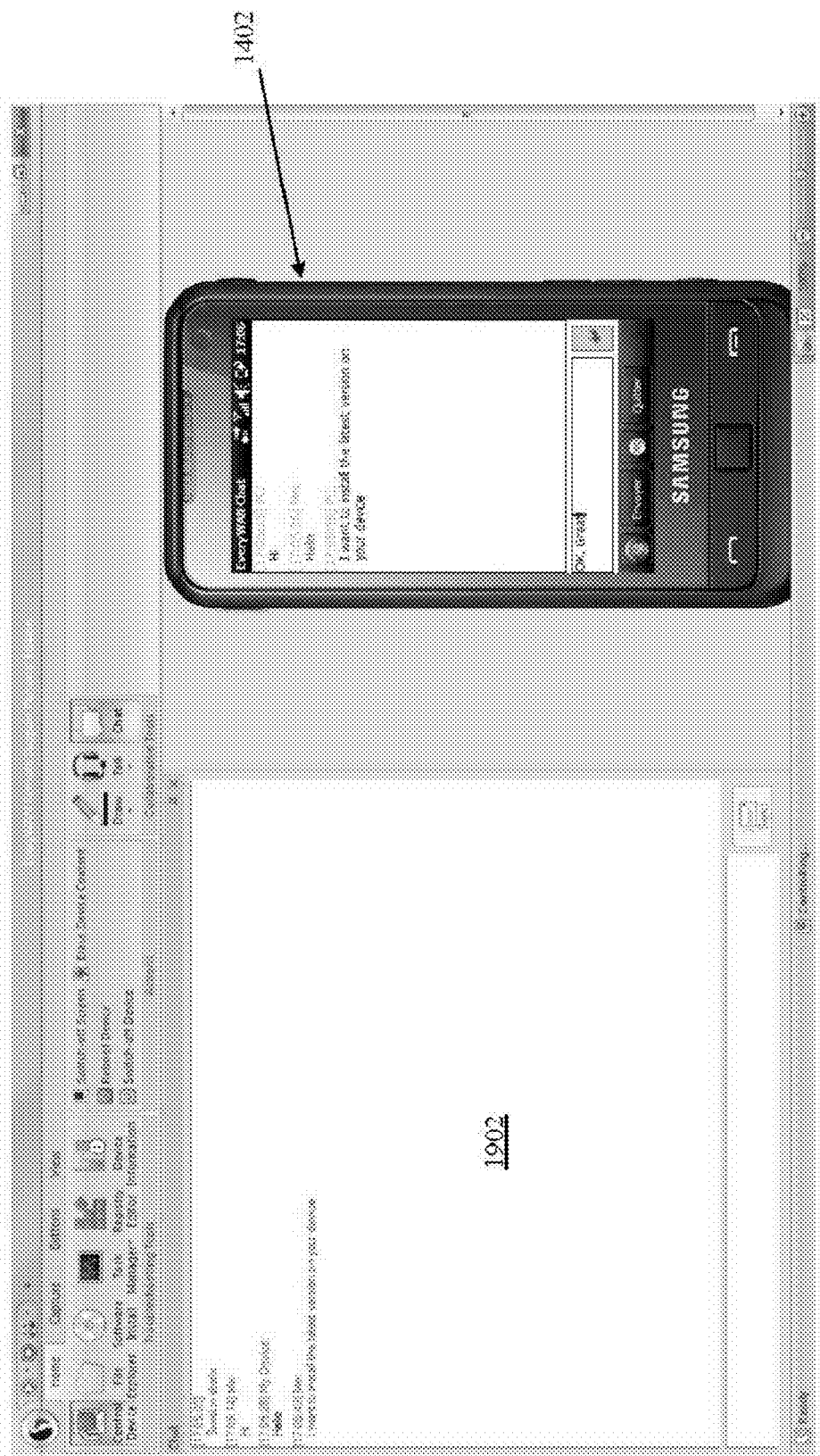
FIG. 19A shows an embodiment of a screen display of a controller computer engaged in a remote control session with a mobile device, including a chat session interface.
Figure 19B:
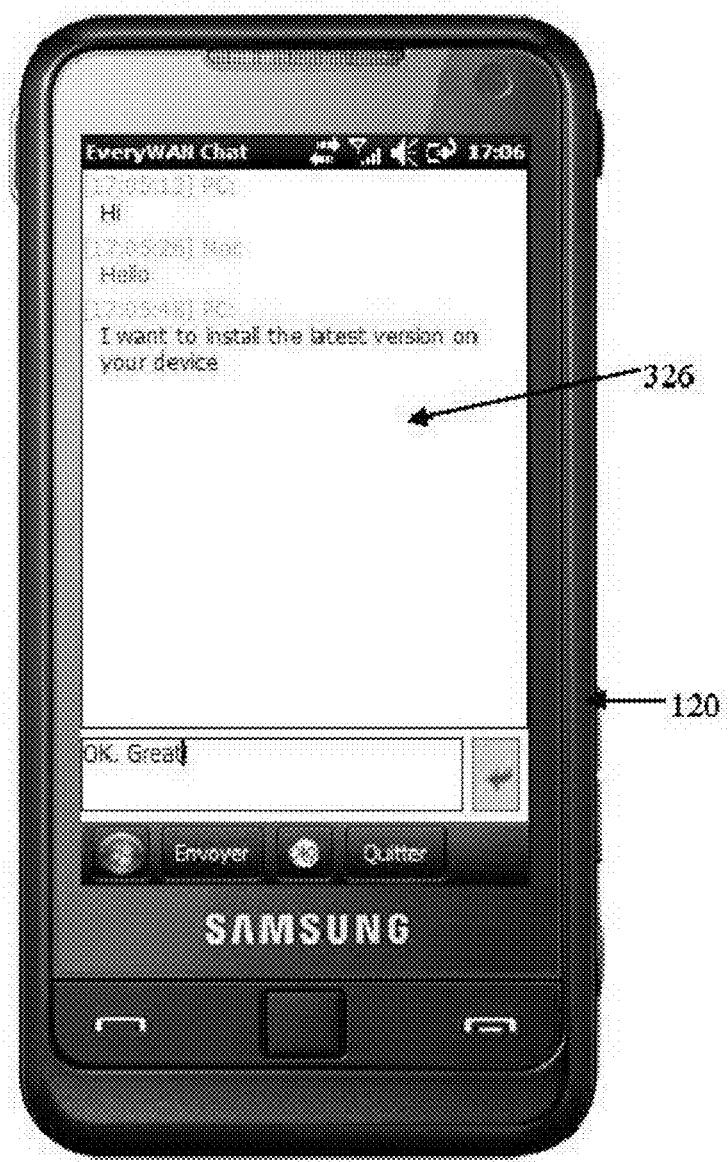
FIG. 19B shows an embodiment of a mobile device emulated in FIG. 19A.

In another example, the remote control module 1202 and the enterprise agent 320 can be configured to enable a text chat session between the controller 1204 and the user 115. FIG. 19A shows an embodiment of a screen display of a controller computer 1200 engaged in a remote control session with a mobile device 120, including a chat session interface. In the illustrated embodiment, the remote control module 1202 produces a chat session area 1902 in which the controller 1204 can enter text communications to be sent to the user 115, and in which the user's text communications are displayed to the controller 1204. The illustrated chat session area 1902 is shown next to the emulated user interface 1402. FIG. 19B shows an embodiment of the mobile device 120 emulated in FIG. 19A. The enterprise agent 320 is preferably configured to display, on the screen 326 of the mobile device 120, substantially the same text communications displayed in the chat session area 1902 of FIG. 19A.

Figure 20:
FIG. 20 shows an embodiment of a screen display of a controller computer engaged in a remote control session with a mobile device, including a shared whiteboard feature.

In another example, the remote control module 1202 and the enterprise agent 320 can be configured to enable shared whiteboard communications between the controller 1204 and the user 115. FIG. 20 shows an embodiment of a screen display of a controller computer 1200 engaged in a remote control session with a mobile device 120, including a shared whiteboard feature. In the illustrated embodiment, the remote control module 1202 allows the controller 1204 to superimpose images 2002 onto the emulated user interface 1402. The agent 320 of the mobile device 120 can be configured to receive the images 2002 and then superimpose them onto the screen 326 of the mobile device 120. The images 2002 can comprise, for example, text, drawings, and the like. In the illustrated screen display, the controller 1204 has circled an icon on the emulated user interface 1402 and superimposed the words "click here."

In certain embodiments, the remote control module 1202 is configured to allow the controller 1204 to adjust the view of the emulated user interface 1402. For example, in various embodiments, the remote control module 1202 is configured to allow the controller 1204 to adjust the emulated interface's resolution, color scheme, bits per pixel (BPP), zoom level, rotational orientation, etc. Further, the remote control module 1202 can be configured to allow the controller 1204 to adjust a "refresh rate" at which the enterprise agent 320 of the mobile device sends updated user interface emulation data to the controller computer 1200. The remote control module 1202 can also be configured to allow the controller 1204 to specify whether the data received from the mobile device 120 is to be compressed by the enterprise agent 320, as well specify the degree of compression.

In certain embodiments, the remote control module 1202 is configured to capture and save aspects of remote control sessions. For example, the remote control module 1202 can be configured to allow the controller 1204 to capture images of the emulated user interface, print the images onto a hardcopy printout, to record video of a remote control session, and the like. The remote control module 1202 can be configured to allow the controller 1204 to edit the captured images or video, and/or send captured media files to others, via email and the like.

In some embodiments, the remote control module 1202 can be configured to allow the controller 1204 to create macros for activating or executing certain features, settings, and/or software applications of the mobile device 120.

Analytics on Secure Mobile Gateway

Referring again to FIG. 4, the secure mobile gateway 128 can include a repository 410 of logged data. The repository 410 can store data indicative of state information generated at mobile devices 120 or generated by the secure mobile gateway 128. For example, the logged data can include various information, such as data regarding grants and denials of mobile device access requests by the gateway filter 401. The logged data can alternatively or additionally include data logged by and extracted from managed mobile devices 120. Such logged data can include, for example, data indicative of documents downloaded to the mobile device 120, system state(s) on particular mobile devices 120, programs launched on particular mobile devices 120, records of websites or other network resources accessed by particular mobile devices 120, information associated with email accounts of users copied on messages associated with managed mobile devices 120, documents attached to emails or other messages received by the mobile devices 120, etc. The logged data can include data obtained from the mobile device requests 402. For instance, for a secure mobile gateway 128 that supports ActiveSync, the logged data can include the DeviceId, DeviceType, User, and/or UserAgent from the ActiveSync request 402, as well as the ActiveSync command issued by the request. In the case of an access denial, the logged data can also include the provider 408 of the violated gateway rule 404, and information indicative of the reason for the denial. If access is denied based on a violated enterprise access policy 218 of the mobile device management system 126, the gateway 128 can determine which policy 218 was violated from the mobile device management system 126 and store it in the repository 410 of logged data. The logged data can also include mobile traffic data and/or other network information about the request 402, such as the IP address of the mobile device 120 that issued the request. The logged data can be stored in accordance with a logging standard such as Syslog, so that the data is readable by other applications.

The logged data can be provided to or accessed by an analytics service 414. In the illustrated embodiment, the secure mobile gateway 128 includes a log redirector service 412 that periodically reads the logged data 410 and sends some or all of it to the analytics service 414. The log redirector service 412 is preferably configurable so that an IT administrator can direct it to send only those portions of the logged data that match configurable criteria. For example, the log redirector service 412 can be configured to send only the logged data concerning denied requests 402, or only the logged data concerning granted requests 402, or logged data filtered based on different criteria. Further, the log redirector service 412 and/or the repository 410 of logged data can comprise a data-sharing interface that enables other systems (such as the analytics service 414) to query or extract data concerning the logged requests 402, such as user data, mobile device data, mobile traffic data (e.g., IP address of sender device), etc. It will be understood that the principles and advantages described with reference to analytics on the secure mobile gateway 128, can be applied to implement a variety of data mining and correlation for security or other purposes. As an example, if the logged data indicates that a mobile device 120 has accessed certain prohibited sites and also recently downloaded confidential documents which were then forwarded to an external email, this information can be a basis for denial of access to enterprise resources.

The analytics service 414 can comprise, for example, a Security Information Management (SIM) system, a Security Event Management (SEM) system, or a Security Information and Event Management (SIEM) system. SIEM solutions are a combination of SIM and SEM solutions. The analytics service 414 can be configured to monitor, analyze, and/or generate and send alerts, notifications, or reports based on the logged data. The analytics service 414 can be configured to detect patterns in the logged data, provide metrics useful for further analysis or actions, and diagnose problems associated with the data. The analytics service 414 can be configured to process data formatted according to various standards, such as Syslog. For instance, the analytics service 414 can utilize Splunk, a software program having these types of features. The analytics service 414 can be part of the enterprise system 110, or alternatively can be part of a third party system for analyzing data of the type logged in the repository 410.

For example, the analytics service 414 can be configured to process an access denial by the secure mobile gateway 128 by sending a communication (e.g., an email or SMS message) to the denied user 115, possibly specifying the reason for the denial of access (e.g., "Your request to access the XYZ Corp's network was denied because your mobile device does not comply with the enterprise's policy against installing the Angry Birds™ software application.").

Figure 21:
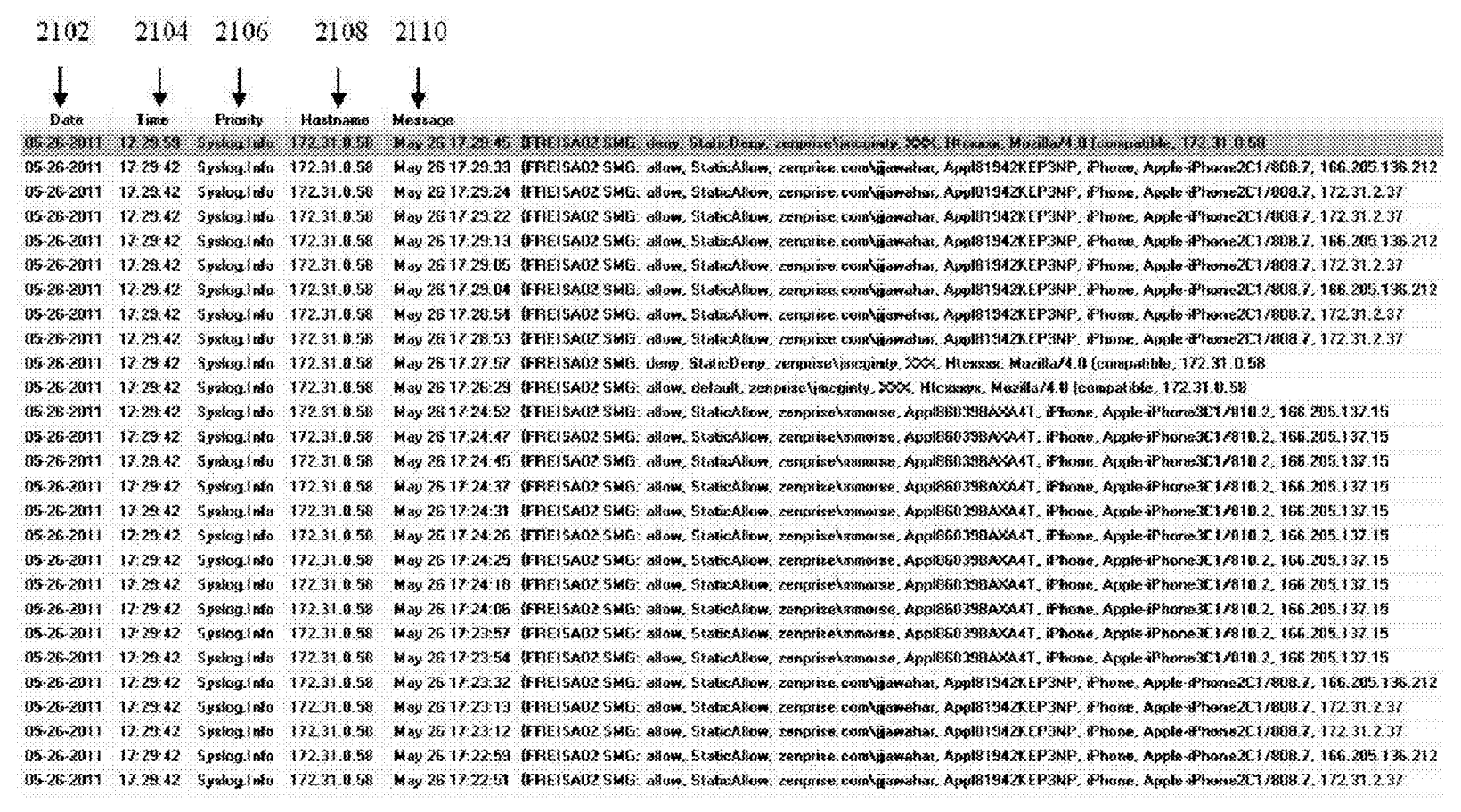

FIG. 21 shows an example of logged data that can be provided to an analytics service 414, in accordance with one embodiment. In this example, the logged data comprises a table of rows and columns. Each row corresponds to a mobile device access request 402. Columns 2102 and 2104 include data indicative of the date and time, respectively, at which the secure mobile gateway 128 logged the corresponding row of data. With regard to column 2106, "Priority," is a configurable Syslog setting that identifies the collector of messages and level. Priority is a configurable item that applies across all Syslog collection types. Column 2108, under the heading "Hostname," is the IP address of the host that provided the corresponding row of data. In the illustrated embodiment, the hostname 2108 is the IP address of the gateway 128. Column 2110, under the heading "Message," includes various information about a selected mobile device access request 402. The illustrated message data includes the date and time at which the request was received, the action (allow or deny) that the gateway 128 taken against the request, the user (in the first row, "jmcginty") associated with the request, the mobile device type, and the IP address that the mobile device used when submitting the access request.

Figure 22:
FIG. 22 shows an example of an interface for configuring criteria under which an analytics service sends alerts based on data logged by a mobile device gateway.

FIG. 22 shows an example of an interface of an analytics service 414, for configuring criteria under which the analytics service sends alerts based on data logged by the secure mobile gateway 128. The illustrated interface is part of a Splunk SIEM tool. The interface allows an administrator to input the conditions under which an alert will be sent ("Splunk Alert: Allow ActiveSync Users Alert"), the type of alert (email), content of the alert ("Include search results"), etc.

Authentication of Mobile Device Users

Enterprise networks typically authenticate their users at the onset of the users' computer transactions with enterprise resources. In existing systems, authentication commonly involves a login process of receiving a username and password from the user's client device, verifying that the username corresponds to an authorized user, and verifying that the password is the correct password for the username. While some enterprise resources 130 may be configured to consume username data for all transactions with mobile devices (e.g., to grant access based on user ID, user role 206 or other group membership, etc.), other resources 130 do not. For some types of enterprise resources 130, after authentication, the user is permitted to conduct at least some transactions with the resource 130 without providing login information. For a defined time period after the last transaction with the authenticated user, some enterprise resources 130 downstream of the enterprise's firewall(s) assume that new requests that use the authenticated IP address (i.e., the IP address of the device that sent the user's login information to the enterprise network) are from the authenticated user. Such enterprise resources generally do not request and confirm the user's login information for each transaction with the user's computing device.

While this approach is generally suitable for non-mobile client devices, it can present security risks specific to mobile devices. Mobile devices often change their IP addresses when in use. For instance, a mobile device connected to a cellular network while in a moving vehicle can switch between different cellular towers. Similarly, a mobile device can switch between different Wi-Fi networks. A mobile device can also switch between different IP addresses associated with a single cellular tower or Wi-Fi network. Hence, an enterprise resource 130 that determines the user associated with an inbound mobile device request by examining only the request's IP address risks conducting a transaction with a person who is not the user.

Figure 23:
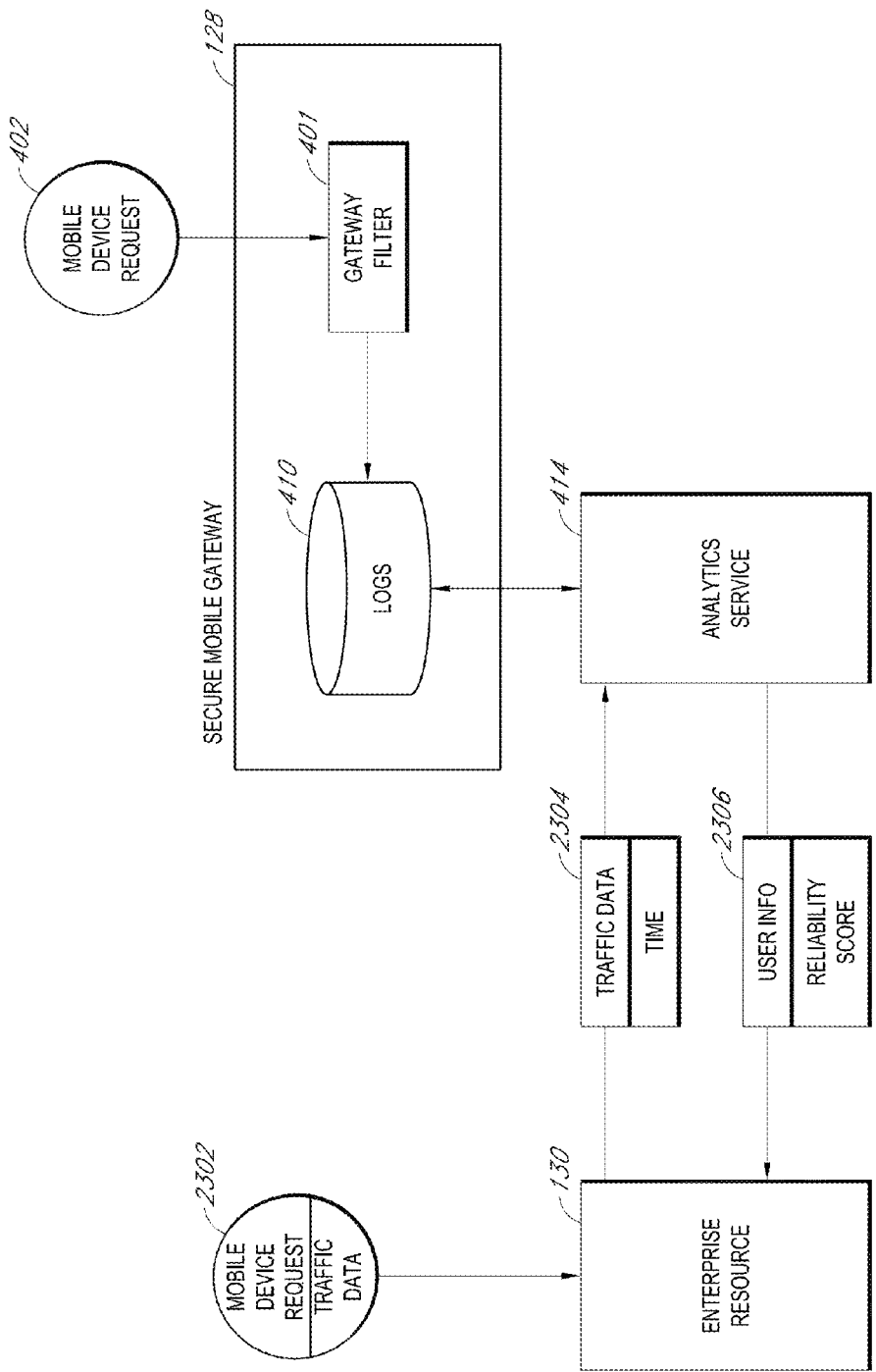
FIG. 23 illustrates an embodiment of a method by which an analytics or network intelligence service helps to authenticate a user associated with a mobile device access request.

FIG. 23 illustrates an embodiment of a method by which the analytics service 414 can leverage the secure mobile gateway 128 (FIG. 4) to assist in determining whether and/or how to respond to a mobile device's request 2302 for accessing or using an enterprise resource 130. For instance, the enterprise resource 130 can receive the mobile device request 2302 via a gateway different than the secure mobile gateway 128. The request 2302 could be received via an application tunnel. While the illustrated embodiment depicts a resource 130 that queries the analytics service 414 for a binding of user information (e.g., an ID number for a user 115) to mobile traffic data (e.g., IP address), components other than resources 130 (such as the tunneling mediator 224) can also be configured to do the same.

In the illustrated embodiment, the secure mobile gateway 128 includes a gateway filter 401 and a repository 410 of logged data, for example, as described above. The logged data can include data from mobile device access requests 402 received by the gateway filter 401, for example, as described above. For example, if the gateway 128 supports ActiveSync, the logged data can include the DeviceId, DeviceType, User, and/or UserAgent property values from an ActiveSync request 402, as well as the ActiveSync command issued by the request 402.

The request 2302 can include mobile traffic data, such as an IP address of a mobile device 120 that sent the request 2302. The request 2302 may or may not include data about the mobile device 120 that sent the request 2302. The enterprise resource 130 can receive the request 2302 and send a user determination request 2304 to the analytics service 414. The user determination request 2304 includes the mobile traffic data of the request 2302. The user determination request 2304 can additionally include the time at which the enterprise resource 130 received the request 2302, the data about the mobile device 120 that sent the request, as well as other data associated with the request 2302. In some embodiments, the user determination request 2304 can include an identification of a user 115 that the enterprise resource 130 or another enterprise component believes to be the sender of the request 2302, such that the analytics service 414 is essentially being asked to verify whether the identified user 115 is the actual person who sent the request 2302.

The analytics service 414 can employ a user determination algorithm for determining user information associated with the request 2302 received by the enterprise resource 130. In this context, user information can include a determination of whether the request 2302 was sent by a user 115 (as opposed to someone who is not associated or enrolled with the enterprise), a determination of whether a user 115 identified in the user determination request 2304 is the person who sent the request 2302 to the enterprise resource 130, and/or an identification (e.g., username) of a user 115 who sent the request

2302. The user determination algorithm can additionally determine a reliability score indicative of a confidence level in the computed binding—a degree of confidence that a particular user 115 is the actual person who sent the request 2302. The analytics service 414 can produce and send a response 2306 containing result(s) produced by the user determination algorithm. The results of the algorithm can comprise the user information and/or the reliability score.

In the embodiment illustrated in FIG. 23, the enterprise resource 130 receives the request 2302 and sends the user determination request 2304 to the analytics service 414, and the analytics service 414 sends the response 2306 back to the enterprise resource 130. In such embodiments, the enterprise resource 130 can be configured to use the data within the response 2306 to determine how to respond to the request 2302. For example, the enterprise can respond to the request 2302 by responding to the device 120 that sent the request 2302, ignoring the request 2302, sending an alert to an IT administrator, etc.). The enterprise resource 130 can be configured to make this determination at least partly based on the reliability score (if provided) and/or the specific action or command issued within the request 2302. For example, the enterprise resource 130 can be configured to require a relatively high reliability score if the request 2302 seeks to download sensitive or confidential enterprise data, while imposing a relatively low reliability score requirement if the request 2302 seeks to upload data to the resource 130. The enterprise resource 130 can be configured to allow an administrator to configure the reliability score threshold at which the resource 130 will take any given action in response to the request 2302.

In other embodiments, a component upstream of the enterprise resource 130 (e.g., a gateway, firewall, proxy server, DLP monitoring device, tunneling mediator, SSL traffic inspection device, or other components different than those of the secure mobile gateway 128) receives the request 2302, generates the user determination request 2304, and sends the user determination request 2304 to the analytics service 414, and the analytics service 414 sends the response 2306 to said component upstream of the enterprise resource 130. In these embodiments, the upstream component can be configured to use the data within the response 2306 to determine whether to pass the request 2302 along to the enterprise resource 130. Further, the upstream component can be configured to make this determination at least partly based on the reliability score and/or the action or command issued within the request 2302. For example, if the request 2302 seeks to download sensitive or confidential enterprise data, the upstream component can be configured to send the request 2302 to the enterprise resource 130 only if the reliability score exceeds a relatively high value. In another example, if the request 2302 seeks to upload data to the enterprise resource 130, the upstream component can be configured to require a relatively low reliability score for passing the request 2302 along to the resource 130. The upstream component can be configured to allow an administrator to configure the reliability score threshold at which the upstream component takes any given action in response to the request 2302.

In some embodiments, the analytics service 414 proactively sends out its computed bindings of user 115 to mobile traffic data (e.g., IP address) to the enterprise resources 130. The analytics service 414 can send the bindings directly to the resources 130, and/or to one or more components upstream of the resources 130, which append the bindings or related data to the mobile device communications that are transmitted to the resources 130. In these approaches, the resources 130 can use the computed bindings without requesting them from the analytics service 414.

The user determination algorithm employed by the analytics service 414 can include scanning some or all of the logged data for mobile traffic data (from the mobile device requests 402 received by the secure mobile gateway 128) that matches the mobile traffic data received within the user determination request 2304. For any requests 402 having mobile traffic data that matches that of the request 2302, the algorithm can also include determining, from the logged data 410, user data or mobile device data provided within the requests 402. For example, the user data and the mobile device data can respectively include the values of the User property and the DeviceID property of an ActiveSync request 402. The analytics service 414 can determine a user 115 corresponding to the user data and/or mobile device data by, e.g., requesting it from the mobile device management system 126. For instance, the User and DeviceID property values can correspond to a particular user 115 in the mobile device information 204. If the logged data does not include (or the analytics service 414 is unable to find) mobile traffic data that matches that of the request 2302, the analytics service 414 can determine that the request 2302 was not sent by a user 115.

In order to determine the user information and compute the reliability score, the user determination algorithm can evaluate a variety of factors. In certain embodiments, the user determination algorithm compares the time at which the request 2302 was received by the enterprise resource 130 to the time of receipt (by the secure mobile gateway 128) of mobile device access requests 402 having mobile traffic data matching that of the request 2302. For instance, suppose an ActiveSync request 402 has User and DeviceId property values corresponding to a particular user 115. Suppose further that the sender's IP address within the request 402 is the same as that of the request 2302, and that the request 402 was received by the secure mobile gateway 128 within a relatively narrow time period (before or after) from the time at which the enterprise resource 130 (or upstream component) received the request 2302. Under these circumstances, the analytics service 414 might compute a high reliability score indicating that the user 115 associated with the request 402 is the person who sent the request 2302 to the enterprise resource 130. The user determination algorithm can compute a lower reliability score as the time period between the receipt of the request 2302 and the receipt of the temporally closest request 402 having the same sender IP address increases. On the other hand, if the sender's IP address within the request 402 is different than that of the request 2302, the analytics service 414 might compute a relatively low reliability score and/or determine that the user 115 associated with the request 402 is likely not the person who sent the request 2302 to the enterprise resource 130. Further, if there were no requests 402 received by the gateway 128 within a predefined or dynamically computed time window from (before or after) the time of receipt of the request 2302 and which have the same sender IP address as the request 2302, then the analytics service 414 can compute a relatively low reliability score.

In certain embodiments, the user determination algorithm evaluates the frequency with which the enterprise network sees a particular user 115 associated with certain mobile traffic data, such as an IP address. For instance, suppose that the secure mobile gateway 128 has received numerous ActiveSync requests 402 that have User values corresponding to a particular user 115, within a relatively short time window containing the time at which the enterprise resource 130 received the request 2302. Suppose further that all of said ActiveSync requests 402 include sender IP addresses that are the same as that of the request 2302. Under these circumstances, the analytics service 414 might compute a very high reliability score indicating that the user 115 associated with the requests 402 is the person who sent the request 2302 to the enterprise resource 130. On the other hand, if the sender IP addresses within the requests 402 is/are different than that of the request 2302, the analytics service 414 might compute a very low reliability score and/or determine that the user 115 associated with the requests 402 is likely not the person who sent the request 2302 to the enterprise resource 130.

In certain embodiments, the user determination algorithm evaluates the extent to which different access requests 402 associated with a particular user 115 have different mobile traffic data. For instance, the fact that a string of access requests 402 from a particular user 115 have numerous different sender IP addresses likely indicates that the user 115 is on the move and constantly switching IP addresses while communicating with the enterprise system 110. Under these circumstances, the analytics service 414 might compute a relatively lower reliability score than if all of the access requests 402 from the particular user 115 had the same sender IP address as the request 2302. In one specific approach, the analytics service 414 determines a total number of access requests 402 that (1) have user data corresponding to a particular user 115 of interest, (2) have mobile traffic data that does not match the mobile traffic data received within the user determination request 2304, and (3) were received by the secure mobile gateway 128 within a predetermined or dynamically computed time window containing the time of receipt in the user determination request 2304. The analytics service 414 can reduce the computed reliability score (in a confidence level that the request 2302 was from the particular user 115) as the total number of determined access requests 402 increases.

In certain embodiments, the user determination algorithm takes into consideration whether the IP address of a request 2302 is from a known block or subnet of IP addresses that are registered or otherwise associated with the enterprise system 110. Such a block or subnet of IP addresses can be available via the enterprise's own equipment, primarily for use by enterprise personnel, such as a Wi-Fi network, an enterprise VPN allocation block, or roaming external IP addresses. A block or subnet of IP addresses can be registered with the secure mobile gateway 128. If a request 2302 is sent from an IP address associated with the enterprise, the algorithm can be configured to compute a higher reliability score.

It will be understood that the user determination algorithm for computing the reliability score can include factors in addition to those described above. It will also be understood that the algorithm need not consider all of the factors described above, and can use any sub-combination thereof.

In the embodiment illustrated in FIG. 23, the analytics service 414 is configured to inspect the logged data in the repository 410 of the secure mobile gateway 128 to establish bindings of users and/or mobile devices to mobile traffic data (e.g., IP address). However, an analytics service 414 can be configured to query multiple different logs of mobile request data to compute such bindings. If the enterprise system 110 has multiple different secure mobile gateways 128 (e.g., for different types or protocols of mobile device communications), the analytics service 414 can be configured to query logged data from each of the gateways 128.

The analytics service 414 can be configured to generate reports and displays of its bindings of user and mobile device to mobile traffic data (e.g., IP address). The enterprise system 110 can include a web-based or other type of user interface for viewing such bindings. For example, such information could be displayed via a user interface of the mobile device management system 126.

In preferred embodiments, various components of the enterprise system 110 can use the bindings of user and/or device to mobile traffic data produced by the analytics service 414 to track or log network usage events for one or more mobile devices 120. The analytics service 414 can be queriable and configured to share its information with other components via, e.g., web services.

As noted above, the analytics service 414 can be configured to generate and send notifications to users 115 or IT administrators based on the logged data. Additionally, the analytics service 414 can be configured to send such a notification at least partly based on one or more reliability scores computed according to the user determination algorithm. For example, if a large number of requests were denied, and if reliability scores associated therewith satisfy a defined threshold, then the analytics service 414 can be configured to send an appropriate alert. On the other hand, the analytics service 414 can be configured to ignore situations involving low reliability scores. If there are a large number of access denials, but they all have low reliability scores, it may not be worth generating and sending a notification.

For security purposes, the analytics service 414 can be configured to encrypt the user, device, and mobile traffic data bindings that the service 414 produces.

Secure Document Containers

Reference is made again to FIG. 3. In some embodiments, a mobile device 120 can include a secure document container 336, which can be referred to as a "container." As explained herein, the container 336 can help prevent the spread of enterprise information to different applications and components of the mobile device 120, as well as to other devices. The enterprise system 110 (which can be partially or entirely within the cloud 156) can transmit documents to the devices 120, which can be stored (e.g., by the enterprise agent 320) within the container 336. The container 336 can prevent unauthorized applications 318 and other components of the device 120 from accessing information within the container 336. For enterprises that allow users 115 to use their own mobile devices 120 for accessing, storing, and using enterprise data, providing containers 336 on the devices 120 helps to secure the enterprise data. For instance, providing containers 336 on the devices 120 can centralize enterprise data in one location on each device 120, and can facilitate selective or complete deletion of enterprise data from the device 120.

As used in this context, a "document" can comprise any computer-readable file including text, audio, video, and/or other types of information or media. A document can comprise any single one or combination of these media types.

The secure document container 336 can comprise an application that implements a file system 338 that stores documents and/or other types of files. The file system 338 can comprise a portion of a computer-readable memory of the mobile device 120. The file system 338 can be logically separated from other portions of the computer-readable memory of the mobile device 120. In this way, enterprise data can be stored in secure document container 336 and private data can be stored in a separate portion of the computer-readable memory of the mobile device 120. The container 336 can allow the enterprise agent 320, mobile device applications 318 and/or other components of the device 120 to read from, write to, and/or delete information from the file system 338 (if authorized to do so). Deleting data from the container 336 can include deleting actual data stored in the container 336, deleting pointers to data stored in the container 336, deleting encryption keys used to decrypt data stored in the container 336, and the like. The container 336 can be installed by, e.g., the agent 320, IT administrators of the enterprise system 110, or the device 120 manufacturer. The container 336 can enable some or all of the enterprise data stored in the file system 338 to be deleted without modifying private data stored on the mobile device 120 outside of the container 336. The file system 338 can facilitate selective or complete deletion of data from the file system 338. For example, a component of the enterprise system 110 can delete data from the file system 338 based on, e.g., encoded rules. In some embodiments, the agent 320 deletes the data from the file system 338, in response to receiving a deletion command from the enterprise system 110. In other embodiments, the data is deleted without the assistance of the agent 320, for example if an agent 320 is not provided.

The secure document container 336 can comprise an access manager 340 that governs access to the file system 338 by applications 318 and other components of the mobile device 120. Access to the file system 338 can be governed based on document access policies (e.g., encoded rules) stored in the documents and/or the file system 338. A document access policy can limit access to the file system 338 based on (1) which application 318 or other component of the device 120 is requesting access, (2) which documents are being requested, (3) time or date, (4) geographical position of the device 120, (5) whether the requesting application 318 or other component provides a correct certificate or credentials, (6) whether the user of the device 120 provides correct credentials, (7) other conditions, or any combination thereof. A user's credentials can comprise, for example, a password, one or more answers to security questions (e.g., What is the mascot of your high school?), biometric information (e.g., fingerprint scan, eye-scan, etc.), and the like. Hence, by using the access manager 340, the container 336 can be configured to be accessed only by applications 318 that are authorized to access the container 336. As one example, the access manager 340 can enable enterprise applications installed on the mobile device 120 to access data stored in the container 336 and to prevent non-enterprise applications from accessing the data stored in the container 336.

Temporal and geographic restrictions on document access may be useful. For example, an enterprise administrator may deploy a document access policy that restricts the availability of the documents (stored within the container 336) to a specified time window and/or a geographic zone (e.g., as determined by a GPS chip 316) within which the device 120 must reside in order to access the documents. Further, the document access policy can instruct the container 336 or agent 320 to delete the documents from the container 336 or otherwise make them unavailable when the specified time period expires or if the mobile device 120 is taken outside of the defined geographic zone.

Some documents can have access policies that forbid the document from being saved within the secure document container 336. In such embodiments, the document can be available for viewing on the mobile device 120 only when the user 115 is logged in to the enterprise system 110.

The access manager 340 can also be configured to enforce certain modes of connectivity between remote devices (e.g., an enterprise resource 130 or other enterprise server) and the container 336. For example, the access manager 340 can require that documents received by the container 336 from a remote device and/or sent from the container 336 to the remote device be transmitted through application tunnels, for example, as described above. Such application tunnels can use the tunneling mediator 224 of the enterprise system 110. The access manager 340 can require that all documents transmitted to and from the container 336 be encrypted. The enterprise agent 320 or access manager 340 can be configured to encrypt documents sent from the container 336 and decrypt documents sent to the container 336. Documents in the container 336 can also be stored in an encrypted form.

The secure document container 336 can be configured to prevent documents or data included within documents from being used by unauthorized applications or components of the mobile device 120 or other devices. For instance, a mobile device application 318 having authorization to access documents from the container 336 can be programmed to prevent a user from copying a document's data and pasting it into another file or application interface, or locally saving the document or document data as a new file outside of the container 336. Similarly, the container 336 can include a document viewer and/or editor that does not permit such copy/paste and local save operations. Moreover, the access manager 340 can be configured to prevent such copy/past and local save operations. Further, the container 336 and applications 318 programmed and authorized to access documents from the container 336 can be configured to prevent users from attaching such documents to emails or other forms of communication.

A mobile device application 318 can be programmed to lookup and find the secure document container 336 (or a secure web browser 332, described below, that includes the container 336) as a resource of the mobile device 120. In certain embodiments, the application 318 can run in a secure virtual machine separate from a virtual machine of an operating system of the mobile device 120. According to some other embodiments, the application can run within the secure web browser 332. An application 318 can be programmed to write enterprise-related data only into the container 336. For instance, the application's 318 source code can be provided with the resource name of the container 336. Similarly, a remote application (e.g., an enterprise resource 130) can be configured to send data or documents only to the containers 336 of one or more mobile devices 120 (as opposed to other components or memory locations of the devices 120). Storing data to the container 336 can occur automatically, for example, under control of the application 318, the enterprise agent 320, or the web browser 332. An application 318 can be programmed to encrypt or decrypt documents stored or to be stored within the container 336. In certain embodiments, the container 336 can only be used by applications (on the device 120 or remote) that are programmed to look for and use the container 336, and which have authorization to do so.

The secure document container 336 can serve as a temporary repository for documents and other files sent to the mobile device 120. Remote applications can be configured to send documents to the container 336 (e.g., via application tunnels) on a one-time or periodic basis. For example, a sales-related enterprise resource 130 can be programmed to send sales-related documents (e.g., most recent price sheets) every morning to the containers 336 of a team of users 115 having sales-related roles 206 (e.g., sales persons). The sales-related documents can have document access policies such that the documents will "self-destruct" (e.g., be automatically deleted from the container 336—the deletion being performed by, e.g., the container 336 itself or the enterprise agent 320) at a certain time or at the expiration of a time period beginning at a defined event (e.g., the user's opening of a document). Document distribution policies (e.g., encoded rules) can be provided (e.g., within the mobile device management system 126) to control when and how remote applications (e.g., enterprise resources 130) send documents to the containers 336, to which users 115 the documents are sent, what restrictions (e.g., temporal or geographic restrictions)

are placed on the use and availability of the documents (e.g., in the form of document access policies as described above), etc.

Remote applications that send documents to one or more secure document containers 336 of mobile devices 120 can be configured to integrate with other repositories, for the purpose of sending documents from such repositories to the containers 336. Such other repositories can be stored, for example, within the enterprise system 110 (e.g., enterprise document repositories such as a Microsoft Sharepoint™ repository) or in a cloud-computing system (e.g., a Box-.Net™ repository).

Software Development Kit for Mobile Device Applications

Figure 24:
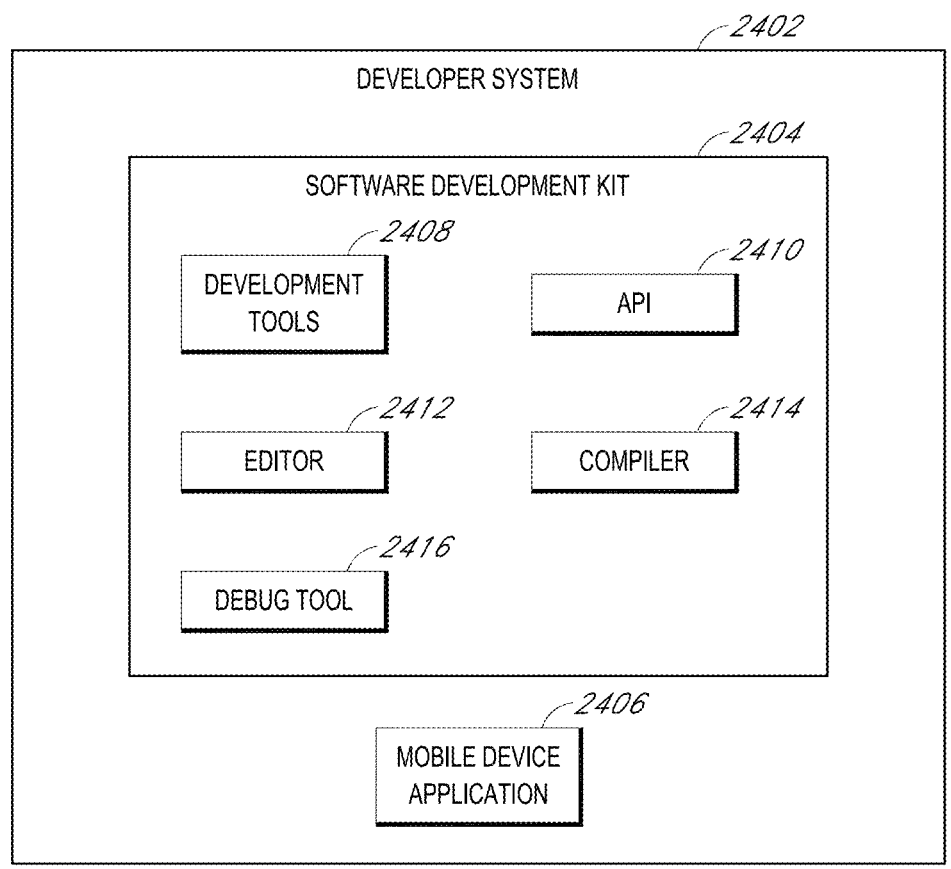
FIG. 24 illustrates an embodiment of a software development kit for embedding, e.g., enterprise-protective functionalities into a mobile device software application.

Another aspect of certain embodiments involves a software development kit (SDK) that enables an application developer to embed one or more of the functionalities described herein into a mobile device software application, such as a software application 318. As used herein, "embed" can include the modification of an application's source code. FIG. 24 illustrates an embodiment of a software development system 2402 including an SDK 2404 for creating a mobile device application 2406. The software development system 2402 can be implemented by any suitable computer hardware. A software developer can create an application 2406 such as by generating program code and compiling it into an executable program compatible with a mobile device 120.

The SDK 2404 can comprise a library of development tools 2408 providing different functionalities. The development tools 2408 can comprise code snippets, data structures, protocols, routines, and the like. The SDK 2404 can provide an application programming interface (API) 2410 that enables an application 2406 to interface with the development tools 2408. The SDK 2404 can include a program editor 2412 for generating the code for an application 2406, and a compiler 2414 for converting the code into a machine-readable format. The SDK 2404 can include a debugging tool 2416 for debugging developed code. It will be appreciated that the SDK 2404 can include other features in addition to these. It will also be appreciated that the SDK 2404 need not include all of the illustrated features.

The development tools 2408 can include tools for embedding one or more of the functionalities described herein into a mobile device software application 2406. It will be appreciated that any sub-combination of these functionalities can be embedded into the application 2406, and that other functionalities not described herein can also be so embedded. Different development tools 2408 are now described.

In certain embodiments, the SDK 2404 includes a development tool 2408 that allows an application developer to embed, within an application 2406, functionality for forming and maintaining an application tunnel (for example, as described above) with a network resource, and communicating with the network resource by sending and receiving communications through the tunnel. The network resource can comprise, for example, an enterprise resource 130. The tool 2408 can be configured to add application tunnel functionality that participates with an enterprise agent 320. As described above in the application tunnels section, the enterprise agent 320 can receive network communications from the application 2406, encapsulate them according to an encapsulation protocol, send the encapsulated communications to a tunneling mediator, receive similar communications from the tunneling mediator (which came from a tunnel endpoint resource), unpack encapsulated communications received from the tunneling mediator, and send the unpacked communications to the application 2406. Alternatively, the tool 2408 can provide functionality for forming an application tunnel without the participation of the enterprise agent 320, wherein the application 2406 itself performs these actions using an encapsulation protocol as described above.

In certain embodiments, the SDK 2404 includes a development tool 2408 that allows an application developer to embed, within an application 2406, functionality for improving the communication experience between a mobile device 120 and a network resource, such as an enterprise resource 130, particularly for application tunnel communications. Such functionality can include caching user-inputted data locally on the mobile device 120 in the event of a lost connection to a network, as described above. Such functionality can likewise include compression of data to be sent to a network resource, and decompression of data received from the network resource, as described above. Again, such embedded functionality can participate with an enterprise agent 320 to enable these features, or can provide these features separate from an enterprise agent 320.

In certain embodiments, the SDK 2404 includes a development tool 2408 that allows an application developer to embed, within an application 2406, functionality for participating in a remote control session between a mobile device 120 and a helpdesk operator, as described above. Such functionality can allow a helpdesk operator to view data about the application 2406 installed on the mobile device 120, and/or to control aspects of the application 2406 and possibly other features of the mobile device 120. Such functionality can include sending user interface emulation data to the helpdesk operator's computer, as described above. Such functionality can include receiving commands from the helpdesk operator for executing actions on the mobile device 120. Again, such embedded functionality can participate with an enterprise agent 320 to enable these features, or can provide these features separate from an enterprise agent 320.

In certain embodiments, the SDK 2404 includes a development tool 2408 that allows an application developer to embed, within an application 2406, functionality for finding, providing credentials to, reading from, and/or writing to a secure document container 336 as described above. This can allow the application 2406 to access and update information within the container 336. This can also allow the application 2406 to access documents securely received by the mobile device 120 from a network resource, such as an enterprise resource 130 or other application or component of an enterprise system 110. The development tool 2408 can be configured to modify the source code of an application 2406 so that the application 2406 can find the container 336 by its resource name on the device 120. The development tool 2408 can be configured to modify the source code of an application 2406 so that the application 2406 writes all data (or perhaps just data relating to the enterprise 110) into the container. For example, the development tool 2408 can be configured to parse the application's source code to find commands for writing data to a memory (e.g., application state data for allowing the user to stop using the application and than later restart the application in the exact state in which the user left it) or reading data from the memory, and to adjust one or more of those portions of the source code to write data into the container 336 and read data from the container 336.

In some embodiments, the SDK's development tool 2408 can embed within the application 2406 the ability to encrypt documents to be stored within the container 336, and/or the ability to decrypt documents obtained from the container 336. The development tool 2408 can embed within the application 2406 an editor for allowing a user 115 of a mobile device 120 to view and/or edit documents obtained from the container 336. The editor can also allow the user 115 to upload edited or newly created documents to the container 336 or to a network resource (e.g., an enterprise resource 130 of the enterprise system 110).

In certain embodiments, the SDK 2404 includes a development tool 2408 that allows an application developer to embed, within an application 2406, mobile device rules such as the rules 214 described above. Further, the development tool 2408 can allow the developer to embed functionality for evaluating the mobile device rules, including querying the device 120 or other network resources for data needed for the evaluation. The embedded functionality can also include remedial actions associated with the mobile device rules, such as the remedial actions 216 described above. The embedded functionality can further include a remedy agent for automatically executing remedial actions on the mobile device, as described above. Compared to the aforementioned mobile device rules 218 (which are described above predominantly as user-specific and device-specific rules), a software developer can embed rules and remedial actions that are customized to a specific application 2406. In certain embodiments, the SDK 2404 includes tools for creating and editing mobile device rules and remedial actions, such as the tools 221 described above. A software developer can use the creating/editing tools to create mobile device rules and remedial actions, and to embed them into an application 2406. Certain embodiments provide an online library of mobile device rules and remedial actions that a software developer can use, with or without modification, and embed within an application 2406.

In certain embodiments, the SDK 2404 includes a development tool 2408 that allows an application developer to embed, within an application 2406, functionality for application fault detection (e.g., using mobile device rules as described above), application performance measurement, and the detection of related events. The embedded functionality can include the logging of detected faults, performance measurements, related events, event times, event locations, and other data within a local storage of a mobile device 120. The development tool 2408 can allow an application 2406 to be configured to report such data to a network resource, such as a component of an enterprise system 110, and/or an analytics service such as the analytics service 414 described above. This embedded functionality can give IT administrators visibility into what is happening on the mobile device, at least as it pertains to the specific application 2406 installed thereon. Further, an analytics service can analyze data across multiple different mobile devices 120 that run the specific application 2406. The embedded functionality can include encrypting the data logged on the mobile device 120 and/or reported to other components via network communications.

In certain embodiments, the SDK 2404 includes a development tool 2408 that allows an application developer to embed, within an application 2406, functionality for cooperating with a meta-application, such as an enterprise system-based meta-application portion 150 and/or a cloud-based meta-application portion 151. The embedded functionality can include discovery procedures for discovering information about the installed application 2406 or a mobile device 120 on which it is installed, and sending the discovered information to the meta-application for use in, e.g., constructing a queriable model (similar to the enterprise model 814 of FIG. 8) of which the application 2306 and/or mobile device 120 forms at least a part. The embedded functionality can include receiving a query from the meta-application, responding to the query by retrieving the queried data from the mobile device 120, and sending the queried data to the meta-application. As discussed above, the meta-application can use the queried data to detect problems, perform root cause analysis, and/or select remedial actions. Hence, the embedded functionality can include receiving a remedial action from the meta-application, executing the remedial action on the mobile device 120, and reporting results of executing the remedial action to the meta-application. In some embodiments, the embedded functionality participates with a device-resident enterprise agent 320 to provide these features, while in other embodiments the embedded functionality provides these features without cooperating with an enterprise agent 320.

Secure Web Browser

Another aspect of certain embodiments involves a web browser within which other mobile device software applications can run. The web browser can be provided with some or all of the enterprise security and other features described herein, and can extend those features for use with the mobile device applications that run within the browser. In this way, the browser can be used to implement BYOD policies while maintaining a desired level of control over applications running on a mobile device 120 of an enterprise user 115. An enterprise can require some or all of its users 115 to install and use this web browser, to reduce enterprise security risks associated with the use of such mobile device applications. Further, in some circumstances, such a web browser can make it unnecessary for application developers to develop different versions of a mobile device application for different mobile device platforms. As mentioned above, the secure browser can also be used to enable mobile device users to access a corporate intranet without the need for a virtual private network (VPN).

Referring to FIG. 3, a mobile device 120 can include a specialized web browser 332. The web browser 332 can be configured to perform the functions of conventional web browsers, including surfing Internet sites, displaying and/or playing multimedia content received from web servers, etc. The web browser 332 can store data accessed via a network in a secure document container 336 and/or in a secure browser cache. Such data can be deleted at the direction of an enterprise. For instance, a mobile device management system 126 can initiate deletion or otherwise make data stored in the secure document container 336 and/or the secure browser cache inaccessible. Additionally, the web browser 332 is preferably configured to act as a container for at least some other software applications 318 installed on the mobile device 120, to allow those applications 318 to run within the browser 332. A software application 318 can be configured to launch the browser 332 when the application 318 is itself launched by a user 115. Moreover, an application 318 can be configured to launch the browser 332 and run within the browser 332 in a manner that is transparent to the user 115. In other words, the user 115 can be given the impression that the application 318 is running conventionally, without involving the web browser 332. The web browser 332 can leverage a protocol that facilitates its usage as a container for other software applications 318. For example, the web browser 332 can leverage HTML5 for this purpose.

The web browser 332 can provide some or all of the functionalities described herein. For example, the web browser 332 can include some or all of the functionalities provided by the SDK 2404 and/or enterprise agent 320 described above. Thus, the web browser 332 can be configured to use application tunnels for communications with network resources (such as enterprise resources 130). The web browser 332 can receive (or have embedded) mobile device rules 214 and remedial actions 216 from the mobile device management system 126 or another component of an enterprise system 110. The web browser 332 can alternatively have embedded mobile device rules and remedial actions. The web browser 332 can employ caching and/or compression methods within application tunnels, to improve the user's communication experience as described above. The web browser 332 can be configured to provide credentials to, read from, write to, and/or provide an editor for displaying and editing documents obtained from a secure document container 336 of the mobile device 120, as described above. In certain embodiments, the web browser 332 can implement the secure document container 336. The web browser 332 can prompt a user 115 to supply access credentials prior and verify the access credentials prior to exposing functionality of an application 318 running within the browser 332 to the user 115. Alternatively or additionally, the web browser 332 can cause data stored to the mobile device 120 by an application 318 running in the web browser 332 to be encrypted. The web browser 332 can be configured to participate in a remote control session with a helpdesk operator, as described above. The web browser 332 can be configured to log fault detections, performance measurements, related events, event times, event locations, and other data, and to provide such data to an analytics service as described above in connection with the SDK 2404. The web browser 332 can be configured to engage in communications with a meta-application, again as described above. By providing at least some of these and/or other functionalities, the web browser 332 can make it unnecessary for mobile device application developers to embed such functions within the mobile device applications 318.

In some embodiments, the web browser 332 is configurable so that one or more of these functionalities can be activated or deactivated under defined conditions that can be configured, e.g., remotely by a remote computer system such as the enterprise system 110. Definable conditions include temporal conditions, location conditions, mobile device properties, user properties (e.g., roles 206), and others. A temporal condition can be the time of day. For example, the web browser 332 can be configured to force all mobile traffic (at least for applications 318 configured to launch the browser 332) through application tunnels only during working hours (e.g., 8 am to 5 pm on Monday through Friday), and to send the traffic conventionally outside of those hours. A location condition can be the location of the mobile device 120. For example, the browser 332 can be configured to activate the aforementioned compression and caching features when the device 120 is in a geographical area known to have bad wireless connectivity.

Different web browsers 332 can be created for different mobile device platforms, with each of the browser versions using a single standard for running mobile device applications. This can advantageously allow mobile device application developers to develop mobile device applications 318 in just one programming language, as opposed to creating different versions for the various mobile device platforms. This can substantially reduce the application development workload for developers.

An enterprise can require its users 115 to install the web browser 332 onto their mobile devices 120, and can prohibit the use of other web browsers. The required browser 332 can be configured to direct at least some of the mobile device traffic through application tunnels to an enterprise-controlled tunneling mediator, such as the mediator 224 described above. This gives the enterprise greater control over the traffic, reducing security risks. An enterprise can deploy a mobile device rule 214 that enables a device-resident enterprise agent 320 or the web browser 332 itself to detect the installation and/or use of a prohibited web browser on the mobile device 120. An associated remedial action 216 can prevent the usage of the prohibited web browser according to methods described above, such as by uninstalling it, preventing it from running, etc.

In some embodiments, the secure web browser 332 can be configured to direct some or all web surfing requests to a content-filtering server as described above.

Modifying Behaviors of Pre-existing Mobile Applications

A system and process will now be described for enabling non-developers, such as members of a company's IT department, to add to or otherwise modify the behaviors of an existing mobile application, such as an Android, IOS, or Windows Mobile application. The system and process can be used, as one example, to create different versions of a mobile application (with different privileges, access rights, etc.) based on a user's role within the enterprise. For instance, different versions of the mobile application can be created for different job categories (e.g., executive, non-executive employee, intern, etc.) and/or different departments (sales, IT, human resources, etc.). The processes described in this section can be implemented in an application modification or "wrapping" tool or utility that is made available to enterprises that use the disclosed system. This utility may, for example, be hosted on a server (e.g., as a web service) that is accessible to enterprises, or may be provided to the enterprises (e.g., as a PC application).

In a typical use case scenario, the mobile application to be modified is a custom application developed for a particular enterprise. However, this need not be the case. For example, the disclosed system and process are also applicable to commercially available mobile applications available in app stores. The mobile applications can be modified without being specially written to support or enable such modifications. For example, the developer need not include any special code or functionality in the application to enable or facilitate the modifications, and need not be involved in the disclosed process of modifying the application.

The behaviors that are modified typically include or consist of behaviors that involve standard API calls or classes. The following are examples of some of the types of behaviors that can be added or modified via the disclosed process:

1. The cut-and-paste capability commonly provided through mobile device operating systems, such as Android and IOS, can be disabled within a particular mobile application, such as an application that provides access to confidential corporate data. This behavioral change may be desirable to inhibit employees (or a certain class of employees) from accidentally or maliciously sending or moving confidential data to an unauthorized location.

2. A mobile application that stores its output in a non-encrypted format can be modified to store its output in an encrypted format. In one embodiment, this is accomplished in-part by modifying the mobile application's input/output references to cause the application to use an encryption library to encrypt and decrypt the data it write to or reads from memory. Code may also be injected that causes the mobile application to obtain a key from the enterprise agent for use in encrypting and decrypting the data.

3. A mobile application that uses a certain level or type of encryption can be modified to use a different level or type of encryption. For example, if the Federal Government requires the enterprise to begin using a particular encryption library, an existing mobile application can be modified to effectively replace the existing encryption library with the new one.

4. An enterprise can modify a mobile application to cause it to use a special secure connection to the enterprise's network or enterprise system. For example, the mobile application can be configured to use a secure application tunnel as described above.

5. A mobile application can be modified to add a log-in or other authentication prompt or screen.

6. A mobile application can be configured to log and/or report data regarding its usage. This data may include, for example, the time and duration of use, the location (based, e.g., on GPS coordinates) of use, the application features invoked, the access points accessed, etc. (Existing mobile device operating systems such as Android and IOS provide functionality for enabling applications to obtain these and other types of usage parameters). This usage data may be used by an enterprise to, for example, monitor employee compliance with the enterprise's usage restriction policies, to identify and correct problems with particular enterprise mobile applications, or to determine whether to continue paying for application licenses for particular users. The application usage data collected on a mobile device 120 may, for example, be reported by the enterprise agent 320 to the mobile device management system 126, or some other system, for analysis.

7. A mobile application can be modified to enable an enterprise to remotely initiate deletion of the application's data on a particular mobile device 120 of a particular employee, without affecting other users of the application. As mentioned above, such selective wipe operations may also be executed when, for example, a user fails to enter a valid enterprise passcode a threshold number of times.

8. A mobile application can be modified such that it can only be launched in by a secure launcher 350B (FIG. 3B), and not by the general launcher of the mobile device's operating system. This may be accomplished by, for example, changing one or more references in the mobile application to the mobile operating system's general launcher so that they point instead to the secure launcher. As explained above, the secure launcher may implement one or more security policies, such as requiring entry of a valid passcode before the enterprise application is launched. The secure launcher may also cause the enterprise applications to run in a secure execution environment, such as by causing the enterprise applications to be executed using a secure virtual machine (FIG. 3B) that is separate from the mobile operating system's virtual machine. (See section below.)

9. A mobile application can be modified to cause it to launch in a secure virtual machine 350C (FIG. 3B). This may be accomplished by, for example, modifying a reference in the application (e.g., in an Android application's manifest or in any manner in which the application is launched) to cause it to be launched in a secure VM. As explained below in the section titled Secure Virtual Machine, the secure VM may implement some of the client-side security functions described herein (encryption, application tunnels, etc.), reducing or eliminating the need to add such functions to the mobile applications themselves. This can enable enterprise applications to be run in a secure execution environment, while personal applications are run in a default VM.

Other examples include disabling offline access, adding URL filtering, adding API filtering, disabling writes to local storage, and preventing documents from being opened in new applications.

Figure 29:
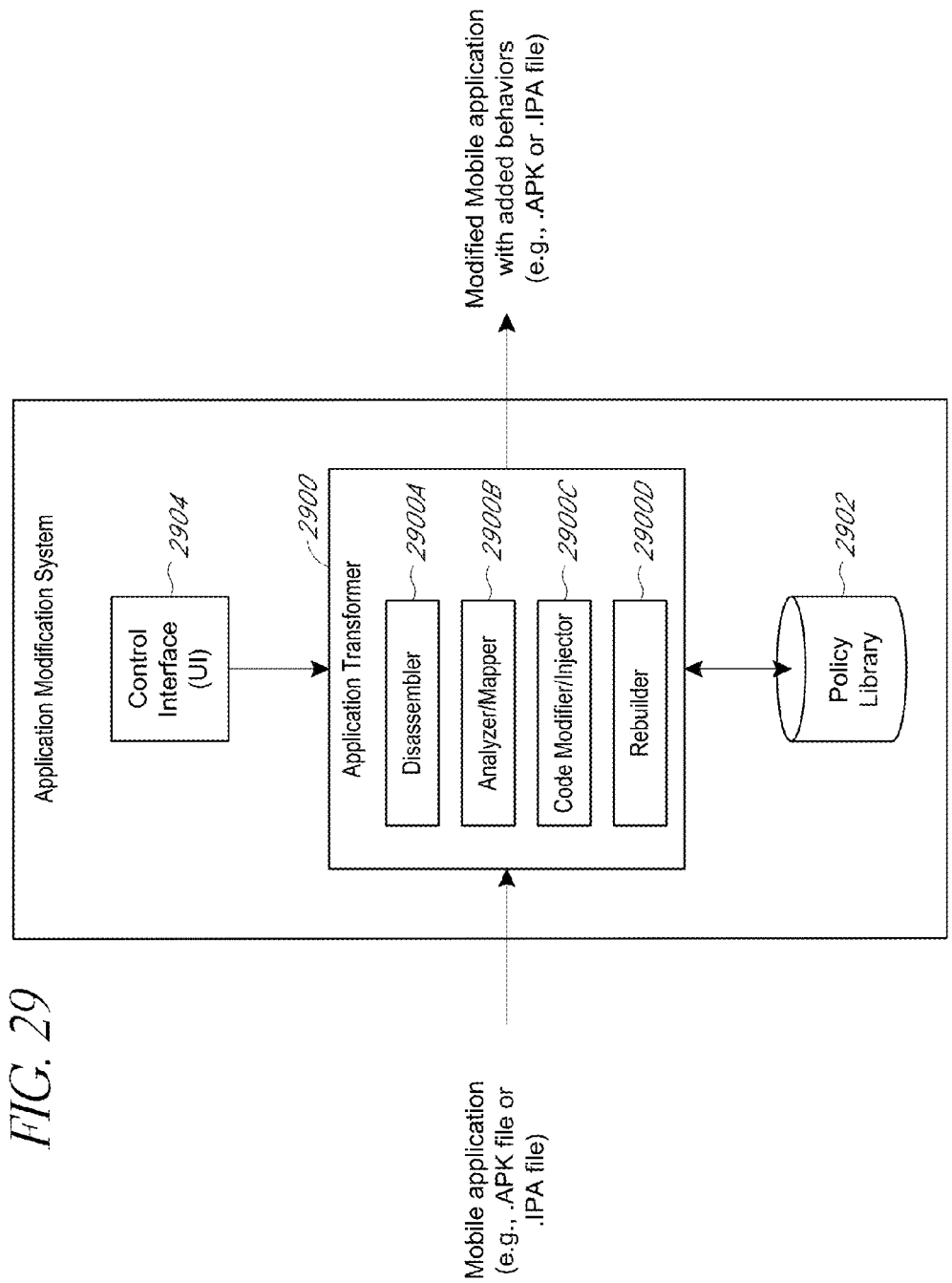
FIG. 29 illustrates an application modification system that enables a mobile application's behaviors to be modified without the need for the application's source code, and without the need for a programmer or programming skills.

FIG. 29 illustrates one embodiment of the application modification system. The system includes an application transformer 2900 that makes the modifications based on operator-selected policies. For Android applications, the transformer 2900 receives the application's .APK (application package) file, and outputs a new .APK file representing the modified application. For IOS, the transformer 2900 receives a .IPA (iPhone application archive) file, and outputs a new .IPA file representing the modified application. Various other file formats and mobile device operating systems may be supported. As shown in FIG. 29, the application transformer 2900 preferably includes a disassembler 2900A (for disassembling the application's executable code), a code analyzer/mapper 2900B, a code modifier/injector 2900C, and an application rebuilder 2900D.

As shown in FIG. 29, the transformer 2900 accesses a policy library 2902 containing policy descriptions for various policies and associated behaviors, such as those listed above. For example, a "disable cut-and-paste" policy may be provided. The policies may be described in any appropriate language and format. For example, the policy descriptions may be stored as smali files. As further shown in FIG. 29, the system also includes a control interface 2904 or "console" that enables an administrator to select the policy or policies to be applied to a given mobile application. The console 2904 may also include a tool for enabling administrators to define new policies. For example, a new policy could be defined that adds an authentication sequence, disables cut-and-paste, and causes all files to be stored in encrypted form. This policy could then be used as a basis for modifying multiple mobile applications.

In a typical use case scenario, a member of a company's IT department uses the control interface 2904 to: select a mobile application to be modified, select the policy or policies to be applied, and initiate the transformation process. The modified application is then distributed to the relevant employees or other users (e.g., through a special application store that is accessible through the enterprise agent, as described above). This process may be repeated with different policy selections to create different versions of the application for different users. The policy library 2902 may, for example, include policy files for implementing some or all of the types of policies described above (and various others).

Figure 30:
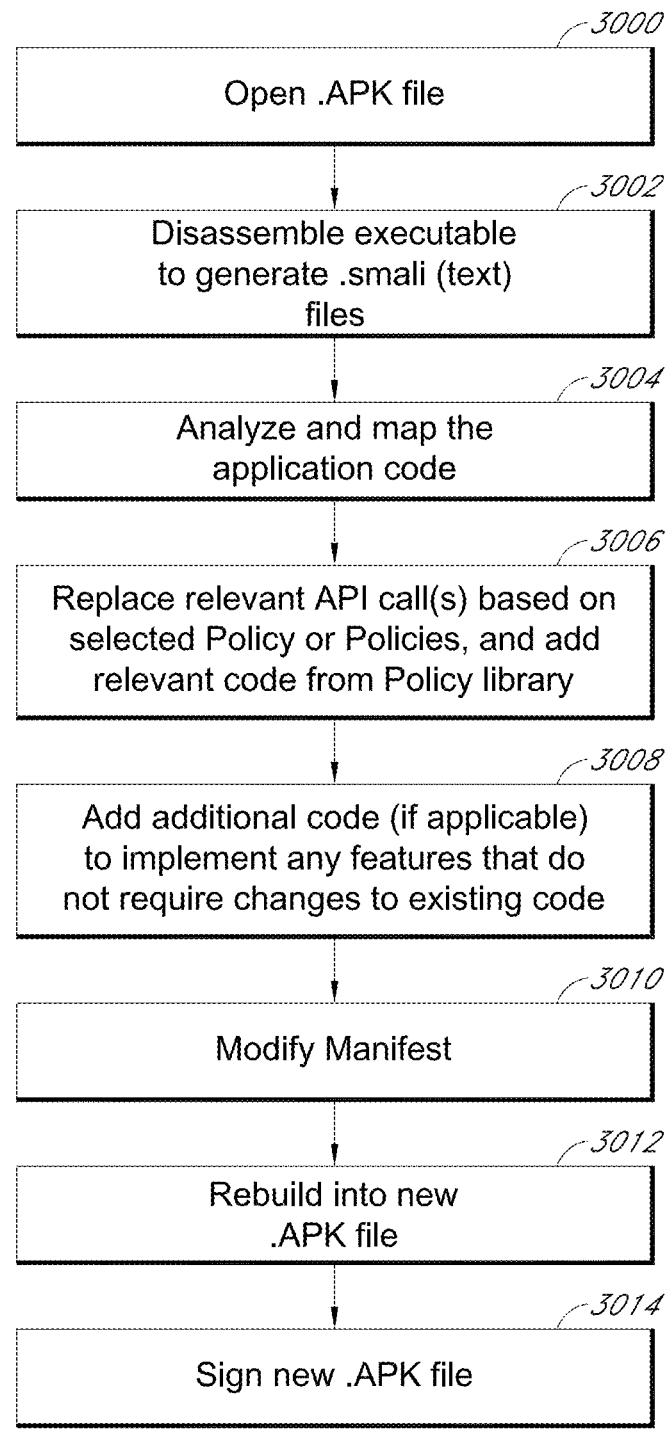
FIG. 30 illustrates one embodiment of a process that may be used by the system of FIG. 29 to modify a mobile application.

FIG. 30 illustrates a sequence of steps that may be performed by transformer 2900 to modify an Android application based on a selected set of one or more policies. A similar process may be used to transform applications written for other operating systems, such as IOS and Windows Mobile. The entire process shown in FIG. 30 is preferably fully automated, meaning that no human intervention is required. In block 3000, the .APK file is opened. As in known in the art, this file contains various application components, such as the application's executable code, images, XML files, a manifest, and other resources. In block 3002, the disassembler 2900A disassembles the application's executable code to generate one or more textual smali files. As will be recognized, an intermediate language other than smali can be used to implement the disclosed modification tasks.

In block 3004, the analyzer/mapper 2900B analyzes and maps the application code (in smali format) to generate information regarding API calls that will potentially be replaced. In block 3006, the relevant API calls are replaced with new API calls for implementing the selected policy or policies. In addition, the associated code from the policy library 2902 is added. For example, if the cut-and-paste functionality is being disabled, any API calls that are used by the application to access the operating system's cut-and-paste functionality may be removed or replaced.

As one example, a new version of the Java I/O File Input Stream (Java.io.FileInputStream) class may be generated, and all references to the original class may be modified to point to this new version. The new version may, for example, include code for encrypting and decrypting data on file write and read operations, respectively.

In block 3008 of FIG. 30, additional code may be added, if applicable, to implement one or more features or behaviors that do not require the replacement of any existing API calls. As one example, code may be added for enabling an authorized administrator to remotely trigger the deletion, on a user-specific or mobile device specific basis, of the application's data stored on a particular mobile device. In this example, the code added in block 3008 would add functionality for receiving and processing a message containing a command to perform such a selective wipe or deletion operation.

To provide an additional layer of security, the portions of the code that are modified in the preceding blocks may be obfuscated using obfuscation methods and functions that are known in the art. The use of obfuscation impairs the ability of others to reverse engineer the security functions added to the application. Obfuscation may be applied to the disassembled code (e.g., smali code), or may be applied at a different level.

In block 3010 of FIG. 30, the application's manifest (e.g., AndroidManifest.xml) is modified, if necessary, to reflect the modified behaviors. As one example, if the application is being modified to be launched in a secure shell, the manifest would be modified to instruct the Android operating system to use the secure shell to launch the application. In some embodiments, this involves replacing a reference to the operating system's general launcher with a reference to a secure launcher 350B (FIG. 3B). In block 3012, the modified smali code and manifest, together with the other extracted application components, are compiled into a new .APK file. In block 3014, this new .APK file is signed using a digital certificate.

Mobile applications written for the IOS operating system may be modified in a similar manner. Typically, such an application is distributed as an IPA file that includes an executable in Mach-O format, a P-list, and resources. Once the executable has been disassembled to produce ARM assembly code, it is mapped to identify classes to potentially be replaced, and is then modified by: (1) identifying one or more specific classes to be replaced, (2) adding/modifying the code to replace such class(es), (3) adjusting the class structure to reflect the modifications, so that each new class is a subclass of the original code, and (4) updating the references to point to the new class or classes.

In some embodiments, the above-described process may be augmented with one or more tests for verifying that the mobile application to be modified does not contain malware, or does not otherwise present a risk to enterprise security. One such test involves generating a hash of some or all of the application files, and then comparing this hash to library of hashes that are associated with known malware. If a match is found (indicating that the application likely includes malware), the application modification process may be terminated.

Another such test involves inspecting the API calls and URL requests made by the application to check for suspicious activity. Examples of suspicious activity include reading the personal contacts stored on the device, sending an email to a cloud storage service, and sending location information without first requesting user permission. Based on this analysis, a score (e.g., on a scale of 1 to 100) may be generated that represents the level of risk posed by the mobile application. The modification process may be terminated if this score exceeds a threshold. The score may additionally or alternatively be included in a report that details the suspicious activity detected. The application modification tool may, for example, output this report for review, and may prompt the administrator-user to confirm or indicate whether the modification process should proceed.

The application modification system shown in FIG. 29 may, for example, be implemented on a server, personal computer, workstation, or other computer or system of computers within a company's enterprise system. Alternatively, the application modification system may be implemented as a hosted service that is accessible to corporate customers over the Internet. The various components 2900-2904 of the system may be implemented as code modules that are stored on any type(s) of non-transitory computer storage device or system.

The components 2900, 2902, 2904 of the system shown in FIG. 29 may be provided to companies as part of a larger system (such as the system described in other sections of this specification) for enabling the companies to manage mobile devices and to protect data accessed by such devices. For example, these components may be bundled and licensed with various other components described in this disclosure. Alternatively, the application modification system of FIG. 29 may be provided to companies as a standalone product, or as a system that is hosted by a service provider and accessed over a network.

Secure Virtual Machine

As mentioned above, one approach for effectively adding a security layer to the enterprise mobile applications is to configure or force such applications to run within a secure VM 350C (FIG. 3B) installed on the mobile device. The secure VM may be similar to the mobile operating system's VM, but may point to special code libraries that are added to the mobile device, including code libraries for performing such functions as encrypting/decrypting data and using application tunnels. The use of a secure VM enables an enterprise's IT department to effectively add a security layer to a pre-existing mobile application with little or no modification to the application itself. This may be desirable when, for example, the enterprise wishes to use a popular, commercially available mobile application as an enterprise application, but does not have authorization to (or otherwise does not wish to) make certain types of modifications to the application.

The secure VM 350C can be loaded with its own set of private libraries for storage, networking, policy management, etc. For example, some or all of the data stored by an application running in the secure VM 350C can use a certain encryption library. The secure VM 350C can implement a set of policies (such as authentication, disabling of cut/paste, prevention of access to certain URLs, prevention of access to certain APIs etc.) to control execution of the application within the secure VM 350C.

The secure VM 350C can block the execution of an application running therein based on detecting certain conditions, such as conditions indicative of the application having a virus or being malware. Hooks can be added to the secure VM 350C to prevent programs from being executed when certain conditions are detected. The secure VM 350C can observe the execution characteristics of an application running therein to determine that the application does not have exhibit malicious behavior.

By using a custom VM, all corporate content can essentially be separated from other content stored on the device. Such a custom VM can prevent data or applications from being shared with applications that are executed in the default VM of the mobile device 120. Moreover, the data accessed and/or manipulated by an application running in the custom VM can be stored in the secure data container 336 as described above.

In one embodiment, a single secure VM is provided on the mobile device 120 for running enterprise applications, and can be used to concurrently run multiple enterprise applications concurrently. In another embodiment, multiple secure VMs are provided on the mobile device, such that each enterprise application runs within a separate secure VM. A hybrid of these two approaches is also possible.

A variety of methods can be used to force or configure a pre-existing mobile application to use a secure VM. One such approach involves modifying the mobile application to cause it to use a secure launcher 350B, as described in the preceding section. When the application is launched, the secure launcher launches the secure VM, and then effectively passes the mobile application to the secure VM for execution. Another approach involves modifying the mobile application by replacing references to the operating system's default virtual machine with references to the secure VM. Another approach involves instructing the mobile device's operating system, at the time of installation of the application, to execute the mobile application in the secure VM.

In one embodiment, whenever a mobile application running in the secure VM performs a file read or write operation, the secure VM uses an encryption library to process the data being read or written. The secure VM thereby applies encryption to the enterprise data stored locally by enterprise applications.

Library files used by the secure VM may, in some embodiments, be incorporated into the operating system or otherwise installed on the mobile device with the cooperation of the OS developer, device manufacture/seller, or other party that has the appropriate permission levels for making such additions. The ability to add such library files generally increases the security capabilities of the secure VM, but is not essential.

One benefit of running an application in a secure VM is that the secure VM can be loaded with an alternate set of private libraries for storage, networking, policy management, etc. For example, a library can be loaded that causes all data stored by the application to be encrypted using a certain encryption library. Libraries can also be loaded that, for example, disable cut/copy/paste operations, require user authentication, prevent access to certain URLs, prevent access to certain APIs, etc. The particular libraries that are loaded may, for example, depend on the role or position of the user within the enterprise, the particular application being launched, and/or other criteria.

Another benefit of running an application in a secure or custom VM is that the application's execution can be blocked if the application exhibits suspicious behaviors of the type present in malware or viruses. This may be accomplished by adding hooks to the secure VM to enable an application's execution to be monitored and/or blocked.

The secure or custom VM also provides a mechanism for keeping enterprise content separate from other content stored on the device. For example, through the use of the secure VM, the data stored by an enterprise can be stored in a secure container as described above. This data advantageously is not accessible in unencrypted form to the device's default VM or the applications that run within it.

In the context of the Android OS, one method that can be used to launch an application in the secure VM involves the use of the app_process command to modify the standard launch sequence. For example, a command of the following format may be used once Zygote initializes a child process: execvp("/system/bin/app_process", ... <args> ... ). (Zygote is a special process that is created when Android boots; once created, it opens a server socket to listen for process creation requests.) This call replaces the old executable image with a fresh one, and enables the secure VM to be loaded with some existing libraries/jars, and with some new libraries/jars that implement, e.g., enterprise policy push, secure storage, and secure networking features. The new instance is not a share of Zygote or any other parent process, but rather is a completely new process with its own execution environment and added set of behaviors. Once the secure VM is loaded, the following steps can be performed to launch the application in the secure VM: (1) the newly created process performs an "attachment" operation; (2) once the ActivityManagerService receives the attach request from the newly created process, it sends the stored intent to it so that ActivityThread will look for the intent in the application's Manifest and will create that Activity; and (3) it then starts running the application. These three steps are the same as the last three steps ordinarily performed when an application is launched in Android. Android Runtime or any other compatible runtime can be loaded in the secure VM such that the application is compatible with the secure VM. This above process can be varied for use with other operating systems by those skilled in the art.

An application can be configured or "marked" to use the secure/custom VM in various ways. For example, in the context of Android, the standard command "adb shell pm enable (package name)" can be used to set the "enabled" state or flag of the application package. As another example, the enterprise agent installed on the device can, upon installation, make a call to this API and specify all of the applications that will run in the secure/custom VM. When such an application is later launched, the "enabled" flag can be checked (before Zygote is asked to create/fork a new process), and a new secure VM instance can be created based on the state of this flag. This process can be varied for use with other operating systems by those skilled in the art.

CONCLUSION

The secure mobile gateway 128 and the mobile device management system 126 may each be implemented by a computer system made up of one or more computing devices (e.g., physical servers, workstations, etc.), which may, but need not, be co-located. Each such computing device typically includes a processor (or multiple processors) that executes program instructions or modules stored in a memory or other non-transitory computer-readable storage medium or device. The secure mobile gateway 128 and mobile device management system 126 may be implemented on common hardware or on separate and distinct hardware.

All of the methods and processes described above may be embodied in, and fully automated via, software code modules executed by one or more computing devices (e.g., smartphones, tablets, other types of mobile devices, physical servers, etc). Each such computing device typically includes a processor (or multiple processors) that executes program instructions or modules stored in a memory or other non-transitory computer-readable storage medium or device. The code modules may be stored in any type of computer-readable storage medium or other computer storage device. Some or all of the methods may alternatively be embodied in specialized computer hardware (e.g., ASICs or FPGAs). Where a given software component (such as the enterprise agent or secure launcher) is herein described as performing or implementing a given function, it should be understood that the component, through executable instructions, instructs one or more processors (e.g., the processor of a mobile device) to perform or implement the function.

Various modifications to the implementations described in this disclosure may be readily apparent to those skilled in the art, and the generic principles defined herein may be applied to other implementations without departing from the spirit or scope of this disclosure. Thus, nothing in this specification is intended to imply that any feature, characteristic, or attribute of the disclosed systems and processes is essential.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A non-transitory computer-readable medium having stored thereon an agent component that is configured to be installed on a mobile device of a user to provide secure access over a network to an enterprise resource of an enterprise system, the agent component comprising executable code that implements a process that comprises:
    intercepting, by the agent component installed on the mobile device, a hypertext transfer protocol (HTTP) request generated by an application installed on the mobile device;
    modifying the HTTP request by replacing a hostname of the HTTP request with a hostname of the enterprise resource;
    encapsulating, by the agent component installed on the mobile device, a representation of the modified HTTP request according to a tunneling protocol; and
    sending, by the agent component installed on the mobile device, the encapsulated representation of the HTTP request from the mobile device over a network to a tunnel mediator that is configured to extract and forward the representation of the HTTP request to a corresponding enterprise resource, wherein the agent component is configured to send the encapsulated representation of the HTTP request using a tunnel definition that is specific to the application installed on the mobile device.

2. The non-transitory computer-readable medium of claim 1, wherein the agent component is configured to intercept the HTTP request as an HTTP proxy server.

3. The non-transitory computer-readable medium of claim 1, wherein the agent component is configured to send the encapsulated representation of the HTTP request via an application tunnel that is dedicated to communications between the application installed on the mobile device and the enterprise resource.

4. The non-transitory computer-readable medium of claim 1, wherein the process comprises multiplexing encapsulated communications from multiple applications installed on the mobile device for transmission to the tunnel mediator over a common connection, such that multiple application tunnels are multiplexed over the common connection.

5. The non-transitory computer-readable medium of claim 1, wherein the agent component is configured to use a custom SSL (secure sockets layer) library to establish a secure session with the enterprise resource, and to use the secure session to send the encapsulated representation of the HTTP request, the custom SSL library configured to accept a digital certificate returned by the enterprise resource despite a hostname mismatch, such that a hostname matching requirement is disregarded.

6. A computer system comprising:
    one or more processors; and
    non-transitory computer-readable media storing computer-readable instructions that, when executed by the one or more processors, implement:
    a repository of application tunnel definitions, each application tunnel definition defined for a particular mobile device application and indicating a particular server port associated with a particular resource of the computer system; and
    a tunneling mediator that is configured to:
    receive an application tunnel formation request from an agent installed on a mobile device, the application tunnel formation request identifying one of the application tunnel definitions;
    retrieve the identified application tunnel definition from the repository;
    determine, from the retrieved application tunnel definition, a server port of a resource of the computer system;
    receive at least one agent-generated communication from the agent installed on the mobile device, the agent-generated communication comprising an application-generated communication from an application installed on the mobile device, the retrieved application tunnel definition being defined for the application installed on the mobile device, the application-generated communication being encapsulated by the agent installed on the mobile device within one or more headers of an encapsulation protocol;
    extract the application-generated communication from the agent-generated communication;
    modifying the application-generated communication by replacing a hostname of the application-generated communication with a hostname of the resource of the computer system; and
    send the application-generated communication to the server port via a resource network connection.

7. The computer system of claim 6, wherein the tunneling mediator is configured to:
    receive, from the resource via the resource network connection, a response to the application-generated communication;
    encapsulate the response within one or more headers of the encapsulation protocol; and
    send the encapsulated response to the agent of the mobile device.

8. The computer system of claim 6, wherein:
    the application comprises a web browser;
    the application-generated communication comprises a uniform resource locator (URL) for an information resource available on a network; and
    the tunneling mediator is configured to:

apply a policy governing whether access to the URL is permitted by an enterprise associated with the computer system;

respond to a determination that access to the URL is permitted by sending the application-generated communication to the information resource; and respond to a determination that access to the URL is not permitted by not sending the application-generated communication to the information resource.

9. The computer system of claim 6, comprising a mobile device manager associated with the tunneling mediator, the mobile device manager configured to deny the request if one or more properties of the mobile device or of a user assigned to the mobile device do not comply with one or more policies associated with the mobile device manager.

10. The computer system of claim 6, wherein the tunneling mediator is configured to:

receive data from the resource via the resource network connection;

begin sending the data to the mobile device via a mobile device network connection between the tunneling mediator and the mobile device;

respond to a loss of the mobile device network connection by caching at least a portion of the data that has not been sent to the mobile device; and respond to a regaining of the mobile device network connection by sending the cached data to the mobile device via the regained network connection.

11. The computer system of claim 6, wherein the tunneling mediator is configured to log information about at least one of: (1) application-generated communications received from the particular application and sent by the tunneling mediator to the resource via the resource network connection; and (2) resource-generated communications received from the resource and sent by the tunneling mediator to the mobile device.

12. A mobile device comprising a processor and storage, the mobile device comprising:

one or more application tunnel definitions stored in the storage, each application tunnel definition being uniquely associated with a particular mobile device application and indicating a local mobile device port; and an agent installed on the storage of the mobile device, the agent being associated with a remote computer system and comprising instructions that, when executed by the processor, cause the mobile device to:

receive, by the agent installed on the mobile device, an application-generated communication comprising a hypertext transfer protocol (HTTP) request generated by an application installed on the mobile device, the application configured to communicate with a resource of the remote computer system;

search the storage to retrieve an application tunnel definition of the one or more application tunnel definitions, wherein the retrieved tunnel definition is uniquely associated with the application;

generate, by the agent installed on the mobile device, an application tunnel formation request based on the retrieved application tunnel definition;

modify the HTTP request by replacing a hostname in the HTTP request with a hostname of the resource;

encapsulate at least a portion of the application-generated communication, comprising the modified HTTP request, within one or more headers of an encapsulation protocol; and send, by the agent installed on the mobile device, the application tunnel formation request and the encapsulated application-generated communication to a tunneling mediator of the remote computer system.

13. The mobile device of claim 12, wherein the agent installed on the mobile device is configured to operate as a hypertext transfer protocol (HTTP) proxy server for the application.

14. The mobile device of claim 12, wherein the agent installed on the mobile device is configured to:

receive from the tunneling mediator, via a local mobile device port defined in the retrieved application tunnel definition, a resource-generated response to the application-generated communication, the response being encapsulated within one or more headers of the encapsulation protocol;

extract the resource-generated response from the one or more headers; and provide the resource-generated response to the first application.

15. The mobile device of claim 14, wherein the response is generated by the resource and encapsulated by the tunneling mediator.

16. The mobile device of claim 12, wherein the agent installed on the mobile device is configured to:

respond to a loss of a mobile device connection by caching data not yet sent to the tunneling mediator; and respond to a regaining of the mobile device connection by sending the cached data to the tunneling mediator via the regained mobile device connection.

17. Non-transitory computer storage storing executable instructions that cause a mobile device to perform a process that comprises:

intercepting, by an agent component installed on the mobile device, a message sent by a mobile application running on the mobile device;

modifying, by the agent component installed on the mobile device, a hostname specified by the message to correspond to a target application server;

encapsulating, by the agent component installed on the mobile device, the modified message according to an application tunneling protocol specified for the mobile application; and sending, by the agent component installed on the mobile device, the encapsulated, modified message on a wireless network for delivery to the target application server via an application tunnel.

18. The non-transitory computer storage of claim 17, storing executable instructions that cause the agent component to act as a hypertext transfer protocol (HTTP) proxy server component that implements the process.

19. The non-transitory computer storage of claim 17, wherein the application tunnel is dedicated to communications between the mobile application and the target application server.

20. A method comprising:

intercepting, by an agent component installed on a mobile device, a hypertext transfer protocol (HTTP) request generated by an application installed on the mobile device;

modifying the HTTP request by replacing a hostname of the HTTP request with a hostname of an enterprise resource;

encapsulating, by the agent component installed on the mobile device, a representation of the modified HTTP request according to a tunneling protocol; and sending, by the agent component installed on the mobile device, the encapsulated representation of the HTTP request from the mobile device over a network to a tunnel mediator that is configured to extract and forward the representation of the HTTP request to a corresponding enterprise resource, wherein the agent component is configured to send the encapsulated representation of the HTTP request using a tunnel definition that is specific to the application installed on the mobile device.

21. The method of claim 20, comprising:

multiplexing encapsulated communications from multiple applications installed on the mobile device for transmission to the tunnel mediator over a common connection, such that multiple application tunnels are multiplexed over the common connection.

22. The method of claim 20, comprising:

using a custom SSL (secure sockets layer) library to establish a secure SSL session with the enterprise resource, and to use the secure SSL session to send the encapsulated representation of the HTTP request, the custom SSL library configured to accept a digital certificate returned by the enterprise resource despite a hostname mismatch, such that a hostname matching requirement is disregarded.

23. The method of claim 22, comprising:

creating a different secure SSL session with the enterprise resource;

encapsulating a different message from a different application installed on the mobile device; and sending the encapsulated different message using the different secure SSL session.

24. The method of claim 20, comprising:

creating an exception on the mobile device to a hostname matching requirement, the exception enabling the mobile device to accept a digital certificate that specifies a localhost hostname used by a proxy server that intercepts messages from the mobile application installed on the mobile device.

* * * * *